United States Patent
Fujita et al.

(10) Patent No.: US 10,701,263 B2
(45) Date of Patent: Jun. 30, 2020

(54) BROWSING SYSTEM, IMAGE DISTRIBUTION APPARATUS, AND IMAGE DISTRIBUTION METHOD

(71) Applicant: RICOH COMPANY, LTD., Tokyo (JP)

(72) Inventors: Yohei Fujita, Kanagawa (JP); Osamu Ogawara, Kanagawa (JP); Takayuki Hara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/035,904

(22) Filed: Jul. 16, 2018

(65) Prior Publication Data

US 2019/0028642 A1 Jan. 24, 2019

(30) Foreign Application Priority Data

Jul. 18, 2017 (JP) ................................ 2017-139327
Mar. 29, 2018 (JP) ................................ 2018-066208

(51) Int. Cl.
*H04N 5/00* (2011.01)
*G06T 3/00* (2006.01)
(Continued)

(52) U.S. Cl.
CPC ..... *H04N 5/23238* (2013.01); *G06K 9/00604* (2013.01); *G06K 9/00624* (2013.01); *G06K 9/4671* (2013.01); *G06T 3/0062* (2013.01); *G06T 5/50* (2013.01); *H04N 5/268* (2013.01); *H04N 5/2723* (2013.01); *H04N 21/21805* (2013.01); *H04N 21/431* (2013.01); *H04N 21/4622* (2013.01); *H04N 21/6587* (2013.01); *H04N 21/812* (2013.01); *H04N 21/816* (2013.01)

(58) Field of Classification Search
CPC ............ H04N 5/23238; H04N 5/2723; G06K 9/00624; G06T 3/0062; G06T 5/50
See application file for complete search history.

(56) References Cited

U.S. PATENT DOCUMENTS

2009/0021794 A1 1/2009 Hara et al.
2011/0119555 A1 5/2011 Hara
(Continued)

FOREIGN PATENT DOCUMENTS

JP 2015-022561 2/2015

*Primary Examiner* — Zhihan Zhou
(74) *Attorney, Agent, or Firm* — Xsensus LLP

(57) ABSTRACT

A browsing system includes an image distribution apparatus and an information processing apparatus. The image distribution apparatus includes a memory configured to store and register a presentation pattern of a plurality of display positions, including at least a first display position and a second display position, set within a wide-angle image; and first circuitry configured to transmit the wide-angle image and the presentation pattern of the plurality of display positions. The information processing apparatus includes second circuitry configured to receive the wide-angle image and the presentation pattern from the image distribution apparatus, and to display the wide-angle image on a display connected with the information processing apparatus, using the plurality of display positions by applying the received presentation pattern.

17 Claims, 31 Drawing Sheets

(51) Int. Cl.
*H04N 5/232* (2006.01)
*H04N 5/272* (2006.01)
*G06K 9/00* (2006.01)
*G06T 5/50* (2006.01)
*H04N 5/268* (2006.01)
*H04N 21/81* (2011.01)
*H04N 21/462* (2011.01)
*H04N 21/218* (2011.01)
*H04N 21/6587* (2011.01)
*G06K 9/46* (2006.01)
*H04N 21/431* (2011.01)

(56) References Cited

U.S. PATENT DOCUMENTS

| | | |
|---|---|---|
| 2013/0073748 A1 | 3/2013 | Masuda et al. |
| 2013/0179700 A1 | 7/2013 | Toda et al. |
| 2013/0322844 A1* | 12/2013 | Suzuki ............... H04N 9/87 386/230 |
| 2013/0328746 A1 | 12/2013 | Fujita et al. |
| 2014/0223570 A1 | 8/2014 | Matsushima et al. |
| 2015/0046810 A1 | 2/2015 | Ogawara |
| 2015/0067510 A1 | 3/2015 | Hashikami et al. |
| 2015/0070249 A1 | 3/2015 | Hashikami et al. |
| 2016/0179152 A1 | 6/2016 | Toda et al. |
| 2017/0048351 A1* | 2/2017 | Wakizaki ............. H04L 67/32 |
| 2017/0052752 A1 | 2/2017 | Ogawara |
| 2017/0078844 A1* | 3/2017 | Ota ..................... H04W 4/023 |
| 2018/0139361 A1 | 5/2018 | Ogawara |
| 2018/0192249 A1* | 7/2018 | Lehtiniemi ........... H04W 4/029 |
| 2018/0279004 A1* | 9/2018 | Takahashi ........ G06Q 30/0269 |

* cited by examiner

HEMISPHERICAL IMAGE (FRONT SIDE)

HEMISPHERICAL IMAGE (REAR SIDE)

MERCATOR IMAGE

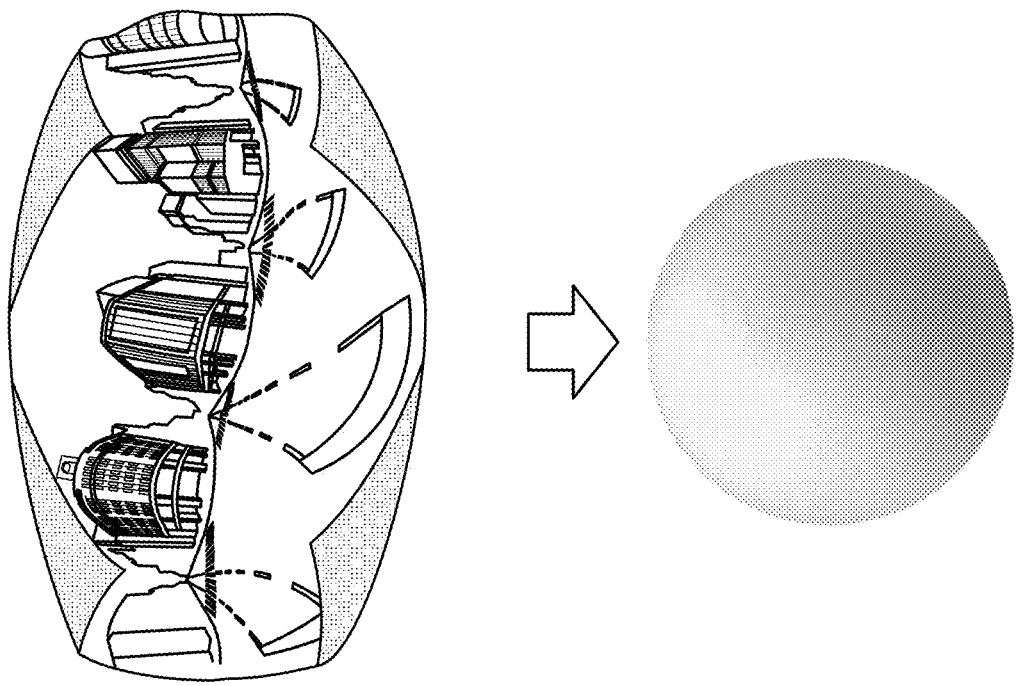
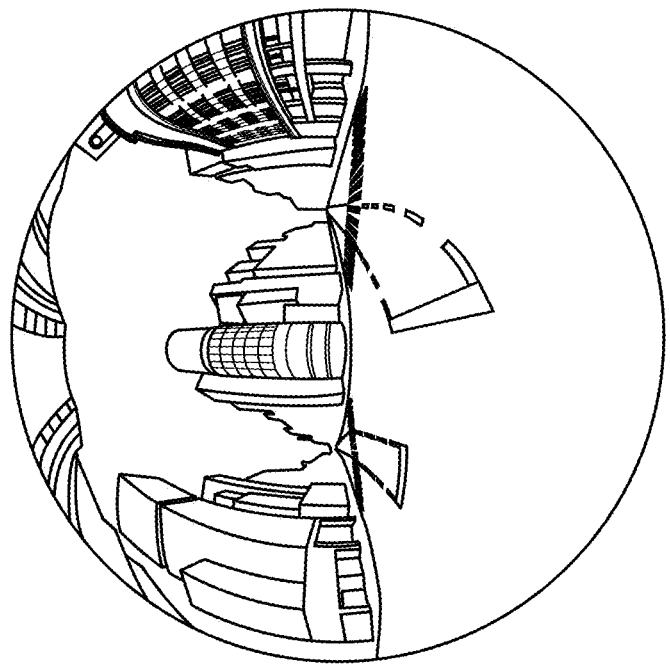
FIG. 7A
FIG. 7B
FULL VIEW SPHERICAL IMAGE

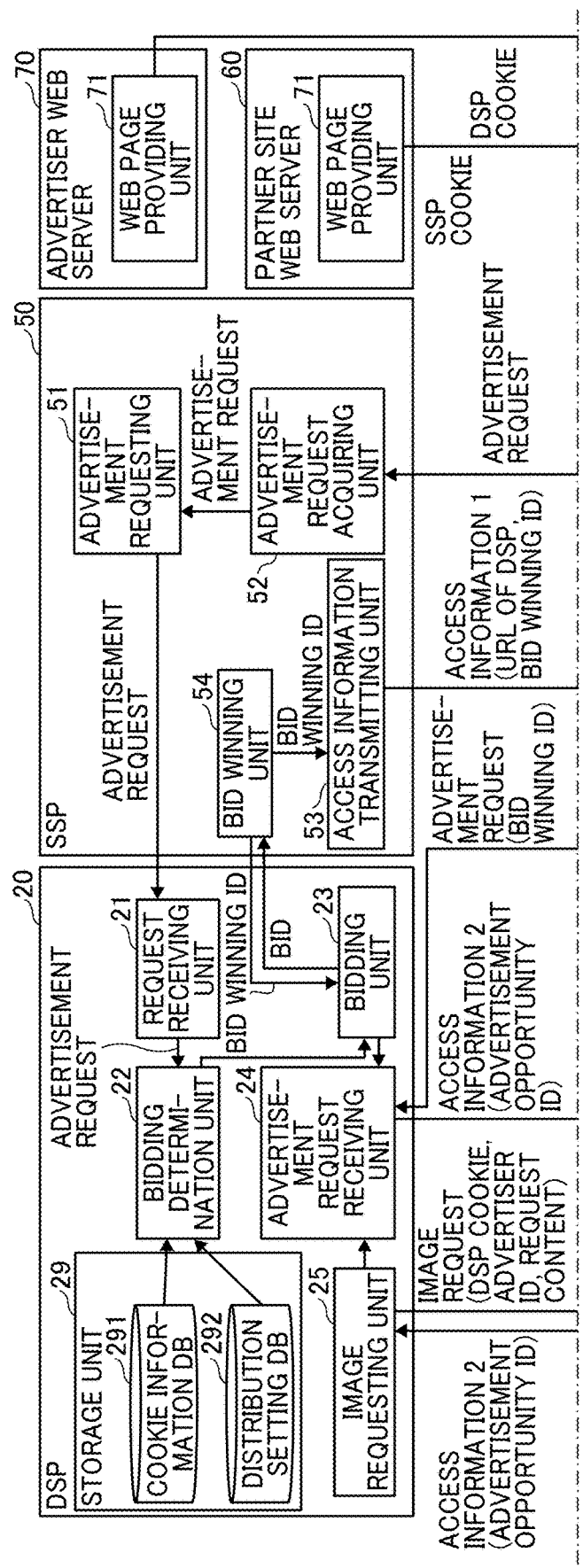

BROWSING SYSTEM, IMAGE DISTRIBUTION APPARATUS, AND IMAGE DISTRIBUTION METHOD

CROSS-REFERENCE TO RELATED APPLICATION

This application claims priority pursuant to 35 U.S.C. § 119(a) to Japanese Patent Application Nos. 2017-139327, filed on Jul. 18, 2017 and 2018-066208, filed on Mar. 29, 2018, in the Japan Patent Office, the disclosure of which is incorporated by reference herein in its entirety.

BACKGROUND

Technical Field

This disclosure relates to a browsing system, an image distribution apparatus, and an image distribution method.

Background Art

Advertisement distribution and display systems display advertisements provided by advertisers on advertisement frames set on web pages. The advertisers can display the advertisement of products and services on the advertisement frames provided by various web sites. Viewer persons who are interested in the products and services displayed on the advertisement frames click or tap the advertisement frames, with which the advertisers can invite the viewer persons to the web sites of the advertisers.

The advertiser wants to increase the frequency of clicking of the advertisements by viewer persons. Since the number of advertisements prepared on one web page has been increasing, the advertisers attempt to use methods that can attract interest of the viewer persons effectively. One conventional art discloses a technique for increasing an advertisement effect (e.g., clicking rate) by distributing movie images because the viewer persons tend to be attracted to moving objects such as the movie images.

However, since a plurality of images composing the movie image is being displayed sequentially one to another in time series, the movie image may not be displayed in a manner that can attract interest of the viewer persons, with which the clicking rate of images may not be improved.

SUMMARY

As one aspect of the present invention, a browsing system is devised. The browsing system includes an image distribution apparatus and an information processing apparatus. The image distribution apparatus includes a memory configured to store and register a presentation pattern of a plurality of display positions, including at least a first display position and a second display position, set within a wide-angle image; and first circuitry configured to transmit the wide-angle image and the presentation pattern of the plurality of display positions. The information processing apparatus includes second circuitry configured to receive the wide-angle image and the presentation pattern from the image distribution apparatus, and to display the wide-angle image on a display connected with the information processing apparatus, using the plurality of display positions by applying the received presentation pattern.

As another aspect of the present invention, an image distribution apparatus is devised. The image distribution apparatus includes circuitry configured to acquire a wide-angle image and a presentation pattern of a plurality of display positions set within the wide-angle image, and registers the wide-angle image and the presentation pattern of the plurality of display positions set within the wide-angle image in a memory, the presentation pattern including at least a first presentation pattern and a second presentation pattern used for displaying the plurality of display positions set within the wide-angle image, and transmit, by referring the memory registered with the wide-angle image and the first presentation pattern and the second presentation pattern, the wide-angle image and any one of the first presentation pattern and the second presentation pattern to an information processing apparatus to display the wide-angle image set with the plurality of display positions on a display connected with the information processing apparatus, by applying any one of the first presentation pattern and the second presentation pattern.

As another aspect of the present invention, a method of distributing a wide-angle image from an image distribution apparatus to an information processing apparatus is devised. The method includes registering a wide-angle image and a presentation pattern of a plurality of display positions set within the wide-angle image in a memory, referring the presentation pattern of the plurality of display positions set within the wide-angle image registered in the memory, and transmitting the wide-angle image and the presentation pattern of the plurality of display positions set within the wide-angle image to an information processing apparatus configured to receive the wide-angle image and the presentation pattern of the plurality of display positions set within the wide-angle image from the image distribution apparatus, and to display the wide-angle image set with the plurality of display positions on a display connected with the information processing apparatus using the plurality of display positions by applying the acquired presentation pattern.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIGS. 7A and 7B illustrate a scheme of generating a full view spherical image from hemispherical images captured by a full-view spherical camera;

FIGS. 24A and 24B illustrate an example of a functional block diagram of a terminal apparatus, an advertiser web server, a partner site web server, an image distribution apparatus, an SSP, and a DSP of a second embodiment;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments of a browsing system, an image distribution method performed in the browsing system with reference to the drawings.

First Embodiment

Figure 1A:
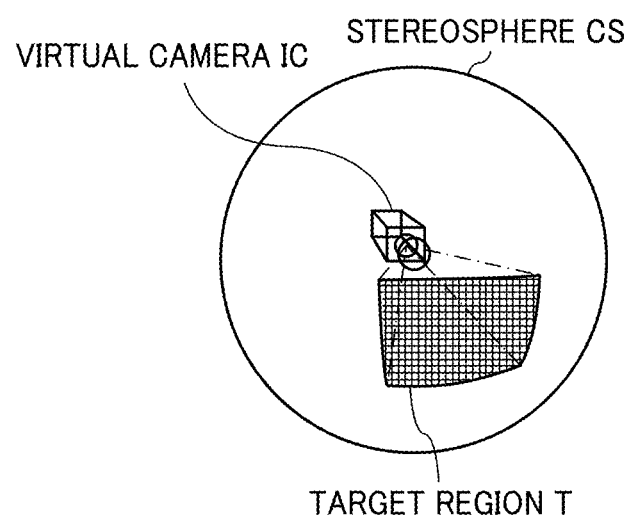
FIGS. 1A and 1B illustrate a scheme of a wide-angle image such as a full-view spherical image.
Figure 1B:
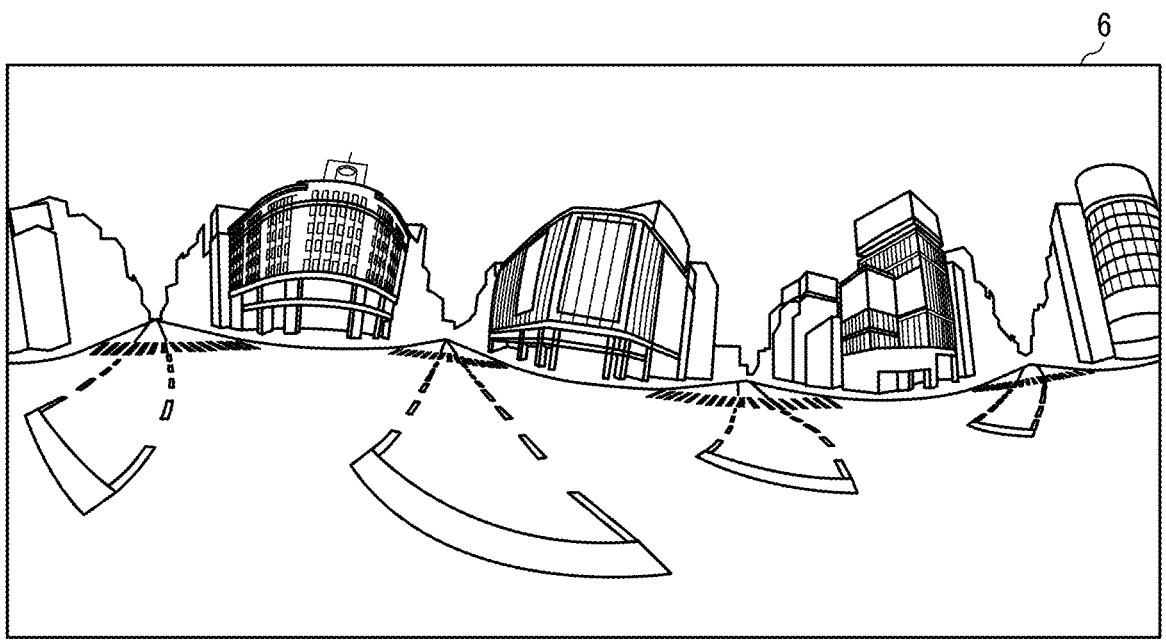

Electronic Apparatus System:

FIG. 1 illustrates a scheme of a wide-angle image such as a full-view spherical image 6. FIG. 1A illustrates an example of a spherical image expressed by a three-dimensional stereosphere CS, and FIG. 1B illustrates the full-view spherical image 6 expressed by Mercator projection or equirectangular projection. The full-view spherical image 6 generated by a full-view spherical camera has a three-dimensional structure that the image illustrated in FIG. 1B is transferred on the stereosphere CS. In this configuration, a virtual camera IC corresponds to a virtual eye point of a viewer person, and the virtual eye point of the viewer person is set at the center of the full-view spherical image 6 in FIG. 1. When the viewer person rotates the virtual camera IC about any one of the three axes such as the X axis, the Y axis and the Z axis passing through the virtual camera IC, a target region T in the full-view spherical image 6 can be displayed on a display. The target region T can be enlarged or reduced, and the target region T displayed in the full-view spherical image 6 correspond to a region defined by an angle of view.

Figure 2:
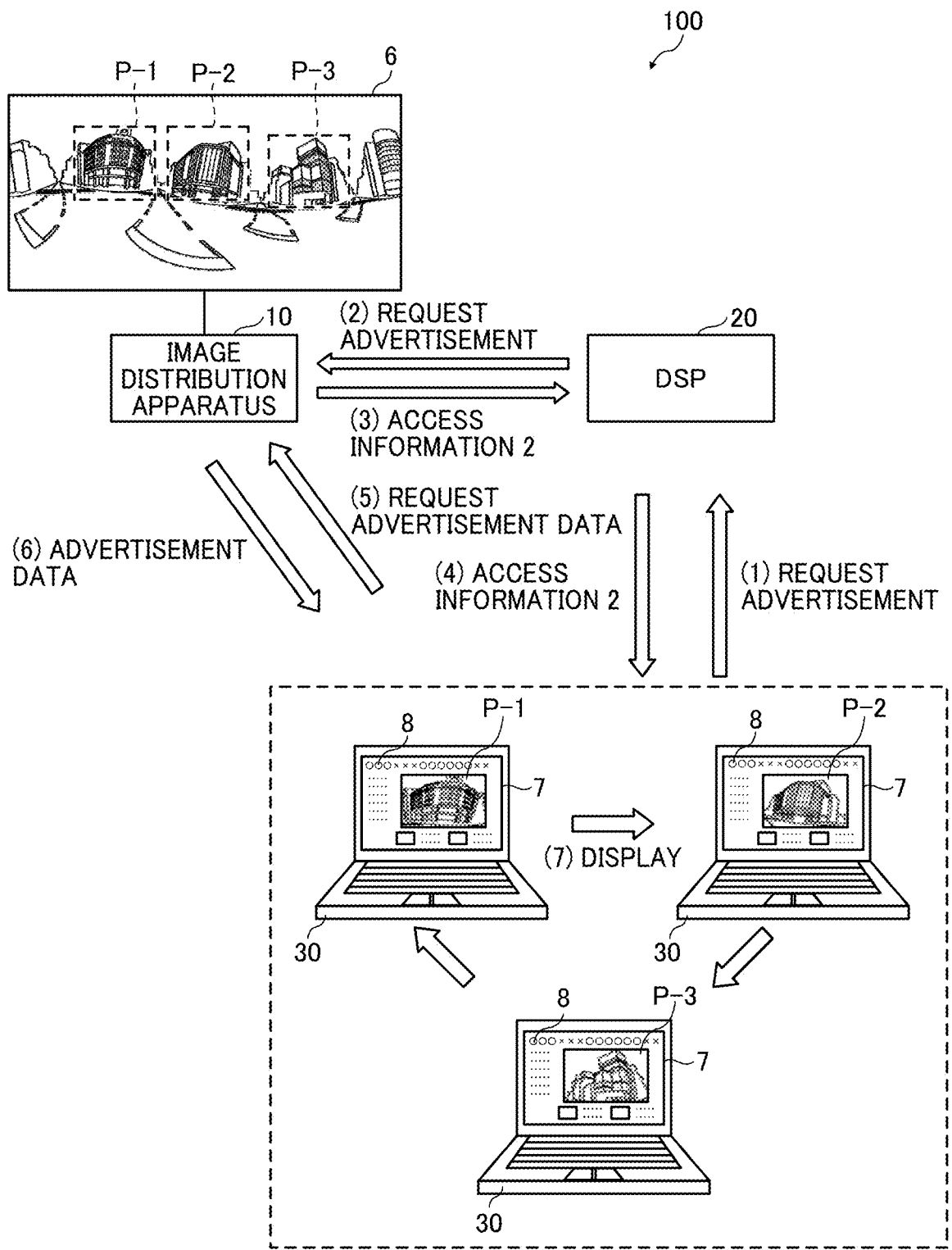
FIG. 2 illustrates a scheme of a browsing system of an embodiment.

FIG. 2 illustrates a scheme of a browsing system 100 of the embodiment. In this description, a description is given of the browsing system 100 that uses the full-view spherical image 6 (i.e., an example of wide-angle image) for advertising materials distributed by a third-party distribution system. The third-party distribution system is designed to distribute advertisements across multiple media to manage the entire campaign at an advertiser side. In the third-party distribution system, a third-party distribution server controls the frequency of advertisement distribution, and measures an effect of advertisement. In an example case of FIG. 2, the image distribution apparatus 10 corresponds to the third-party distribution server. The browsing system 100 can be used as below.

(1) When a terminal apparatus 30 opens a web page having an advertisement frame 7 using a browser 8, the terminal apparatus 30 is notified with a demand-side platform (DSP) 20 that is designed to display advertisements on the terminal apparatus 30. Then, the terminal apparatus 30 requests an advertisement to the DSP 20 by transmitting an advertisement request.

(2) The DSP 20 requests the advertisement to the image distribution apparatus 10 by transmitting the advertisement request.

(3) The image distribution apparatus 10 stores the advertisement request, generates access information 2 to be used by the terminal apparatus 30 to access the image distribution apparatus 10, and transmits the access information 2 to the DSP 20.

(4) After the DSP 20 receives the access information 2, the DSP 20 transmits the access information 2 to the terminal apparatus 30.

(5) The terminal apparatus 30 requests advertisement data, such as the full-view spherical image 6, to the image distribution apparatus 10 based on the access information 2. In the embodiment, the image distribution apparatus 10 stores a plurality of gazing points P, indicating each gazing point as "P-n" (n: natural number), and an angle of view of each of the gazing points P set in the full-view spherical image 6, and generates the advertisement data, such as the full-view spherical image 6, that is used to display the plurality of gazing points P with a given display order. Hereinafter, the plurality of gazing points P may be simply referred to as the gazing point P.

(6) The image distribution apparatus 10 transmits the requested advertisement data to the terminal apparatus 30 based on the access information 2.

(7) After the terminal apparatus 30 receives the advertisement data, the browser 8, operated in the terminal apparatus 30, rotates the full-view spherical image 6 to display the plurality of gazing points P using the designated angle of views with the given display order. In an example case of FIG. 2, the full-view spherical image 6 includes three gazing points P-1, P-2 and P-3, and an angle of view respectively set for each of three gazing points P-1, P-2 and P-3. The terminal apparatus 30 generates advertisement data using the full-view spherical image 6 that can be rotated along the display order starting from the gazing point P-1 (set with the angle of view 1), the gazing point P-2 (set with the angle of view 2), and the gazing point P-3 (set with the angle of view 3) even when a viewer person does not operate the full-view spherical image 6.

As to the browsing system 100 of the embodiment, the terminal apparatus 30 can automatically display the gazing points corresponding to the feature portions of the full-view spherical image 6 as a movie image, thereby attracting the interest of viewer persons easily. Hereinafter, the viewer persons may be referred to as the viewer person, and the viewer person indicates one or more persons that uses the terminal apparatus 30 in the browsing system 100. Further, since the image can be displayed as a zoom-in image (i.e., enlargement of image size) or a zoom-out image (i.e., reduction of image size) by changing the angle of view, the interest of the viewer person can be further attracted in the browsing system 100. Although the advertisement using the full-view spherical image may be difficult to view the entire image region due to the size of full-view spherical image, the browsing system 100 can display one or more parts of the full-view spherical image that the advertiser wants to emphasize, with which an effect of advertisement can be enhanced, in which the effect of advertisement can be measured, for example, using a clicked rate or clicked frequency of the advertisement.

Terms:

The gazing point P is a portion or part where a characteristic feature of the full-view spherical image 6 is shown. The gazing point is not limited to one pixel, but may mean a portion or part of a plurality of pixels of an image. More specifically, the gazing point P is the portion or part where the viewer person are supposed to be attracted. For example, the gazing point P is determined by performing image processing, detecting a part where a given object is captured, and statistically calculating the frequency of portions actually displayed under instructions of the viewer person.

The effect of advertisement qualitatively indicates that the viewer person is attracted and notice the advertisement. For example, the effect of advertisement can be detected when the clicking or tapping operations performed by the viewer person.

A method of displaying images at the display positions indicates a method of how to display a part of the full-view spherical image. For example, the full-view spherical image can be displayed by feedbacking the display order of the display positions and/or the angle of view set for each of the display positions. The display order of display positions indicates an order of displaying a plurality parts of the full-view spherical image. The part of the full-view spherical image means a narrower to broader region in the full-view spherical image. The plurality parts of the full-view spherical image can be displayed by applying the display order, which is a sequential order of displaying the center of each of the plurality of gazing points as the display positions.

Figure 3:
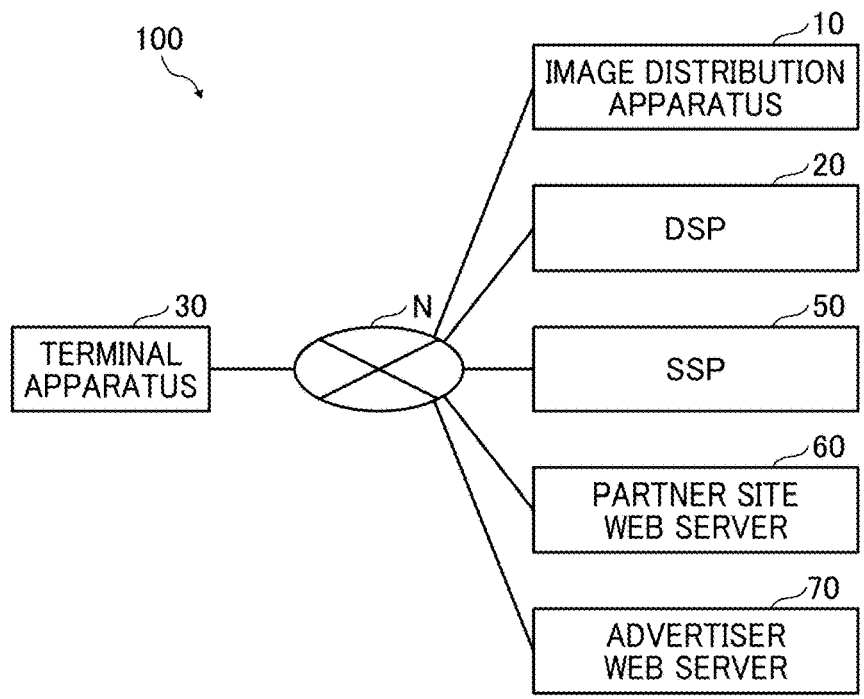
FIG. 3 schematically illustrates an example of a configuration of the browsing system of the embodiment.

System Configuration:

FIG. 3 illustrates an example of a schematic configuration of the browsing system 100. As illustrated in FIG. 3, the browsing system 100 includes, for example, the terminal apparatus 30, the image distribution apparatus 10, the DSP 20, a supply side platform (SSP) 50, a partner site web server 60, and an advertiser web server 70, communicably connected with each other via a network N.

The network N is constructed by a local area network (LAN), which is disposed in a location where the terminal apparatus 30 is disposed, a provider network of a provider used for connecting the LAN to the Internet, and a line provided by a line carrier. If the network N includes multiple LANs, the network N is referred to as a wide area network (WAN) or the Internet that connects computers and networks, for example, globally and interactively. The network N may be a wired network, a wireless network, or a combination of these. Further, when the terminal apparatus 30 is directly connected to a public line network, the terminal apparatus 30 can be connected to a provider network without the LAN.

In this description, the terminal apparatus 30 is used as an information processing apparatus, which can be operated as a client terminal. In the terminal apparatus 30, the browser 8 or an application software having an equivalent function is operated, with which a web page requested by the terminal apparatus 30 is received from the partner site web server 60 and displayed on a display such as liquid crystal display (LCD) to be described later.

The terminal apparatus 30 can be any apparatus that displays web pages, such as a personal computer (PC), a tablet device, a smart phone, a personal digital assistant (PDA), a game machine, a navigation terminal, and a wearable PC. For example, if a printer has a function of displaying web pages on a display, the printer can be used as the terminal apparatus 30. Further, a digital signage can be used to display web pages. The digital signage means a system or a display using an electronic display device such as a display panel used for displaying information at places or locations where people gather such as outdoors, shops, public spaces, and transportation facilities, and the digital signage may also mean information displayed on the display. In the embodiment, it is assumed that the web page includes one or more web applications. The web application is activated using a program described in a program language, such as JavaScript (registered trademark) on a web browser, and a program on a web browser cooperatively, and the web application indicates software or configuration used on the web browser.

The terminal apparatus 30 can be connected with the network N via an access point of a wired local area network (LAN) or a wireless LAN, and can be connected to the network N by using communication standards of circuit switching type such as 3G, 4G and long term evolution (LTE).

The partner site web server 60 is a server, which is a general information processing apparatus, that provides information and functions to a client computer used by a viewer person (e.g., terminal apparatus 30) through the network N. The advertiser web server 70 provides a web page including the advertisement frame 7. The web page means one or more web pages in this description. The partner site web server 60 requests the SSP 50 to display advertisement on the advertisement frame 7.

The advertiser web server 70 is also a server, which is a general information processing apparatus, that provides information and functions to a client computer used by a viewer person (e.g., terminal apparatus 30) through the network N. When the viewer person clicks or taps the advertisement frame 7, the terminal apparatus 30 accesses the advertiser web server 70. The advertiser web server 70, operated by an advertiser, requests the DSP 20 to purchase the advertisement frame 7 for displaying the advertisement of one or more products and/or services of the advertiser, and requests the image distribution apparatus 10 to generate and display the advertisement. The advertisement means one or more advertisements in this description.

The advertiser web server 70, the partner site web server 60, and the terminal apparatus 30 communicate with each other using communication protocols, such as hypertext transfer protocol (HTTP) or hypertext transfer protocol secure (HTTPs). For example, in response to a request from the terminal apparatus 30, the advertiser web server 70 and the partner site web server 60 transmit screen-configuring information to the terminal apparatus 30. The screen-configuring information is a set of information described in, for example, hypertext markup language (HTML), script language, and cascading style sheet (CSS). Specifically, a structure of web page is described in the HTML, an operation on web page is described in the script language, and a style of web page is described in the CSS. In the embodiment, the script language is used to apply an operation performed to the web page by a viewer person (i.e., trigger operation) to the full-view spherical image 6. Specifically, the script language employs known program languages, such as JavaScript (registered trademark) or ECMAScript.

Both of the advertiser web server 70 and the partner site web server 60 record cookies related to the terminal apparatus 30. Hereinafter, the cookies may be simply referred to as the cookie. Specifically, the advertiser web server 70 records the cookie of the advertiser web server 70 and the cookie of the DSP 20, and the partner site web server 60 records the cookie of the partner site web server 60 and the cookie of the SSP 50.

The SSP 50 is designed to maximize revenues of the partner site web server 60 posting the advertisement frame 7 by selling the advertisement frame 7. Although the SSP 50 is described as one apparatus in FIG. 3, the SSP 50 can be one or more information processing apparatuses connected by a network wirelessly and/or by wire. The partner site web server 60 requests the SSP 50 to sell the advertisement frame 7. Specifically, an advertisement tag issued by the SSP 50 is set for the advertisement frame 7, and when the terminal apparatus 30 displays a web page of the partner site web server 60, the advertisement tag requests the SSP 50 to distribute an advertisement (advertisement request). Then, the SSP 50 receives a bid of the advertisement frame 7 from the DSP 20, and transmits access information 1, to be used for accessing the bid-winning DSP 20, to the terminal apparatus 30.

The DSP 20 is designed to distribute advertisement efficiently and effectively for an advertiser, such as purchasing the advertisement frame 7 and distributing the advertisement. Although the DSP 20 is described as one apparatus in FIG. 3, the DSP 20 can include one or more information processing apparatuses connected by a network wirelessly and/or by wire. The DSP 20 acquires the cookie from the SSP 50 (hereinafter, SSP cookie), and determines attribute of the viewer person based on relational information of the DSP cookie managed by the DSP 20 and the SSP cookie. Then, the DSP 20 bids to the SSP 50 with a price that is determined based on advertisement distribution setting set by the advertiser that requests the advertisement based on the attribute of viewer person and the budget.

The DSP 20, which has won the bid, receives the advertisement request from the terminal apparatus 30 based on the access information 1. The DSP 20 notifies the advertisement request to the image distribution apparatus 10, and acquires the access information 2 from the image distribution apparatus 10. The access information 2 is used by the terminal apparatus 30 when the terminal apparatus 30 requests the advertisement data to the image distribution apparatus 10. The advertisement data includes, for example, a display program used for displaying the full-view spherical image 6, and an operation history program used for acquiring operation history.

The DSP 20 transmits the access information 2 to the terminal apparatus 30. The DSP 20 charges the billing to the advertiser based on a contract. The billing is executed between the image distribution apparatus 10 and the advertiser based on the contract. However, the billing between the image distribution apparatus 10 and the advertiser may be executed differently depending on the contract, such as the billing is executed by just displaying the advertisement.

The image distribution apparatus 10 can include, for example, one or more information processing apparatuses. The image distribution apparatus 10 provides advertisement data including advertisement material, such as the full-view spherical image 6, which is matched to the attribute of viewer persons, to the advertisement frame 7 purchased by the DSP 20. The image distribution apparatus 10 stores advertisement materials and advertisement images such as banners and text. The advertisement data may be simply banners such as images made of text, photo or picture, or may include a script language in addition to the images. In the embodiment, the advertisement data includes, for example, a display program and an operation history program. The display program is used for rotating the full-view spherical image 6 based on a display order, and for changing a display mode (presentation mode) of the full-view spherical image 6 depending on the operation performed to the full-view spherical image 6 by the viewer person. The operation history program is used for recording a history of operation performed to the full-view spherical image 6 as an operation history. These programs are described, for example, in a script language.

When the terminal apparatus 30 requests the advertisement data to the image distribution apparatus 10 based on the access information 2, the image distribution apparatus 10 transmits the advertisement data to the terminal apparatus 30. The advertisement data includes, for example, the full-view spherical image 6. For example, the display program automatically rotates the full-view spherical image 6 so that the full-view spherical image 6 is rotated along a plurality of the gazing points P, and enlarges or reduces the size of the full-view spherical image 6. Further, the operation history program is used to transmit an operation history performed on the full-view spherical image 6 to the image distribution apparatus 10 together with the cookie of the image distribution apparatus 10 (hereinafter, image cookie) and an image identification (ID). The operation history includes, for example, information of one or more browsing angles that were used for displaying the full-view spherical image 6. The browsing angle is to be described later. Since the operation history is used to determine the one or more gazing points, the operation history may not be transmitted if the operation history is not to be used to determine the gazing points.

Further, the operation history program is used to transmit a notice indicating a clicking operation to the image distribution apparatus 10 together with a pattern identification (ID) of a display pattern, to be described later. The image distribution apparatus 10 defines a plurality of display patterns for each of the full-view spherical image 6. The image distribution apparatus 10 can be configured to distribute one or more display patterns having a higher clicking rate alone by monitoring the clicking rate of the plurality of display patterns.

Figure 4:
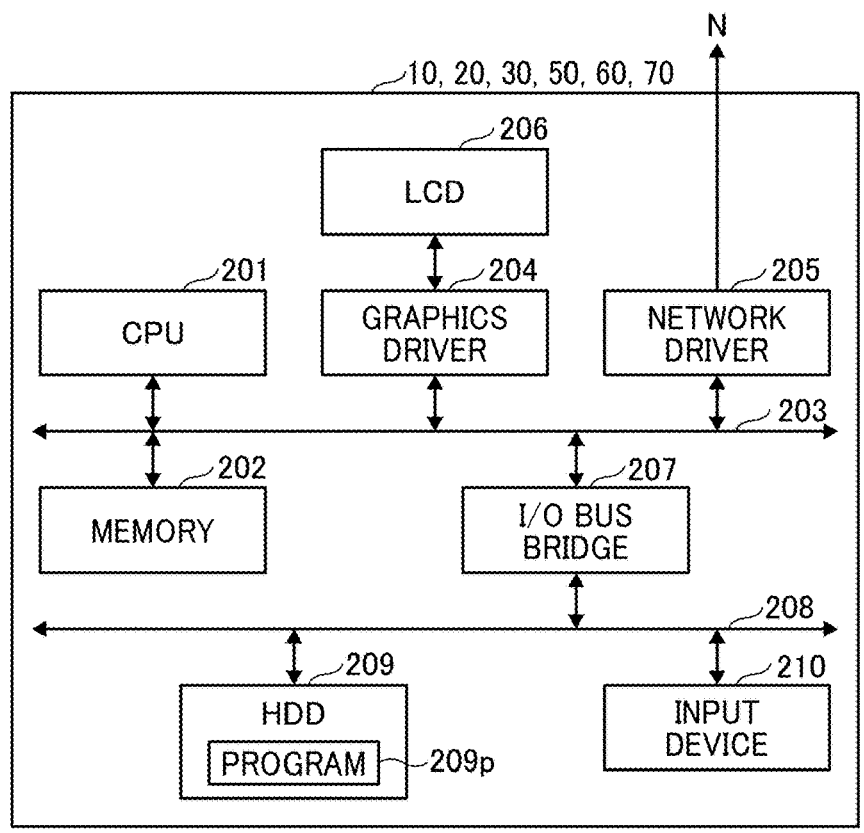
FIG. 4 illustrates an example of a hardware block diagram of a terminal apparatus, an advertiser web server, a partner site web server, a demand-side platform (DSP), a supply side platform (SSP), and an image distribution apparatus.

Hardware Configuration:

FIG. 4 illustrates an example of a hardware block diagram of the terminal apparatus 30. The terminal apparatus 30 may be implemented using a personal computer, a workstation, or an appliance server. As illustrated in FIG. 4, the terminal apparatus 30 includes, for example, a central processing unit (CPU) 201, and a memory 202 enabling high-speed accessing of data used by the CPU 201. The CPU 201 and the memory 202 are connected to other devices or drivers in the terminal apparatus 30, such as a graphics driver 204 and a network driver 205 (e.g., network interface card) via a system bus 203.

The graphics driver 204 is connected to a liquid crystal display (LCD) 206, used as a display, via a bus such as monitor a processing result of the CPU 201 using the LCD 206. The LCD 206 may integrally include a touch panel. In this case, a viewer person can perform an operation on the terminal apparatus 30 using a finger as an operation device.

The network driver 205 connects the terminal apparatus 30 to the network N at the levels of the transport layer and the physical layer level, to establish a session with the advertiser web server 70 or the like.

The system bus 203 is further connected with an input/output (I/O) bus bridge 207. A storage device such as a hard disk drive (HDD) 209 is connected to the downstream side of the I/O bus bridge 207 via an I/O bus 208 such as peripheral component interconnect (PCI) via an integrated development environment (IDE), advanced technology attachment (ATA), advanced technology attachment packet interface (ATAPI), Serial ATA, small computer system interface (SCSI), universal serial bus (USB) and the like. Instead of the HDD 209, a solid state drive (SSD) may be provided, or both of the SSD and the HDD 209 may be provided.

The HDD 209 stores program 209p used for controlling the terminal apparatus 30 entirely. The program 209p includes, for example, the browser 8, and the screen-configuring information transmitted from the advertiser web server 70, the partner site web server 60, and the DSP 20. The terminal apparatus 30 executes the browser 8, and the display program and the operation history program included the screen-configuring information.

The program 209p further includes, for example, the advertisement tag, the access information 1 and 2, and the like.

The I/O bus 208 is connected to an input device 210, such as a keyboard and a mouse (referred to as a pointing device) via a bus such as USB. The input device 210 receives inputs and commands by an operator such as a viewer person.

The hardware configuration of the advertiser web server 70, the partner site web server 60, the SSP 50, the DSP 20, and the image distribution apparatus 10 are same as the configuration of FIG. 4, or may be different for some portions without causing problems for the description of the embodiment. Preferably, the advertiser web server 70, the partner site web server 60, the DSP 20, and the image distribution apparatus 10 are compatible with the cloud computing. The cloud computing means one or more resources such as hardware resources on the network are used collectively and, cooperatively. When the cloud computing is used, the hardware configuration illustrated in FIG. 4 is not required to be disposed in one casing or one apparatus. The hardware configuration of FIG. 4 indicates hardware resources preferably disposed in the advertiser web server 70, the partner site web server 60, the DSP 20, and the image distribution apparatus 10. Further, when the cloud computing is used, the hardware configuration of the advertiser web server 70, the partner site web server 60, the DSP 20, and the image distribution apparatus 10 can be configured by dynamically connecting and disconnecting hardware resources depending on processing loads or the like.

Figure 5:
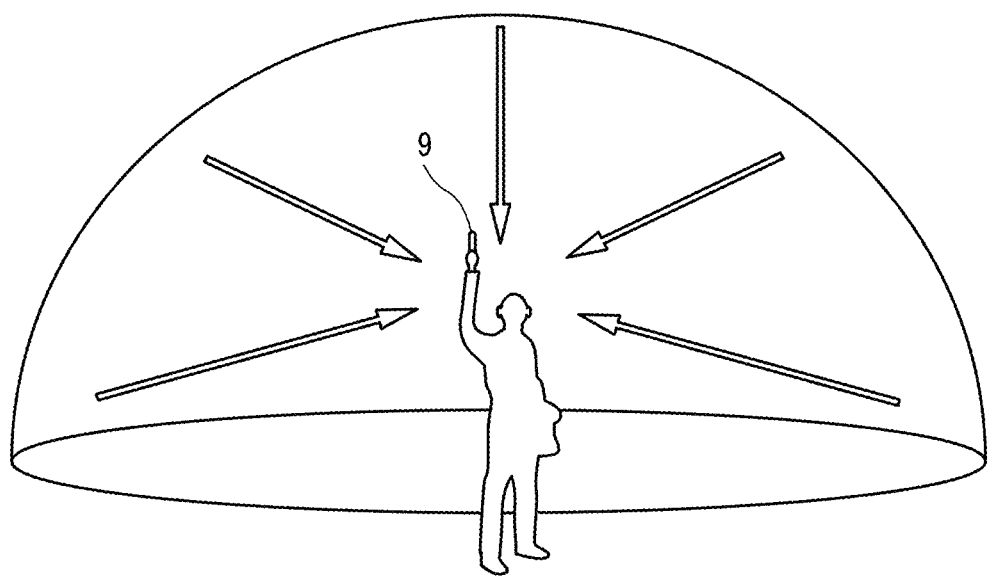
FIG. 5 illustrates a scheme of use of a full-view spherical camera.

Full-View Spherical Image:

Hereinafter, a description is given of the full-view spherical image 6 with reference to FIGS. 5 to 8. FIG. 5 illustrates a scheme of use of a full-view spherical camera 9. As illustrated in FIG. 5, a user holding or carrying the full-view spherical camera 9 in his or her hand captures images of one or more objects around the user using the full-view spherical camera 9. The full-view spherical camera 9 is configured by two image capture elements opposed to each other in a casing, and two hemispherical images are acquired by capturing the images of one or more objects around the user using the two image capture elements.

Hereinafter, a description is given of a scheme of generating the full view spherical image 6 from images captured by the full-view spherical camera 9 with reference to FIGS.

Figure 6A:
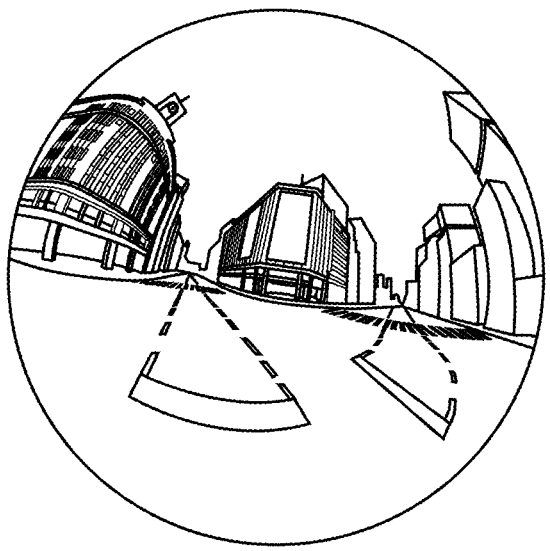
FIGS. 6A, 6B and 6C illustrate a scheme of generating a full view spherical image from hemispherical images captured by a full-view spherical camera.
Figure 6B:
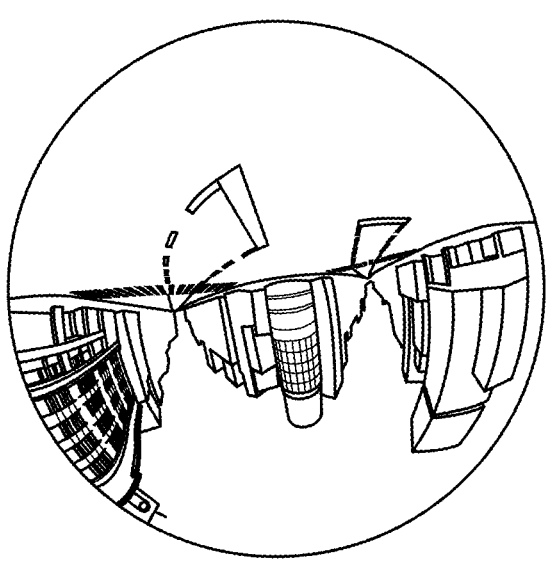
Figure 6C:
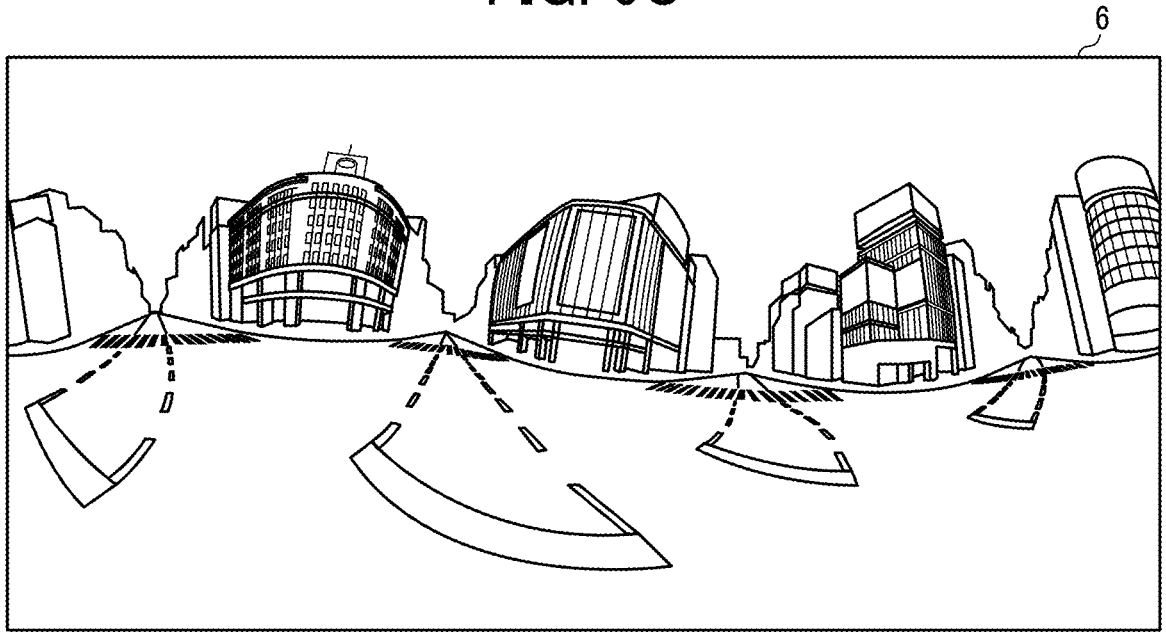

6 and 7. FIG. 6A illustrates one hemispherical image at a front side captured by the full-view spherical camera 9. FIG. 6B illustrates another hemispherical image at a rear side captured by the full-view spherical camera 9. FIG. 6C illustrates an image expressed by using the Mercator method (hereinafter, Mercator image) or the equirectangular projection method (hereinafter, "equirectangular projection image"). FIG. 7A illustrates a schematic view that a sphere is covered by the equirectangular projection image. FIG. 7B illustrates an example of the full view spherical image 6.

As illustrated in FIG. 6A, one image captured by the full-view spherical camera 9 becomes the hemispherical image at the front side, which is curved by one fisheye lens. Further, as illustrated in FIG. 6B, another image captured by the full-view spherical camera 9 becomes the hemispherical image at the rear side, which is curved by another fisheye lens. Then, the hemispherical image at the front side and another hemispherical image at the rear side, which are reversed for 180 degrees, are synthesized by the full-view spherical camera 9 to generate the equirectangular projection image as illustrated in FIG. 6C.

Then, when Open Graphics Library for Embedded Systems (OpenGL ES: registered trademark) is applied, the equirectangular projection image is transferred on a sphere by covering the sphere as illustrated in FIG. 7A, and then the full view spherical image 6 is generated as illustrated in FIG. 7B. As indicated in FIG. 7B, the full view spherical image 6 is expressed as an image that the equirectangular projection image is directed toward the center of the sphere. The OpenGL ES is a graphics library used for visualizing two-dimensional (2D) data and three-dimensional (3D) data. The full-view spherical image 6 can be either a still image or a movie image.

The advertisement data distributed by the image distribution apparatus 10 includes the full-view spherical image 6. Since an image transferred on a surface of the sphere by covering the sphere becomes the full view spherical image 6 such as a curved image, when a viewer person sees the full view spherical image 6, the viewer person may feel a sense of incongruity. Therefore, the terminal apparatus 30 displays the target region T, which is a part of the full view spherical image 6, as a plane image reducing curvature so that the viewer person may not feel the sense of incongruity. The target region T is defined by coordinates of (X, Y, Z) in a virtual three-dimensional space. Since the LCD 206 is a two-dimensional plane, the terminal apparatus 30 cannot display the target region T defined in the virtual three-dimensional space. Therefore, the terminal apparatus 30 acquires the target image T using the 3D computer graphics technique such as a perspective projection transformation method that projects a three-dimensional object on the two-dimensional plane. With this configuration, the target region T in the full view spherical image 6 illustrated in FIG. 1 can be displayed on the LCD 206 as a region image.

Figure 8:
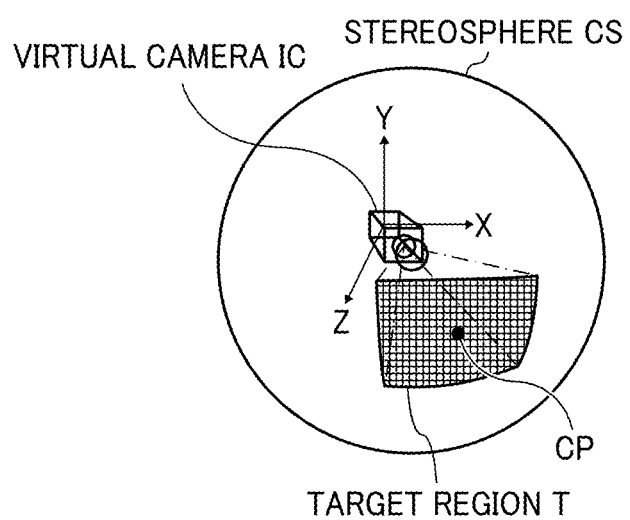
FIG. 8 illustrates an example of a gaze direction of a viewer person.

FIG. 8 illustrates an example of a gaze direction of a viewer person. Since the full-view spherical image 6 has three-dimensional coordinates, the gaze direction can be identified by information specifying coordinates on a sphere, such as coordinates in the three-dimensional space, and the latitude and longitude in the three-dimensional space. In the embodiment, the center "cp" of the target region T is set as the gaze direction.

The gaze direction can be changed by a viewer person by performing an operation. If it is assumed that the virtual camera IC does not move in a parallel direction, the virtual camera IC can rotate as a rigid body with three patterns such as roll (i.e., rotation about the Z-axis), yaw (i.e., rotation about the Y axis), and pitch (i.e., rotation about the X axis). When any one of the three rotations occur, the gaze direction changes. For example, when the viewer person rotates the full view spherical image 6 along the horizontal direction, the yaw angle changes, when the viewer person rotates the full view spherical image 6 in the vertical direction change, the pitch angle changes, and when the viewer person rotates the full view spherical image 6 about the center of the LCD 206, the roll angle changes In the embodiment, the operation performed by the viewer person on a web page triggers the change of the gaze direction (e.g., roll angle, yaw angle, pitch angle). It is assumed that the display program includes descriptions how to change the gaze direction depending on the operation performed on the web page.

Figures 9, 9A, 9B:
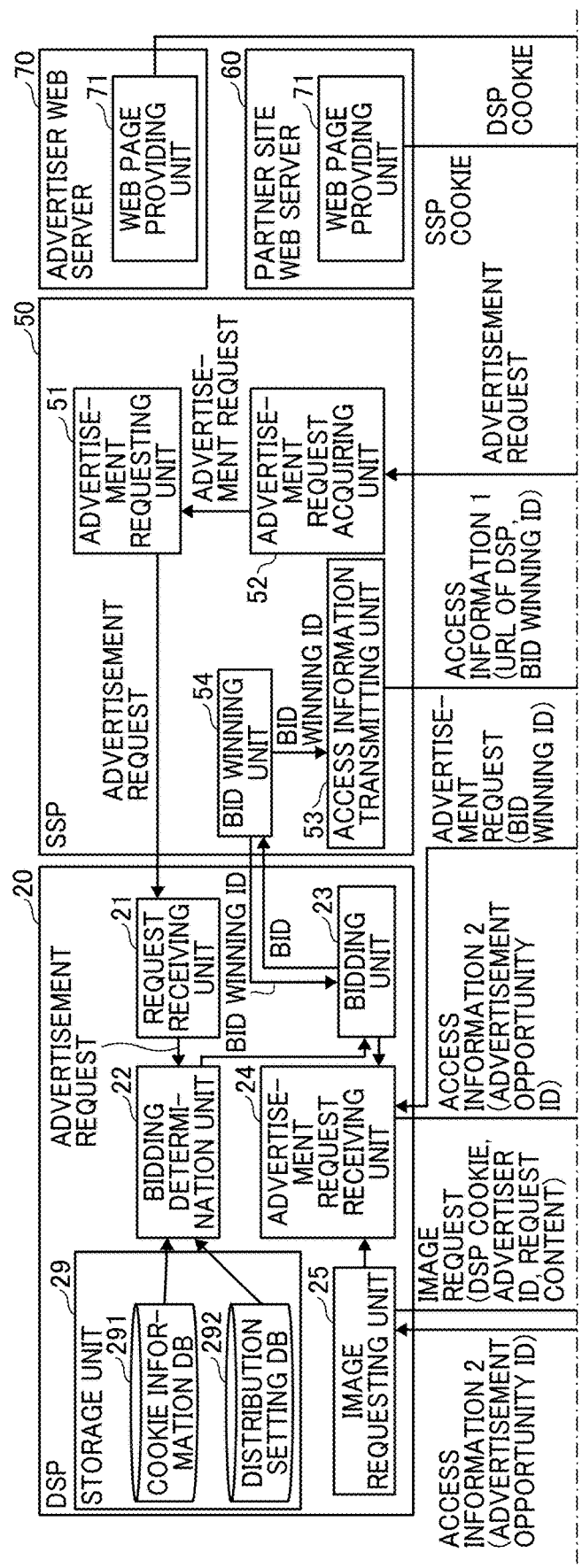
FIGS. 9A and 9B illustrate an example of a functional block diagram of a terminal apparatus, an advertiser web server, a partner site web server, an image distribution apparatus, an SSP and a DSP of a first embodiment.
Figure 9B:
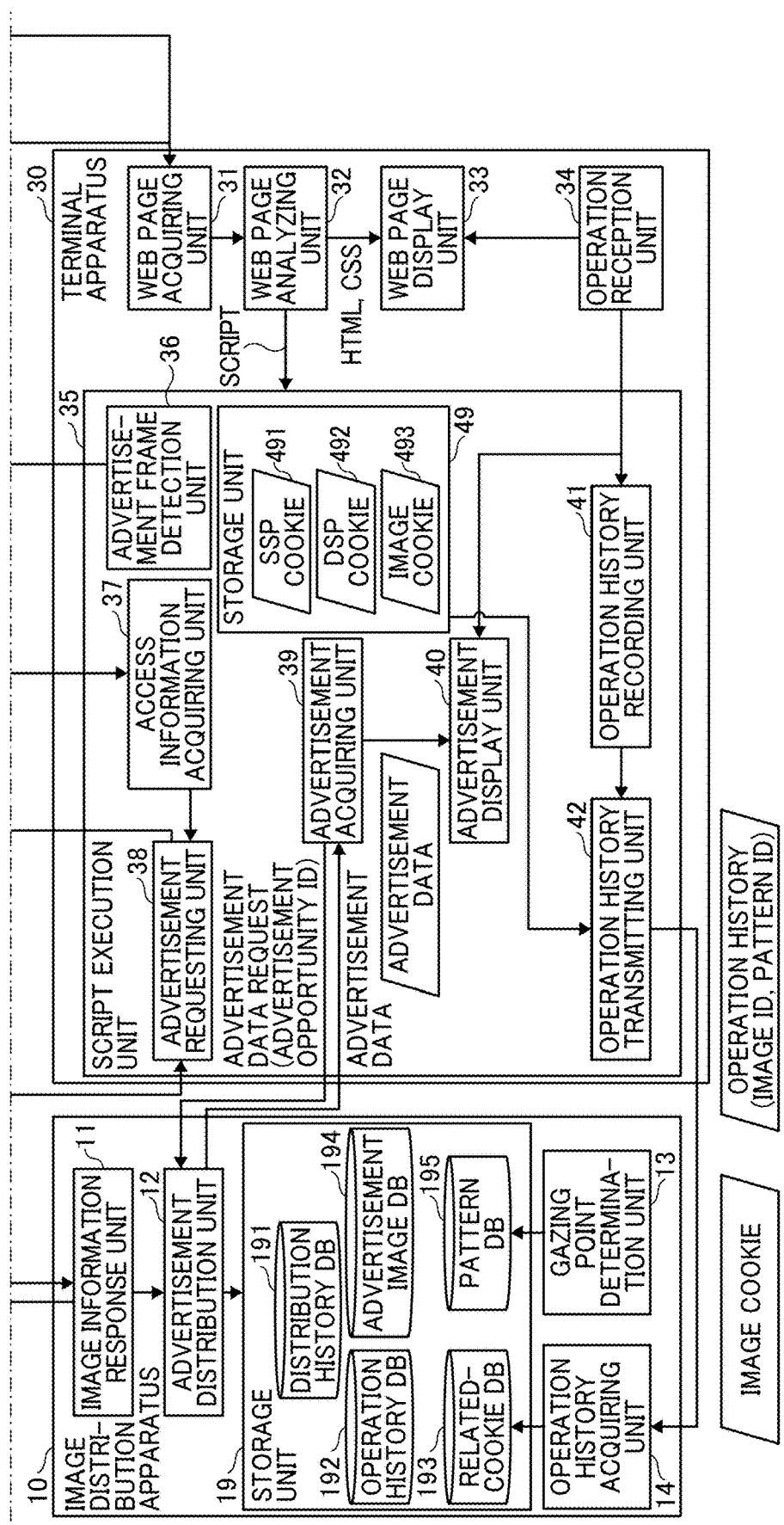

Function:

FIGS. 9A and 9B illustrate an example of a functional block diagram of the terminal apparatus 30, the advertiser web server 70, the partner site web server 60, the image distribution apparatus 10, the SSP 50, and the DSP 20.

Advertiser Web Server/Partner Site Web Server:

As illustrated in FIG. 9, each of the advertiser web server 70 and the partner site web server 60 includes, for example, a web page providing unit 71. Each of functions of the advertiser web server 70 and the partner site web server 60 is a functional unit or means implemented by executing the program 209p, loaded from the HDD 209 to the memory 202, using the CPU 201.

For example, the web page providing unit 71 performs a HTTP communication, configures a web page based on a request for the web page received from the terminal apparatus 30, and transmits the web page to the terminal apparatus 30. If necessary, the web page providing unit 71 requests processing to an application server, receives a processing result from the application server, and then applies the processing result to the web page, and transmits the web page to the terminal apparatus 30. The web page provided by the advertiser web server 70 includes the advertiser cookie and the DSP cookie. This is because the advertiser web server 70 requests the DSP 20 to distribute the advertisement. With this configuration, the retargeting (or behavioral retargeting) advertising can be performed. The web page provided by the partner site web server 60 includes the cookie of the partner site web server 60 and the SSP cookie. This is because the partner site web server 60 requests the SSP 50 to sell the advertisement frame 7. The web page providing unit 71 is implemented by executing the program 209p using the CPU 201 illustrated in FIG. 4.

SSP:

As illustrated in FIG. 9, the SSP 50 includes, for example, an advertisement request acquiring unit 52, an advertisement requesting unit 51, an access information transmitting unit 53, and a bid winning unit 54. Each of functions of the SSP 50 is a functional unit or means implemented by executing the program 209p, loaded from the HDD 209 to the memory 202, using the CPU 201.

The advertisement request acquiring unit 52 acquires an advertisement request with the SSP cookie from the terminal apparatus 30 when the terminal apparatus 30 executes the advertisement tag associated with the advertisement frame 7. Then, the advertisement request acquiring unit 52 transmits the advertisement request including the SSP cookie to the advertisement requesting unit 51. The advertisement request acquiring unit 52 is implemented by executing the program 209p using the CPU 201 of FIG. 4.

The advertisement requesting unit 51 transmits the advertisement request to the DSP 20. The advertisement request includes, for example, the SSP cookie, a domain of the partner site web server 60, an advertisement frame ID, an advertisement frame size, an advertisement format, a browser type, and an operating system (OS) type. The advertisement requesting unit 51 is implemented by executing the program 209p using the CPU 201 of FIG. 4.

The bid winning unit 54 receives a bid from the DSP 20, and performs the auction to sell the advertisement frame 7 to the DSP 20 setting the highest bidding amount in most of cases. However, the bid winning unit 54 may not receive bids depending on products or services of advertisers. The bid winning unit 54 generates a bid winning ID, and notifies the bid winning ID to the DSP 20. The bid winning unit 54 is implemented by executing the program 209p using the CPU 201 of FIG. 4.

The access information transmitting unit 53 generates the access information 1 used for requesting an advertisement to the DSP 20, which has won the bid, and transmits the access information 1 to the terminal apparatus 30. The access information 1 includes a uniform resource locator (URL), such as Internet protocol (IP) address, of the DSP 20. The access information transmitting unit 53 is implemented by executing the program 209p using the CPU 201 of FIG. 4.

DSP:

As illustrated in FIG. 9, the DSP 20 includes, for example, a request receiving unit 21, a bidding determination unit 22, a bidding unit 23, an advertisement request receiving unit 24, an image requesting unit 25, and a storage unit 29. Each of functions of the DSP 20 is a functional unit or means implemented by executing the program 209p, loaded from the HDD 209 to the memory 202, using the CPU 201.

Further, a cookie information DB 291 and a distribution setting DB 292 are set in the storage unit 29. The storage unit 29 is implemented by the HDD 209 or the memory 202 of FIG. 4.

TABLE 1

| Cookie Information DB | | | |
|---|---|---|---|
| DSP cookie | SSP cookie | Visit Domain 1 | Visit Domain 2 |
| 1234 | ABCD | zzz.com | xxx.com |
| 2345 | BCDE | yyy.com | vvv.com |
| — | — | — | — |

Table 1 schematically illustrates information stored in the cookie information DB 291. The cookie information DB 291 associates the DSP cookie and the SSP cookie, and registers a visit domain visited by a specific viewer person. The association of DSP cookie and SSP cookie can be performed using a technique referred to as the cookie sync. The visit domain is acquired when the specific viewer person visits a specific web site attached with a tag (e.g., action monitoring tag) by the DSP 20. Therefore, the DSP 20 can identify the DSP cookie from the SSP cookie, and can determine which web site is interested by the specific viewer person.

TABLE 2

| Distribution Setting DB | | |
|---|---|---|
| Advertiser ID | Attribute of Target of Advertisement | Attribute of Non-Target of Advertisement |
| 001 | Male<br>Age: 30s<br>17:00-24:00 | Minors |

TABLE 2-continued

| Distribution Setting DB | | |
|---|---|---|
| Advertiser ID | Attribute of Target of Advertisement | Attribute of Non-Target of Advertisement |
| 002 | Female<br>Age: 30s-60s<br>10:00-17:00 | Male |
| — | — | — |

Table 2 schematically illustrates information stored in the distribution setting DB 292. The distribution setting DB 292 registers an advertiser ID, an attribute of target of advertisement, which means an attribute of relevant target person, or an attribute of relevant or preferred person that the advertiser wants to deliver the advertisement, and an attribute of non-target of advertisement, which means an attribute of irrelevant target person, or an attribute of an irrelevant or non-preferred person that the advertiser does not want to deliver the advertisement. The advertiser ID is identification information identifying or specifying an advertiser serving as a provider that provides images, such as wide-angle images With this configuration, the DSP 20 or the image distribution apparatus 10 can determine whether or not transmitting the wide-angle image by referring the attribute of relevant target person, the attribute of irrelevant target person set for the provider of the wide-angle image, or both of them.

The ID is an abbreviation of identification, and it means identifier or identification information. The ID employs, for example, a name, a sign, a string of characters, a numerical value, or a combination of one or more of these for uniquely distinguishing a specific target from a plurality of targets. The same is applied to the following IDs. The attribute of advertisement target is the attribute of viewer person to whom an advertiser wants to distribute the advertisement, and the attribute of non-advertisement target is the attribute of viewer person to whom the advertiser does not want to distribute the advertisement. The DSP 20 compares the attribute of viewer person determined by the cookie information DB 291 and the information of the distribution setting DB 292 to obtain the attribute of viewer person as a numerical value, and determines the bid amount. When determining the bid amount, various information may be considered, such as a time slot, day of the week, the region of viewer person, or the like.

Function of DSP:

As illustrated in FIG. 9, the request receiving unit 21 receives the advertisement request from the SSP 50. The request receiving unit 21 receives basic information, such as the advertisement frame ID of the terminal apparatus 30, from the acquired advertisement request. The request receiving unit 21 is implemented by executing the program 209p using the CPU 201 of FIG. 4.

The bidding determination unit 22 evaluates the advertisement request, received via the request receiving unit 21, by referring the cookie information DB 291 and the distribution setting DB 292 to determine the bid amount. However, the bidding determination unit 22 may not perform the bidding in some cases. As described above, the DSP cookie is identified from the SSP cookie, and then the bid amount is determined in accordance with a matching or similarity level between the information of the attribute of the viewer person associated with the DSP cookie stored in the cookie information DB 291 and the attribute of advertisement target person and/or the attribute of non-advertisement target person stored in the distribution setting DB 292 set based on the advertiser's intension. The bidding determination unit 22 is implemented by executing the program 209p using the CPU 201 of FIG. 4.

The bidding unit 23 bids the SSP 50 with the determined bid amount. The bidding unit 23 is implemented by executing the program 209p using the CPU 201 of FIG. 4. If the bid is successful, the bidding unit 23 acquires the bid winning ID, and associates the bid winning ID with the advertisement request.

The advertisement request receiving unit 24 acquires the advertisement request including the bid winning ID and DSP cookie from the terminal apparatus 30 based on the access information 1. The advertisement request receiving unit 24 identifies the advertisement request based on the bid winning ID. The DSP cookie can be omitted in some cases. The DSP cookie is used when the SSP cookie and the DSP cookie are not associated with each other. The advertisement request receiving unit 24 is implemented by executing the program 209p using the CPU 201 of FIG. 4.

The image requesting unit 25 requests the access information 2 to the image distribution apparatus 10 together with the DSP cookie, the advertiser ID, and a request content. The advertiser is identified by the advertiser ID. The advertisement frame 7 is identified by the advertisement frame ID of the request content. Further, the attribute of viewer person may be transmitted to the image distribution apparatus 10 from the image requesting unit 25. With this configuration, the image distribution apparatus 10 can distribute the full-view spherical image 6 matched to the attribute of viewer person. The image requesting unit 25 is implemented by executing the program 209p using the CPU 201 of FIG. 4.

Terminal Apparatus:

The terminal apparatus 30 includes, for example, a web page acquiring unit 31, a web page analyzing unit 32, a web page display unit 33, an operation reception unit 34, and a script execution unit 35. Each of functions of the terminal apparatus 30 is a functional unit or means implemented by executing the program 209p, loaded from the HDD 209 to the memory 202, using the CPU 201.

The operation reception unit 34 receives various operations performed to the terminal apparatus 30. Specifically, the operation reception unit 34 receives an operation performed to a browser executed by the terminal apparatus 30. When a web page includes a program described in a script language, such as the above script language, the operation reception unit 34 receives an operation performed for the web page. The performed operation is used as a trigger of activating the script program. In the embodiment, an operation performed to the terminal apparatus 30, an operation performed to the browser, and an operation performed to the web page are not strictly distinguished each other, but the operation performed to the terminal apparatus 30, the operation performed to the browser, and the operation performed to the web page may be assumed as the substantially similar operation. The operation reception unit 34 is implemented by executing the program 209p, and controlling the input device 210 and the touch panel using the CPU 201 of FIG. 4.

The web page acquiring unit 31 communicates with the advertiser web server 70 and the partner site web server 60 based on the operation of the viewer person and/or the activation of the script, and acquires a web page from the advertiser web server 70 and the partner site web server 60. The web page acquiring unit 31 is implemented by executing the program 209p and controlling the network driver 205 using the CPU 201 of FIG. 4.

The web page analyzing unit 32 reads HTML included in the screen-configuring information from the beginning of the HTML sequentially, and analyzes a structure of text included in the HTML and image data. Further, the web page analyzing unit 32 detects an association of the text included in HTML described in CSS and the image data, and associates the text included in HTML and a style of the image data. Further, the web page analyzing unit 32 detects a script tag from the HTML to extract a script described in a script language. The web page analyzing unit 32 transmits the HTML and CSS to the web page display unit 33, and transmits the script to the script execution unit 35. The web page analyzing unit 32 is implemented by executing the program 209p using the CPU 201 of FIG. 4.

The web page display unit 33 displays the web page on the LCD 206 in the order of completing the analysis that is started from the beginning of the HTML. Further, the web page display unit 33 updates the web page in accordance with the operation performed to the web page. The web page display unit 33 is implemented by executing the program 209p using the CPU 201 of FIG. 4.

The script execution unit 35 executes the script extracted by the web page analyzing unit 32. Specific contents of the script vary depending on the web page. In the embodiment, the advertisement tag associated with the advertisement frame 7, the access information 1 acquired from the SSP 50, the access information 2 acquired from the DSP 20, and the advertisement data distributed from the image distribution apparatus 10 are detected as the script. The script execution unit 35 is implemented by executing the program 209p using the CPU 201 of FIG. 4.

As illustrated in FIG. 4, the script execution unit 35 includes, for example, an advertisement frame detection unit 36, an access information acquiring unit 37, an advertisement requesting unit 38, an advertisement acquiring unit 39, an advertisement display unit 40, an operation history recording unit 41, an operation history transmitting unit 42, and a storage unit 49. Each of the functional units or means of the script execution unit 35 is implemented by executing the script using the CPU 201.

The advertisement frame detection unit 36 is a functional unit, which is implemented when the terminal apparatus 30 executes the advertisement tag associated with the advertisement frame 7 included in the screen-configuring information acquired by the web page acquiring unit 31. The advertisement frame detection unit 36 transmits the advertisement request to the SSP 50 together with the SSP cookie based on the URL associated with the advertisement frame 7.

The access information acquiring unit 37 acquires the access information 1 from the SSP 50. The access information 1 is described in the script language.

The advertisement requesting unit 38 accesses the DSP 20 based on the URL included in the access information 1, and requests the advertisement to the DSP 20 together with the bid winning ID and the DSP cookie. Then, the advertisement requesting unit 38 acquires the access information 2 and advertisement opportunity ID from the DSP 20 as a response of the request to the DSP 20. The access information 2 is also described in the script language.

Based on the URL of the image distribution apparatus 10 included in the access information 2, the advertisement acquiring unit 39 requests the advertisement data to the image distribution apparatus 10 by designating the advertisement opportunity ID. Since the image distribution apparatus 10 is configured to generate the advertisement data, the advertisement acquiring unit 39 acquires the advertisement data from the image distribution apparatus 10. In the embodiment, the advertisement data includes, for example, the full-view spherical image 6, the display pattern, the display program, and the operation history program. The operation history program is used to transmit the operation history to the image distribution apparatus 10 from the terminal apparatus 30. The display program is executed to rotate the full-view spherical image 6 based on the display pattern, and to change a display mode (presentation mode) of the full-view spherical image 6 depending on the operation performed to the full-view spherical image 6. The operation history program and the display program are also described in the script language, and executed by the script execution unit 35.

The advertisement display unit 40 displays the advertisement data acquired from the image distribution apparatus 10. The advertisement display unit 40 is implemented, for example, by executing the display program. The advertisement display unit 40 displays the full-view spherical image 6 (i.e., advertisement) on the advertisement frame 7, and automatically rotates the full-view spherical image 6 among a plurality of the gazing points. Further, the display mode (presentation mode) of the full-view spherical image 6 can be changed in accordance with the operation performed to the full-view spherical image 6.

By acquiring the advertisement data from the image distribution apparatus 10, the terminal apparatus 30 can acquire the image cookie of the image distribution apparatus 10 and store the image cookie in the storage unit 49. By transmitting the image cookie to the image distribution apparatus 10 using the advertisement acquiring unit 39, the DSP cookie and the image cookie can be associated with each other in the image distribution apparatus 10.

The operation history recording unit 41 is implemented, for example, by executing the operation history program, and records operation information, which is information of operations performed on the full-view spherical image 6, as the operation history. The detail of the operation history is to be described later with reference to the image distribution apparatus 10.

The operation history transmitting unit 42 is implemented, for example, by executing the operation history program. The operation history transmitting unit 42 transmits the operation history performed to the full-view spherical image 6 displayed on the advertisement frame 7 to the image distribution apparatus 10 with the image cookie and the image ID used for identifying the full-view spherical image 6. Further, when a clicking operation is performed on the full-view spherical image 6, the operation history transmitting unit 42 further transmits a clicking operation history to the image distribution apparatus 10 together with the display pattern.

Image Distribution Apparatus:

As illustrated in FIG. 9B, the image distribution apparatus 10 includes, for example, an image information response unit 11, an advertisement distribution unit 12, a gazing point determination unit 13, and an operation history acquiring unit 14. The image distribution apparatus 10 may further include an operation history analysis unit. Each of functions of the image distribution apparatus 10 is a functional unit or means implemented by executing the program 209p, loaded from the HDD 209 to the memory 202, using the CPU 201.

The image distribution apparatus 10 further includes a storage unit 19, implemented by the HDD 209 or the memory 202 of FIG. 4. The storage unit 19 stores, for example, a distribution history DB 191, an operation history DB 192, a related-cookie DB 193, an advertisement image DB 194, and a pattern DB 195.

TABLE 3

Operation History DB

| Image ID | Browsing Time | Image Cookie | Browsing Angle 1 | Browsing Angle 2 | Browsing Angle 3 |
|---|---|---|---|---|---|
| G001-1 | 2017/10/10 12:20 | cookie name; cookie value; effective period; domain | (Xs1, Ys1) (Xe1, Ye1) enlargement: yes; reduction of browsing angle after enlargement: no; still time: 10 secs | (Xs2, Ys2) (Xe2, Ye2) enlargement: no; reduction of browsing angle after enlargement: yes; still time: 5 secs | (Xs3, Ys3) (Xe3, Ye3) enlargement: yes; reduction of browsing angle after enlargement: no; still time: 3 secs |
| — | — | — | — | — | — |

Table 3 schematically illustrates information stored in the operation history DB 192. The operation history DB 192 records a history of the operation performed by each viewer person on the full-view spherical image 6. For example, the operation history DB 192 records an image ID, browsing time, image cookie, and browsing angles 1 to 3. The image ID is information identifying the full-view spherical image 6. The image cookie is information identifying the identity of a viewer person operating the terminal apparatus 30 or the identity of the terminal apparatus 30, which is an example of apparatus identification information. The browsing angles 1 to 3 are defined by the angle of view used by the viewer person to browse the full-view spherical image 6. Each of the browsing angles 1 to 3 stores, for example, browsing time, enlargement (yes/no), angle of view after enlargement, and reduction (yes/no). In this way, the angle of view that was considered to attract the interest of the viewer person is recorded for each image. Each of the browsing angles 1 to 3 indicates the angle of view that the viewer person does not rotate the full-view spherical image 6 for a given time (e.g., one second) or more. The operation history recording unit 41 of the terminal apparatus 30 records, for example, the angle of views corresponding to the top three of the still time, but not limited thereto. The operation history recording unit 41 of the terminal apparatus 30 can record one angle of view, or four angles of views or more. Similarly, the operation history recording unit 41 records whether the viewer person enlarged or reduced the image at each of the browsing angles 1 to 3. The image distribution apparatus 10 may use the operation history to set the gazing point P. Further, if the image cookie is associated with the image ID, the retargeting (or behavioral retargeting) advertising can be performed. Further, the angle of view corresponding to the clicking operation may be recorded as the operation history.

image cookie is notified from the terminal apparatus 30. By associating the DSP cookie and the image cookie, the image distribution apparatus 10 can determine the viewer person using the DSP cookie alone.

TABLE 6

Pattern DB

| Image ID | Pattern ID | Display Pattern | Combination of Angle of View of Coordinates 1 to 4, Each Angle Changeable in Three Steps | Number of Clicks (Total: 81) | | |
|---|---|---|---|---|---|---|
| G001-1 | P001 | coordinates 1→2→3→4 | coordinates: 1 (large, middle, small); 2 (large, middle, small); 3 (large, middle, small); 4 (large, middle, small). Total: 81 combinations | 5 9 2 6 1 | 8 3 6 5 4 | 19 11 — — 3 |
| | P002 | coordinates 1→2→4→3 | same as above | — | | |
| | P003 | coordinates 1→3→2→4 | same as above | — | | |
| | P004 | coordinates 1→3→4→2 | same as above | — | | |
| — | — | — | — | — | | |

TABLE 4

Advertisement Image DB

| Advertiser ID | Image ID | Priority | Attribute of Target of Advertisement |
|---|---|---|---|
| 001 | G001-1 | A | Male/Married/30s |
| | G001-2 | C | Female/Single/40s |
| | G001-3 | B | Male/Single/20s |
| — | — | — | — |
| 002 | G002-1 | A | Female/Single/30s |
| | — | — | — |

Table 4 schematically illustrates information stored in the advertisement image DB 194. The advertisement image DB 194 registers information related to the full-view spherical image 6 used as the to-be-advertised image. The advertisement image DB 194 registers, for example, advertiser ID, image ID, priority, and the attribute of target of advertisement (i.e., relevant target person) by associating these data. The advertiser is determined by the DSP 20. Therefore, among the images to be distributed by the advertiser, the images to be distributed are determined based on at least one of the priority set in Table 4 and the matching or similarity level of the attribute of viewer person and the attribute of the relevant target person set in Table 4. In a case of the retargeting advertising, images associated with the image cookie in the operation history DB 192 are distributed.

TABLE 5

Related-Cookie DB

| DSP Cookie | Image Cookie |
|---|---|
| 1234 | 12AB |
| 2345 | 34CD |
| — | — |

Table 5 schematically illustrates information stored in the related-cookie DB 193. The related-cookie DB 193 stores the DSP cookie and the image cookie associated with each other. The DSP cookie is notified from the DSP 20, and the Table 6 schematically illustrates information registered in the pattern DB 195. The pattern DB 195 registers, for example, one or more combinations of the display order of the gazing point P and the angle of view of the gazing point P of the full-view spherical image 6. The combination of the display order and the angle of view is referred to as a display pattern or presentation pattern. In Table 6, four coordinates 1 to 4 are set as the gazing points P. The number of the gazing points P may be four or more for one full-view spherical image 6, or may be three or less, or five or more. Further, the number of the gazing points P may vary depending on the full-view spherical image 6.

The display pattern indicates the display order of the coordinates 1 to 4. Therefore, when the number of the gazing points P is four, the number of patterns of the display order becomes the factorial of 4, that is 4×3×2×1=24. Further, when the angle of view of each gazing point P is changed in, for example, three steps, the number of patterns of the angle of view becomes 3 to the power of four, that is $3^4$=81). Therefore, the total of 81 combinations are set for the angle of view with respect to one display order. Therefore, the number of display patterns for one full-view spherical image becomes "24×81."

The number of times of clicking operation indicates the number of times that the viewer person clicks each display pattern. The clicking operation (click) is an example of specific operations performed on the full-view spherical image 6 in this description. That is, the image distribution apparatus 10 can use a plurality of terminal apparatuses 30 to display the full-view spherical image 6 (i.e., same full-view spherical image) on the plurality of terminal apparatuses 30 using the same display pattern, and each of the terminal apparatuses 30 records the clicking operation. With this configuration, the distribution using a display pattern having a lower clicking rate can be reduced by checking the number of times of the performed clicking operation. Further, it is preferable that the number of times of clicking operation is recorded for each attribute of viewer person, such as sex, age, and family member. With this configuration, the full-view spherical image 6 can be displayed using the display pattern having a relatively large number of times of clicking operation with respect to the attribute of viewer person.

TABLE 7

Distribution History DB

| Image Cookie | Image ID | Display Pattern used for Distribution | Clicking (yes/no) |
|---|---|---|---|
| 12AB | G001-1 | P001 | NO |
| 34CD | G001-1 | P002 | NO |
| — | — | — | — |

Table 7 schematically illustrates information registered in the distribution history DB 191. The distribution history DB 191 registers, for example, image cookie, image ID, and display pattern of the full-view spherical image 6 distributed by being associated with the image cookie, and clicking (yes/no). If the image cookie is already registered in the terminal apparatus 30 when the image distribution apparatus 10 transmits the advertisement data, the image distribution apparatus 10 can acquire the image cookie from the terminal apparatus 30. With this configuration, the image distribution apparatus 10 can prevent the distribution of the full-view spherical image 6 (i.e., same full-view spherical image) to the same viewer person, or prevent the full-view spherical image 6 (i.e., same full-view spherical image) from being distributed using the same display pattern. Further, the image distribution apparatus 10 can perform the retargeting (or behavioral retargeting) distribution.

Function of History Management Server:

When the image distribution apparatus 10 acquires the DSP cookie, the advertiser ID, and the request content (e.g., advertisement frame ID) from the DSP 20, the image information response unit 11 assigns the advertisement opportunity ID to the DSP cookie, the advertiser ID, and the request content, and transmits the advertisement opportunity ID to the DSP 20 together with the access information 2. The advertisement distribution opportunity can be identified for each advertisement frame 7 of the terminal apparatus 30 based on the advertisement opportunity ID. The image information response unit 11 is implemented by executing the program 209*p* using the CPU 201 of FIG. 4.

When the terminal apparatus 30 requests the advertisement data to the image distribution apparatus 10 together with the advertisement opportunity ID, the advertisement distribution unit 12 determines the to-be-distributed full-view spherical image 6 and the display pattern of the to-be-distributed full-view spherical image 6. At first, the advertisement distribution unit 12 refers to the advertisement image DB 194 to determine the full-view spherical image 6 associated with the advertiser ID, acquired from the DSP 20. The advertisement distribution unit 12 preferably refers to the attribute of viewer person when determining the full-view spherical image 6. The attribute of viewer person may be notified from the DSP 20 to the image distribution apparatus 10, or the image distribution apparatus 10 may store the attribute of viewer person in association with the image cookie.

Then, the advertisement distribution unit 12 refers to the pattern DB 195 to determine a display pattern of the full-view spherical image 6. For example, the advertisement distribution unit 12 determines one display pattern having the highest number of times of clicking operation, or another display pattern having the number of times of clicking operation that is equal to a threshold or more from a plurality of display patterns. The advertisement distribution unit 12 preferably refers to the attribute of viewer person also when determining the display pattern. The advertisement distribution unit 12 is implemented by executing the program 209*p* and controlling the network driver 205 using the CPU 201 of FIG. 4.

The operation history acquiring unit 14 acquires the operation history from the terminal apparatus 30 together with the image cookie and the image ID, and stores the operation history in the operation history DB 192. For example, there are two types of the operation history, such as an operation history for determining the gazing point P, and an operation history for updating the clicking number (clicked operation). The operation history acquiring unit 14 is implemented by executing the program 209 *p* and controlling the network driver 205 using the CPU 201 of FIG. 4.

Further, the operation history recording unit 41 of the terminal apparatus 30 can be disposed in the image distribution apparatus 10. The operation history recording unit 41 requires operation contents operated in time series. Therefore, if the operation history recording unit 41 is disposed in the terminal apparatus 30, the image distribution apparatus 10 may not acquire the operation history effectively if the communication condition, such as communication bandwidth, between the terminal apparatus 30 and the image distribution apparatus 10 fluctuates, and causing communication error. By contrast, if the operation history recording unit 41 is disposed in the image distribution apparatus 10, the operation history transmitting unit 42 of the terminal apparatus 30 can be configured to transmit the latest operation history alone to the image distribution apparatus 10, with which the communication load between the terminal apparatus 30 and the image distribution apparatus 10 can be reduced.

The gazing point determination unit 13 determines the gazing point P of the full-view spherical image 6. The gazing point determination unit 13 determines the gazing point P using any method to described later. The gazing point determination unit 13 registers the display pattern using the determined gazing point P in the pattern DB 195. The gazing point determination unit 13 is implemented by executing the program 209*p* using the CPU 201 of FIG. 4.

Figure 10:
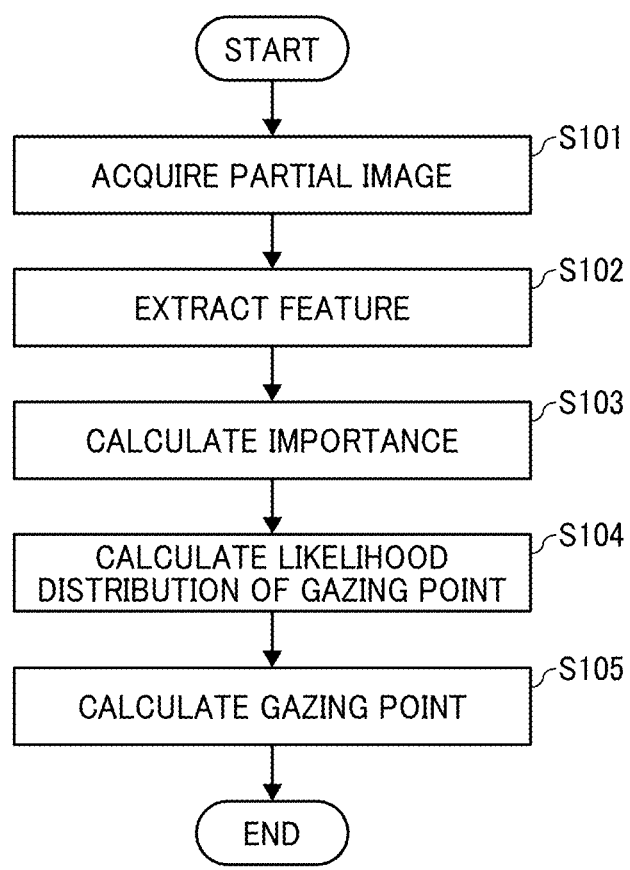
FIG. 10 is an example of a flowchart illustrating the steps of determining a gazing point using a gazing point determination unit.

Determination of Gazing Point:

Method of Determining Gazing Point from Feature Value:

FIG. 10 is an example of a flowchart illustrating the steps of determining the gazing point P using the gazing point determination unit 13.

Figure 11A:
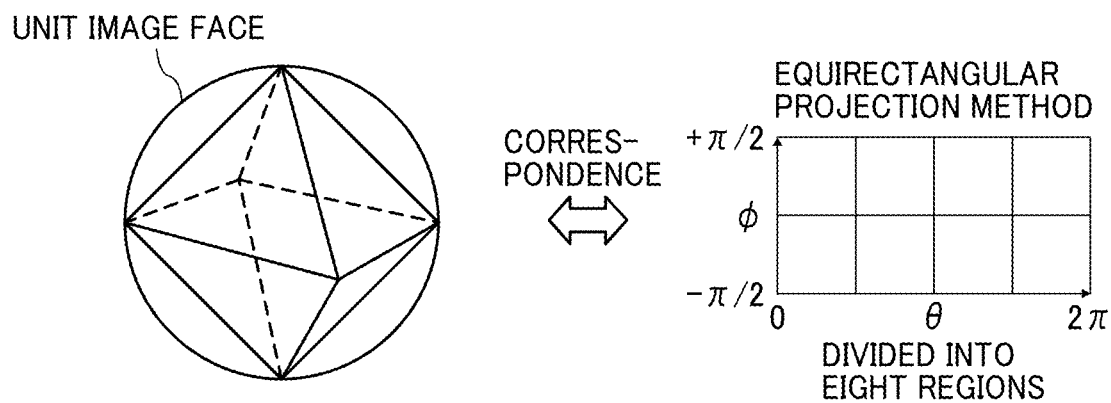
FIG. 11A illustrates an example of defining a regular octahedron as a projection plane of a full-view spherical image.
Figure 11B:
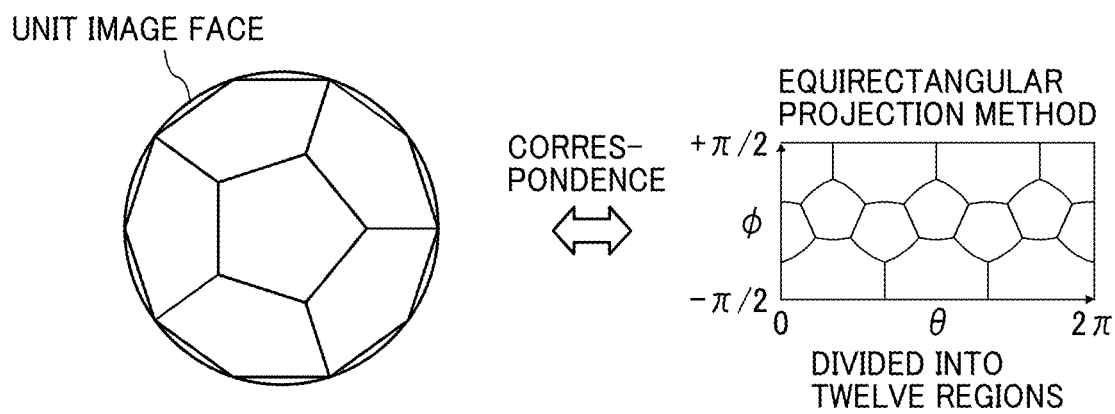
FIG. 11B illustrates an example of defining a regular dodecahedron as a projection plane of a full-view spherical image.

In step S101, the gazing point determination unit 13 defines a normal polyhedron having the center that is common to a unit sphere, and performs a perspective projection conversion using a normal direction of each face as the line of sight direction to acquire one or more partial images, as illustrated in FIG. 11. FIG. 11A illustrates an example of defining a regular octahedron as a projection plane of the full-view spherical image 6. FIG. 11B illustrates an example of defining a regular dodecahedron as a projection plane of the full-view spherical image 6.

In step S102, the gazing point determination unit 13 extracts a feature from each of the partial images acquired in step S101. Since an input image is divided by the above-described method and the feature is calculated from the partial image having lesser distortion, a wide-angle image exceeding 180 degrees can be processed robustly. The feature includes, for example, color, edge, conspicuity, object position, and object label.

In step S103, the gazing point determination unit 13 calculates importance of each position (or each pixel) of the input image based on the feature extracted from each partial image using any known regression model. Although the detail of the regression model is omitted, the importance and feature for each position can be expressed by a regression function. Further, the importance "g" that is the output (teacher data) is determined in advance by using training data, and the relationships between the feature and the importance "g" is determined in advance.

In step S104, the gazing point determination unit 13 calculates a likelihood distribution of the gazing point P based on a distribution of the importance calculated in step S103 under a design concept that the gazing point P set by a user exists in the direction corresponding to the higher importance. For example, after a region R passing through the viewpoint is defined on the unit image face, the gazing point determination unit 13 adds the importance value of each position in the region R to obtain the added value as the likelihood distribution of the gazing point P.

In step S105, the gazing point determination unit 13 calculates the gazing point P based on the likelihood distribution of the gazing point P calculated in step S104. In the embodiment, for example, a position corresponding to the image capturing direction corresponding to the maximum likelihood value of the likelihood distribution of the gazing point is calculated as the gazing point P.

By performing the above described processing, one or more of the gazing points P can be calculated. For example, the gazing point determination unit 13 identifies a pre-set number of gazing points P, or one or more gazing points P having a value equal to a threshold or more from the number "N" (N: natural integer) of the gazing points P. Then, one or more display patterns each combining the display order and the angle of view of the one or more gazing points P are registered in the pattern DB 195.

Determining Person as Gazing Point:

A person can be considered as an object to attract an attention of a viewer person. The person can be detected using any known method, such as the facial recognition method. The facial recognition method can use any known methods that perform the pattern matching by detecting the histogram of oriented gradients (HOG) feature or Haar-like feature. The gazing point determination unit 13 detects the center of the person's face as the gazing point P. If the number of faces is too large, the number of faces may be reduced by assuming that the faces within the closer distance as one face.

Determining Smiling Face as Gazing Point:

A smiling face can be considered as an object to attract an attention of a viewer person. A method of detecting the smiling face may include the facial recognition described above, and any known method performing the pattern matching using patterns of smiling faces stored in advance. If the number of faces is too large, the smiling face alone may be set as the gazing point P. In addition to the smiling face, other faces such as grief, anger, anger, and embarrassment face can be determined as the gazing point P.

Determining Child as Gazing Point:

When a child is present among adults, the child can be considered as an object to attract an attention of a viewer person. Alternatively, when an adult is present among many children, the adult can be considered as an object to attract an attention of a viewer person. The position of face can be used to detect the child or adult. If a position of face identified by the facial recognition is lower than the position of other faces, it is estimated that the identified face is for the child, and if the position of face identified by the facial recognition is higher than the position of other faces, it is estimated that the identified face is for the adult.

Determining Object as Gazing Point:

It can be assumed that an advertiser knows the gazing point P that the advertiser wants the viewer person to see. Therefore, an object designated by the advertiser can be detected as the gazing point P by the gazing point determination unit 13. For example, products or services of advertisers, such as automobiles, furniture, foods, or the like, can be detected as the gazing point P by performing the pattern recognition.

Use of Operation History:

When a child is present among adults, the child can be considered as an object to attract an attention of a viewer person. Alternatively, when an adult is present among many children, the adult can be considered as an object to attract an attention of a viewer person. The position of face can be used to detect the child or adult. If a position of face identified by the facial recognition is lower than the position of other faces, it is estimated that the identified face is for the child, and if the position of face identified by the facial recognition is higher than the position of other faces, it is estimated that the identified face is for the adult. If a clicking operation is performed on the identified face, the angle of view corresponding to the clicking operation can be set as the gazing point P.

Figure 12A:
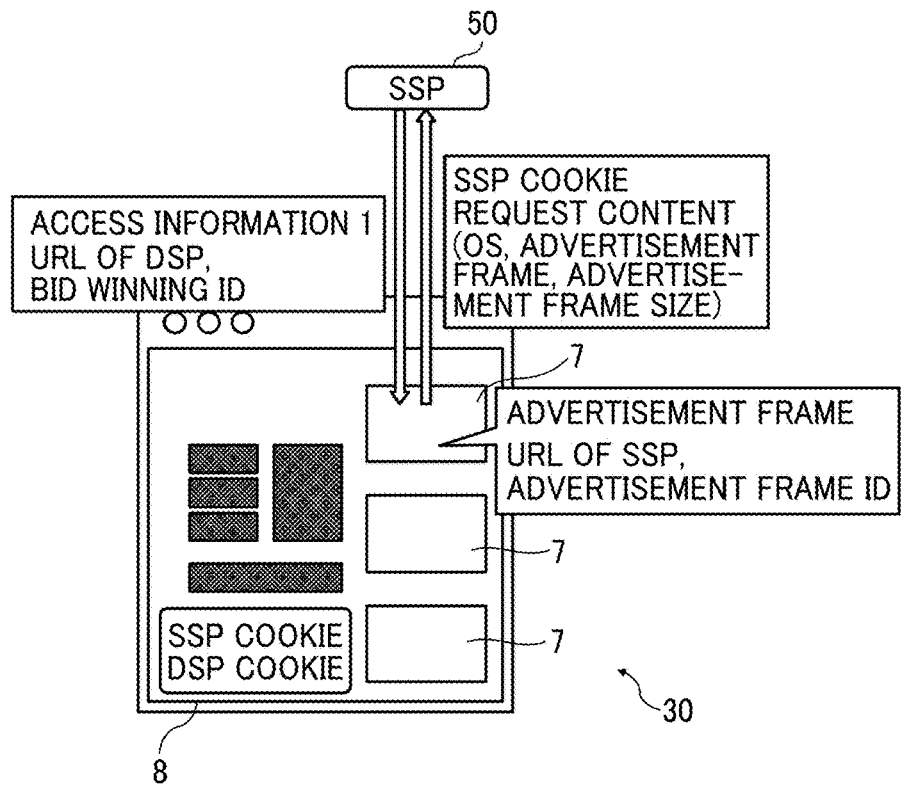
FIGS. 12A, 12B and 12C illustrate an example of a schematic diagram describing information used for a web page.

Information Used by Web Page:

FIG. 12 is an example of a schematic diagram describing information used for a web page. FIG. 12A is an example of a web page provided by the partner site web server 60. The web page provided by the partner site web server 60 includes the advertisement frame 7, which may be one or more advertisement frames. Further, the terminal apparatus 30 stores the SSP cookie and the DSP cookie in advance. The advertisement frame 7 is associated with, for example, the URL of the SSP 50 and the advertisement frame ID. The browser (e.g., advertisement frame detection unit 36) of the terminal apparatus 30 transmits the SSP cookie and the request content to the SSP 50. Further, the SSP 50 transmits the access information 1 including the URL of the DSP 20, which won the advertisement frame 7 by the bidding, and the bid winning ID to the terminal apparatus 30.

Figure 12B:
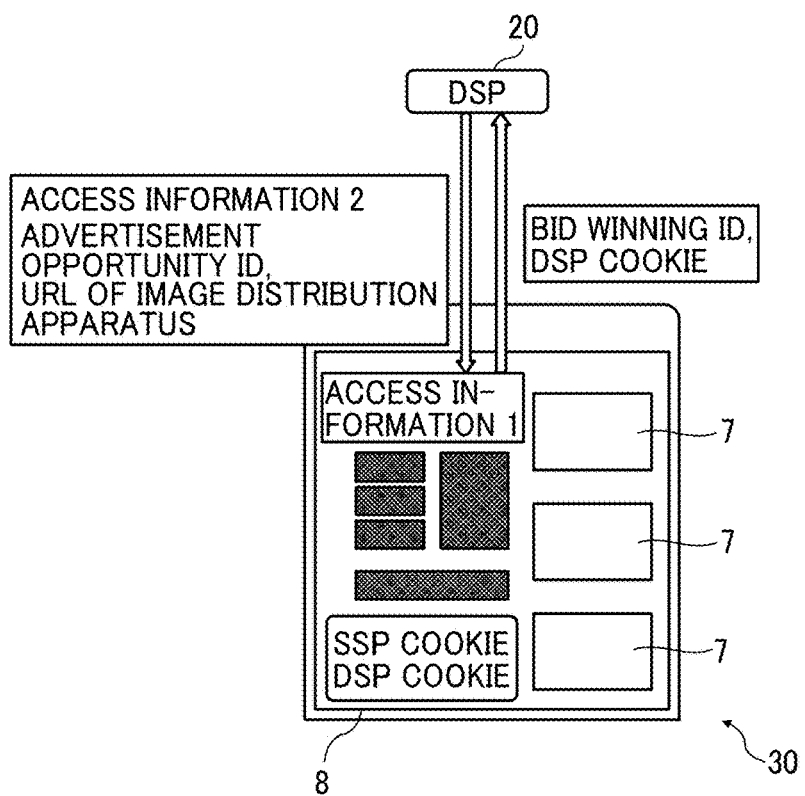

FIG. 12B illustrates an example of operation using the access information 1. The access information 1 is used to transmit the bid winning ID and the DSP cookie to the DSP 20 from the terminal apparatus 30 based on the URL of the DSP 20. The DSP 20 identifies the advertisement request using the bid winning ID, and acquires the access information 2 including the URL of the image distribution apparatus 10, and the advertisement opportunity ID from the image distribution apparatus 10. The terminal apparatus 30 acquires the access information 2 and the advertisement opportunity ID from the DSP 20.

Figure 12C:
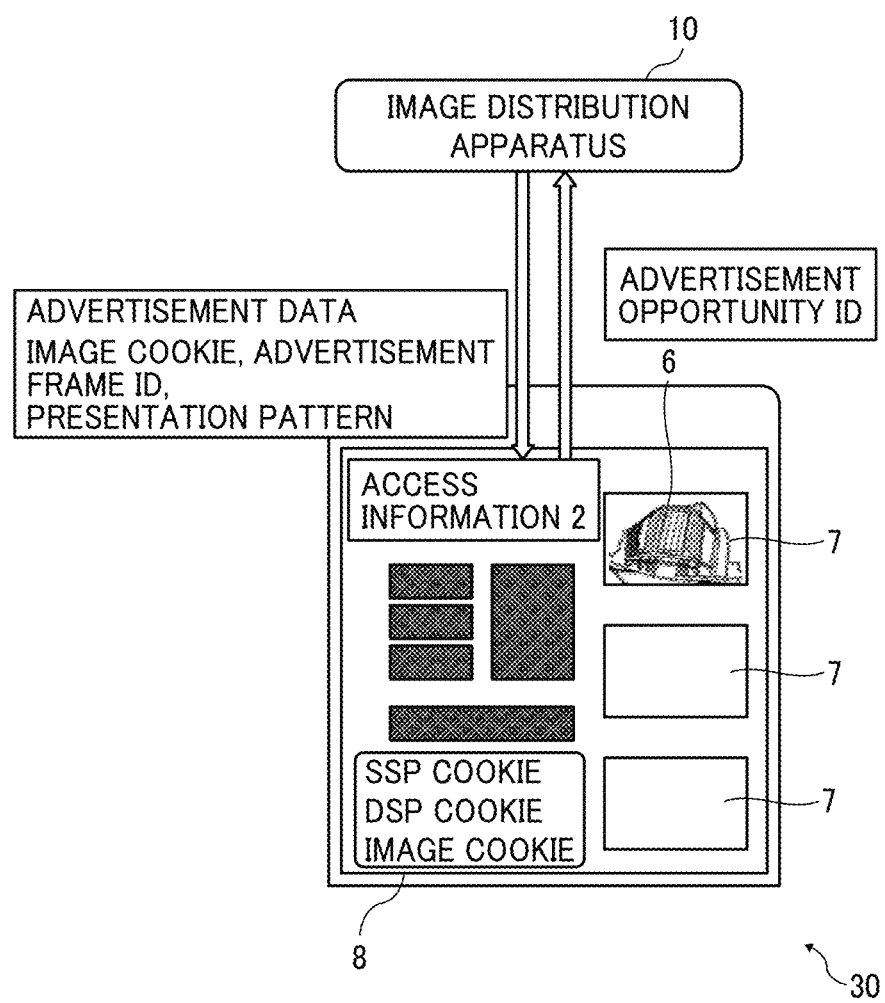

FIG. 12C illustrates an example of operation using the access information 2. The access information 2 is used to transmit the advertisement opportunity ID to the image distribution apparatus 10 from the terminal apparatus 30 based on the URL of the image distribution apparatus 10. The image distribution apparatus 10 generates the advertisement data based on the advertisement request identified by the advertisement opportunity ID, and transmits the advertisement data to the terminal apparatus 30 together with the image cookie, the advertisement frame ID, and the display pattern (i.e. presentation pattern). With this configuration, the full-view spherical image 6 is displayed on the advertisement frame 7 set on the web page.

Figure 13:
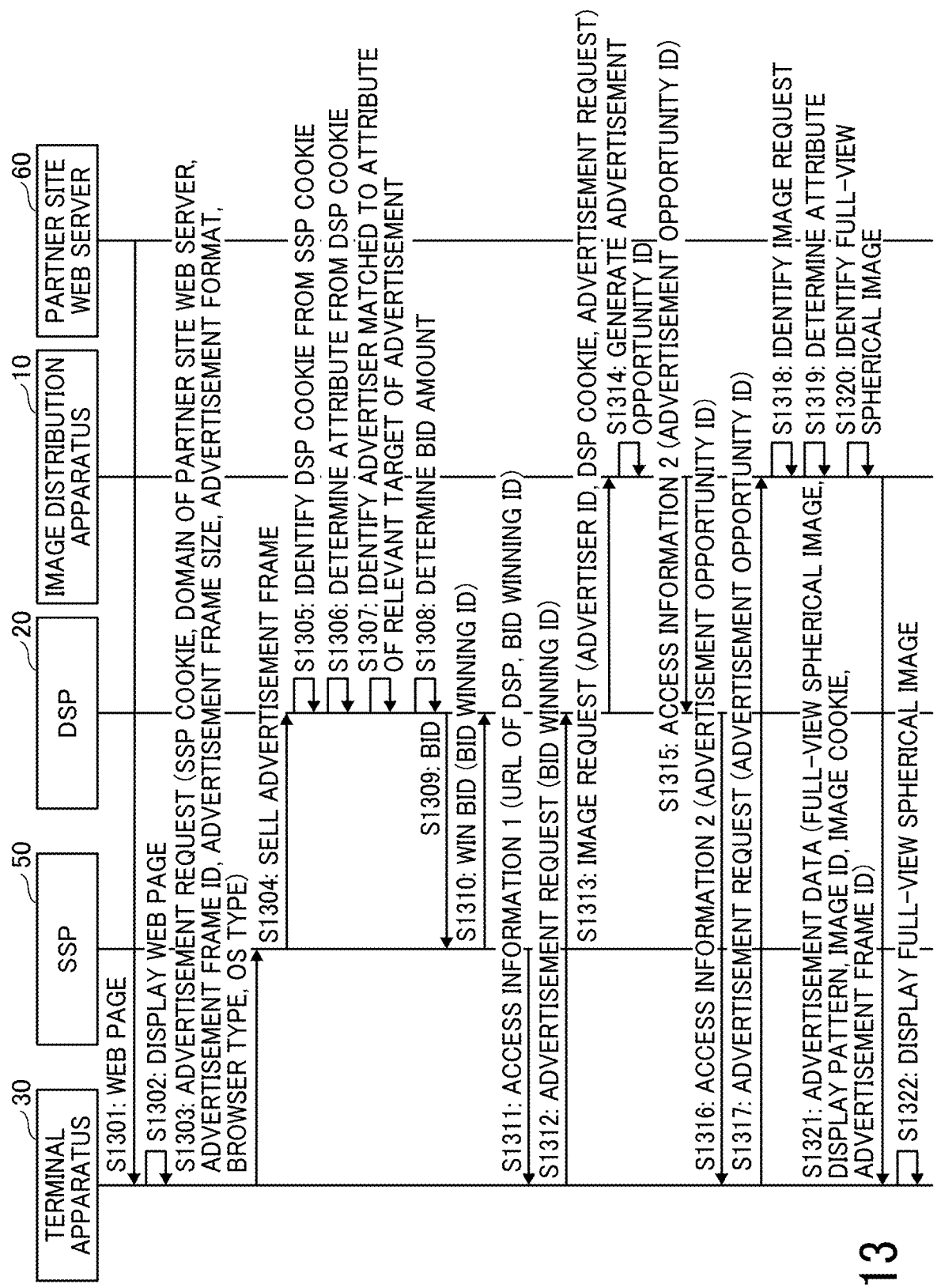
FIG. 13 is an example of a sequence diagram illustrating the steps of distributing a full-view spherical image, displayed as an advertisement, in the browsing system of FIG. 2.

Distribution Procedure:

FIG. 13 is an example of a sequence diagram illustrating the steps of distributing the full-view spherical image 6, to be displayed as the advertisement, in the browsing system 100.

S1301: At first, a viewer person operates the terminal apparatus 30 to connect the terminal apparatus 30 with the partner site web server 60. After the operation reception unit 34 of the terminal apparatus 30 receives an operation of the viewer person, the web page acquiring unit 31 acquires a web page from the partner site web server 60.

S1302: The web page analyzing unit 32 of the terminal apparatus 30 analyzes the web page, extracts HTML, CSS and script, and then the web page display unit 33 displays the web page based on the extracted HTML and CSS.

S1303: The advertisement frame detection unit 36 of the terminal apparatus 30 transmits the advertisement request to the SSP 50 by executing an advertisement tag (e.g., script) associated with the advertisement frame 7. The advertisement request includes, for example, the SSP cookie, the domain of the partner site web server 60, the advertisement frame ID, the advertisement frame size, the advertisement format, the browser type, and the OS type.

S1304: After the advertisement request acquiring unit 52 of the SSP 50 acquires the advertisement request, the advertisement requesting unit 51 receives the advertisement request. Then, the advertisement requesting unit 51 detects the SSP cookie, and notifies the advertisement request to the DSP 20 to sell the advertisement frame 7.

S1305: The request receiving unit 21 of the DSP 20 transmits the advertisement request to the bidding determination unit 22. Then, the bidding determination unit 22 of the DSP 20 refers to the cookie information DB 291 to identify the DSP cookie from the SSP cookie.

S1306: The bidding determination unit 22 determines the attribute from the DSP cookie. The bidding determination unit 22 refers to the visit domain in the cookie information DB 291, or the attribute information of viewer person identified by the DSP cookie as needed.

S1307: The bidding determination unit 22 refers to the distribution setting DB 292 to determine whether to transmit a wide-angle image to a specific viewer person based on the attribute of relevant target person (or preferred target person) and/or the attribute of irrelevant target person (or non-preferred target person) set for the provider that provides the wide-angle image. In this case, it is assumed that the bidding determination unit 22 determines to distribute the wide-angle image provided by at least one advertiser.

S1308: The bidding determination unit 22 determines the bid amount in accordance with the advertiser's budget and the matching level of the attribute.

S1309: The bidding unit 23 of the DSP 20 bids the SSP 50. Typically, the bid winning unit 54 of the SSP 50 determines the DSP 20 offering the highest bid amount for the bidding as the winning bidder from the plurality of DSPs 20.

S1310: It is assumed that the DSP 20 won the bidding in FIG. 13. The SSP 50 notifies the bid winning ID to the DSP 20.

S1311: The access information transmitting unit 53 of the SSP 50 transmits the access information 1 to the terminal apparatus 30 together with the bid winning ID.

S1312: The advertisement requesting unit 38 of the terminal apparatus 30 executes the access information 1 to transmit the advertisement request to the DSP 20 together with the bid winning ID.

S1313: The advertisement request receiving unit 24 of the DSP 20 identifies the advertisement request based on the bid winning ID. Then, the image requesting unit 25 requests an image request to the image distribution apparatus 10 together with the advertiser ID, the DSP cookie, and the advertisement request.

S1314: After the image information response unit 11 of the image distribution apparatus 10 receives the image request, the image information response unit 11 generates the advertisement opportunity ID identifying the advertisement request.

S1315: The image information response unit 11 transmits the access information 2 associated with the advertisement opportunity ID to the DSP 20.

S1316: After the image requesting unit 25 of the DSP 20 receives the access information 2 and the advertisement opportunity ID, the advertisement request receiving unit 24 transmits the access information 2 and the advertisement opportunity ID to the terminal apparatus 30.

S1317: The advertisement acquiring unit 39 of the terminal apparatus 30 transmits the advertisement request including the advertisement opportunity ID to the image distribution apparatus 10 based on the URL of the image distribution apparatus 10 included in the access information 2. If the terminal apparatus 30 stores the image cookie, the terminal apparatus 30 can transmit the image cookie to the image distribution apparatus 10.

S1318: The advertisement distribution unit 12 of the image distribution apparatus 10 identifies the image request based on the advertisement opportunity ID.

S1319: The advertisement distribution unit 12 determines the attribute from the DSP cookie and/or the image cookie.

S1320: The advertisement distribution unit 12 identifies the full-view spherical image 6 based on the advertiser ID and the attribute. That is, the advertisement distribution unit 12 refers to the advertisement image DB 194 to determine the to-be-transmitted full-view spherical image 6 based on the attribute and/or the priority associated with the relevant target person set for distributing the full-view spherical image 6, in which the display pattern having the number of times of clicking operation higher than a threshold may be selected and used as the display pattern. However, the display pattern can be selected randomly while the number of times of distribution of the full-view spherical image 6 is still small.

S1321: The advertisement distribution unit 12 transmits advertisement data including the full-view spherical image 6, the display pattern, the image ID, the image cookie, and the advertisement frame ID to the terminal apparatus 30. Further, the full-view spherical image 6 is associated with the URL of the advertiser web server 70.

S1322: After the advertisement acquiring unit 39 of the terminal apparatus 30 acquires the advertisement data, the advertisement display unit 40 displays the full-view spherical image 6 on the advertisement frame 7. If the viewer person clicks the advertisement frame 7, the operation reception unit 34 receives the clicking operation, and then the web page acquiring unit 31 starts to communicate with the advertiser web server 70.

Figure 14:
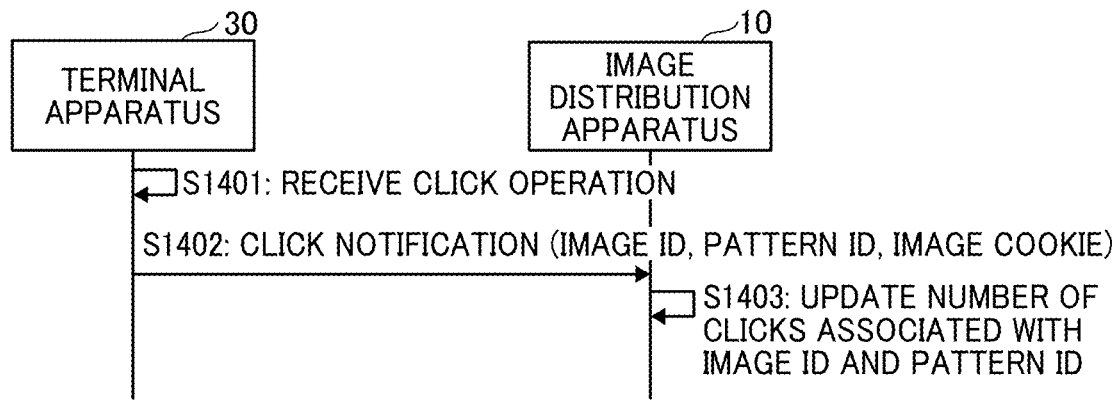
FIG. 14 is an example of a sequence diagram illustrating the steps of updating the number of times of clicking operation for each display pattern using an image distribution apparatus.

Updating of Number of Times of Clicking Operation for Each Display Pattern:

FIG. 14 is an example of a sequence diagram illustrating the steps of updating the number of times of clicking operation for each display pattern using the image distribution apparatus 10.

S1401: When the viewer person sees the full-view spherical image 6 on the advertisement frame 7, which may be rotating in accordance with the display pattern, the viewer person may click or tap the advertisement frame 7 if the viewer person is interested in the advertisement. The operation reception unit 34 of the terminal apparatus 30 receives a clicking operation performed by the viewer person.

S1402: The operation history recording unit 41 records the clicking operation, and the operation history transmitting unit 42 transmits a notification of the clicking operation to the image distribution apparatus 10. The transmission of notification of the clicking operation may be performed right after the clicking or when communication load is relatively low. The notification of clicking operation includes, for example, the image ID, the pattern ID, and the image cookie. The image cookie allows to record the number of times of clicking operation for each attribute.

S1403: After the operation history acquiring unit 14 of the image distribution apparatus 10 acquires information that the clicking operation was performed, the operation history acquiring unit 14 increases the number of times of clicking operation associated with the image ID and the pattern ID in the pattern DB 195 by one (i.e., update the number of times of clicking operation). Alternatively, the operation history acquiring unit 14 determines the attribute based on the image cookie, and then increases the number of times of clicking operation for each attribute.

With this processing, the number of times of clicking operation is accumulated for each display pattern, and the number of times of clicking operation performed for a specific display pattern, which is more likely to be clicked, is increased. In other words, a specific display pattern that is less likely to be clicked can be detected.

Figure 15A:
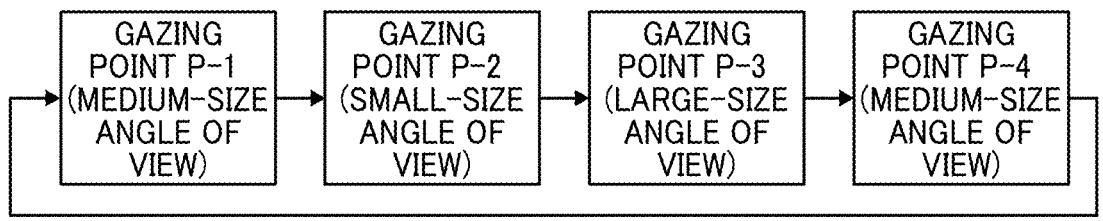
FIGS. 15A and 15B schematically illustrate a display of gazing points using a display pattern.
Figure 15B:
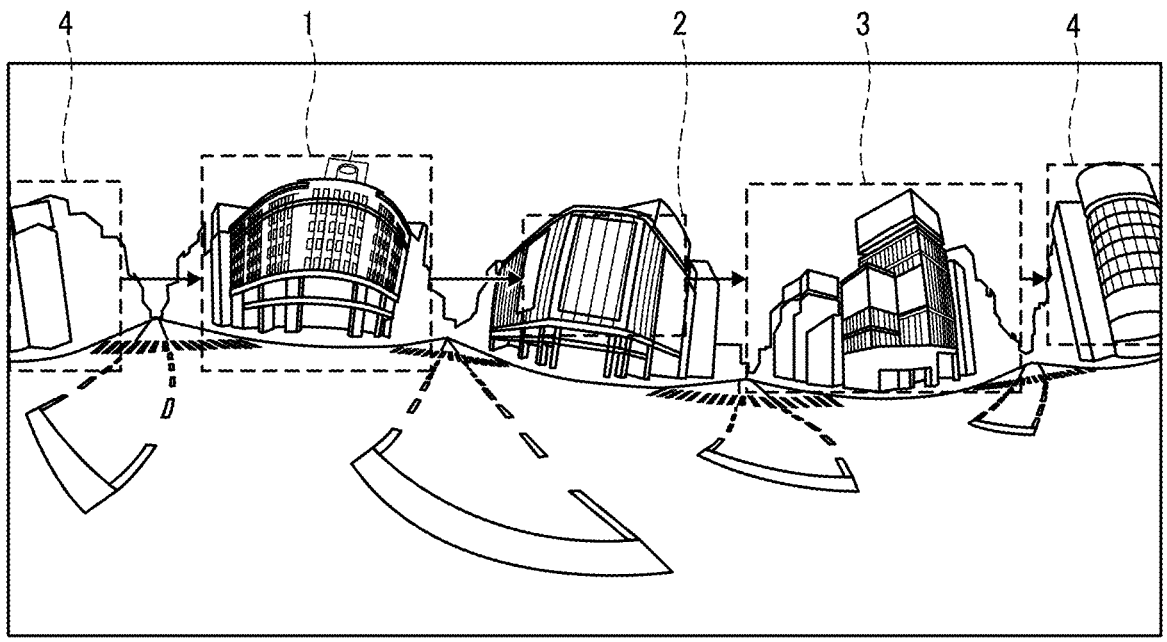

Display Based on Display Pattern:

FIG. 15 schematically illustrates a displaying of the gazing point P using a display pattern. FIG. 15A illustrates an example of the display patterns. FIG. 15B illustrates an example of the gazing point P and the angle of view in the full-view spherical image 6.

The display pattern including the display order and the size of angle of view, illustrated in FIG. 15A, is included in the advertisement data. Based on the display pattern included in the advertisement data, in an example case of FIG. 15, the advertisement display unit 40 displays the gazing point P-1 with a medium-size angle of view, the gazing point P-2 with a small-size angle of view, the gazing point P-3 with a large-size angle of view, and the gazing point P-4 with a medium-size angle of view with a display order. After the gazing point P-4 is displayed, the image displaying returns to the gazing point P-1.

Specifically, as illustrated in FIG. 15B, display regions 1 to 4 set within the full-view spherical image 6 can be displayed successively by shifting the gazing points P-1 to P-4. The display regions 1 to 4 can be set within the full-view spherical image 6 based on the gazing points P-1 to P-4 and the angle of view of the gazing points P-1 to P-4. Each of the display regions 1 to 4 is displayed on the advertisement frame 7. The advertisement display unit 40 successively displays the display regions 1 through 4 based on the display order while displaying the full-view spherical image 6.

Since the size of the advertisement frame 7 is a pre-set constant size, the viewer person may recognize that the image displayed on the advertisement frame 7 is enlarged when the display region 1 shifts to the display region 2, the image displayed on the advertisement frame 7 is reduced when the display region 2 shifts to the display region 3, the image displayed on the advertisement frame 7 is enlarged when the display region 3 shifts to the display region 4; and the image displayed on the advertisement frame 7 is not enlarged or reduced when the display region 4 shifts to the display region 1.

As described above, since the terminal apparatus 30 constantly displays the full-view spherical image 6 by automatically tracking the plurality of gazing points P sequentially, the characteristic portions of the full-view spherical image 6 can be browsed by the viewer person even when the viewer person does not operate the full-view spherical image 6.

Figure 16A:
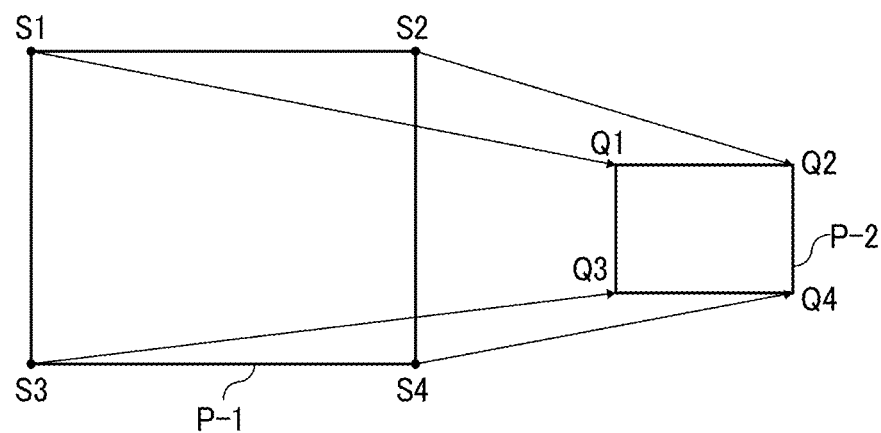
FIGS. 16A and 16B illustrates examples of diagrams schematically describing enlargement and reduction of an image.
Figure 16B:
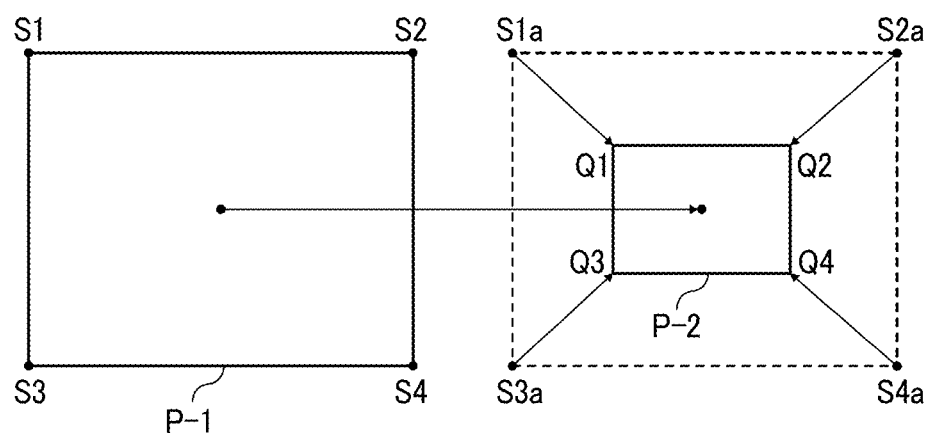

FIG. 16 is an example of a diagram schematically describing enlargement and reduction of an image. FIG. 16A illustrates a display pattern of enlarging the image and shifting of the display region concurrently. FIG. 16B illustrates a display pattern of enlarging the image after shifting the display region. Since the angle of view is reduced by shifting from the display region 1 to the display region 2, FIG. 16 indicates a case of the enlargement of image, but a case of the reduction of image can be similarly performed.

Hereinafter, a description is given of the display method of FIG. 16A. In this description, the display method indicates a display pattern (i.e. presentation pattern, presentation style), which is applied to determine how to display the image on the display. The advertisement display unit 40 identifies four vertices S1 to S4 when the gazing point P-1 having the medium-size angle of view is used. Then, the coordinates of four vertices Q1 to Q4 are calculated when the gazing point P-2 having the small-size angle of view is used. Then, each of curve lines on a sphere connecting S1 and Q1, S2 and Q2, S3 and Q3, and S4 and Q4 (on the spherical surface of entire celestial sphere) are divided (interpolated) into a given number of curve lines, and then the terminal apparatus 30 displays the full-view spherical image 6 using the coordinates and the angle of view at each of the divided points. With this processing, the full-view spherical image 6 can be displayed using a size-reduced display region set with the specific angle of view while smoothly shifting from the display region 1 of to the display region 2.

Hereinafter, a description is given of the display method of FIG. 16B. The advertisement display unit 40 identifies four vertices S1 to S4 when the gazing point P-1 having the medium-size angle of view is used, and the coordinates of four vertices Q1 to Q4 are calculated when the gazing point P-2 having the small-size angle of view is used. At first, each of curve lines on a sphere connecting S1 and S1a, S2 and S2a, S3 and S3a, and S4 and S4a (on the spherical surface of entire celestial sphere) are divided (interpolated) into a given number of curve lines, and the terminal apparatus 30 displays the full-view spherical image 6 using the coordinates and angle of view (constant) at each of the divided points.

Then, the advertisement display unit 40 divides each of curve lines on a sphere connecting S1a and Q1, S2a and Q2, S3a and Q3, and S4a and Q4 into a given number of curve lines, and the terminal apparatus 30 displays the full-view spherical image 6 using the coordinates and angle of view at each of the divided points. With this processing, the display region 1 of the full-view spherical image 6 smoothly shifts to the display region 2 of the full-view spherical image 6, and then the image in the display region 2 can be enlarged and displayed using the determined angle of view.

The full-view spherical image 6 can be displayed using any one of the above described display methods in view of enhancing of appealing of advertisement, and the display method can be set in advance in the image distribution apparatus 10. Alternatively, the number of times of clicking operation may be counted for the two display methods used as the display patterns, and the display method having the higher number of times of clicking operation may be used.

Figure 17A:
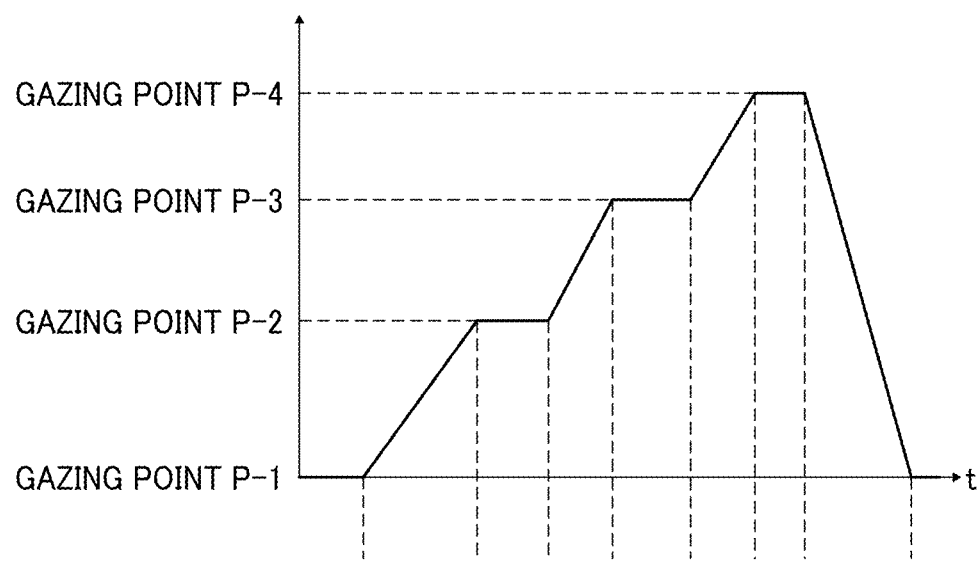
FIGS. 17A and 17B illustrates an example of a schematic diagram describing a shift amount and a shift speed between gazing points along a time line.
Figure 17B:
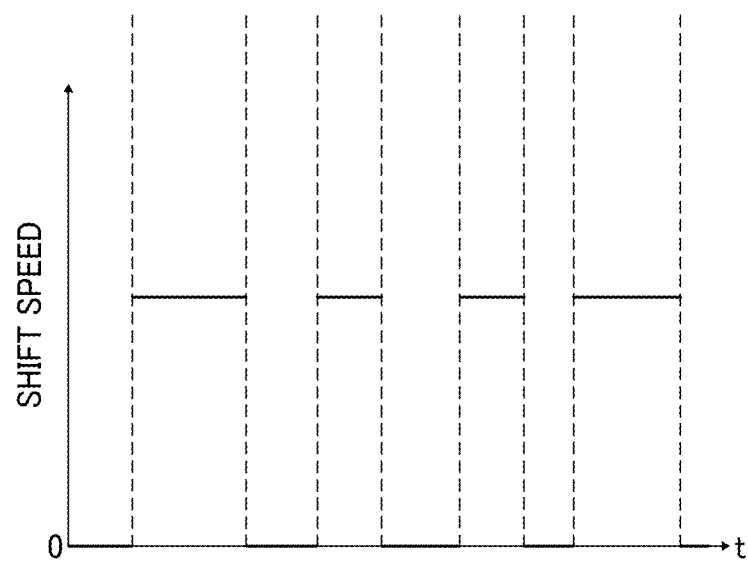

Still Time and Shift Speed:

FIG. 17 is an example of a schematic diagram describing a shift amount and a shift speed along the time line. FIG. 17A illustrates an example of a shift amount between the gazing points P. FIG. 17B illustrates an example of a shift speed at and between the gazing points. As illustrated in FIGS. 17A and 17B, the shifting of the display region is stopped at the gazing points P-1, P-2, P-3, and P-4 for a certain period of time while the gazing point shifts from the gazing point P-1 to the gazing point P-2, from the gazing point P-2 to the gazing point P-3, and rom the gazing point P-3 to the gazing point P-4, the gazing point shifts at a constant speed. Since the display region remains stationary or stops for a given time period (i.e. still time period) at each of the gazing points P-1, P-2, P-3, and P-4, the viewer person can check each of the gazing points P. Information related to the shift speed may be stored in the pattern DB 195 in the image distribution apparatus 10, and the information related to the shift speed is transmitted to the terminal apparatus 30 from the image distribution apparatus 10.

The still time period is, for example, a few seconds, such as one or two seconds. Further, the still time period may be set almost zero (i.e., close to zero). Further, if the display region is configured not to stop completely at each of the gazing points P-1, P-2, P-3, and P-4, the display region is preferably configured to shift slowly between the gazing points P-1, P-2, P-3, and P-4 so that the viewer person can check each of the gazing points P-1, P-2, P-3, and P-4.

FIG. 18 is an example of a diagram illustrating the shift speed from the gazing point P-1 to the gazing point P-2. The shifting between the other gazing points P are similarly performed. FIG. 18A illustrates a method of shifting the display regions from the gazing point P-1 to the gazing point P-2 at a constant shift speed at the terminal apparatus 30. That is, FIG. 18A corresponds to FIG. 17. FIG. 18A indicates a case that the display region can be shifted at the highest shift speed.

Figure 18A:
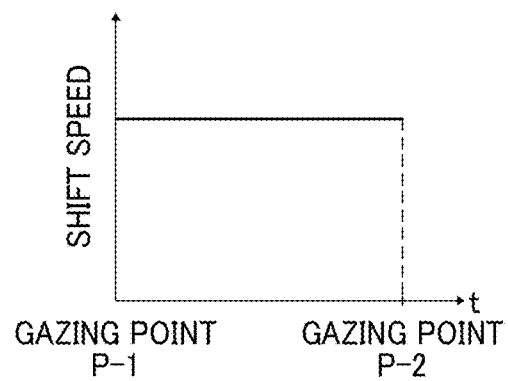
FIGS. 18A, 18B, 18C and 18D illustrates examples of diagram of a shift speed from one gazing point to another gazing point.
Figure 18B:
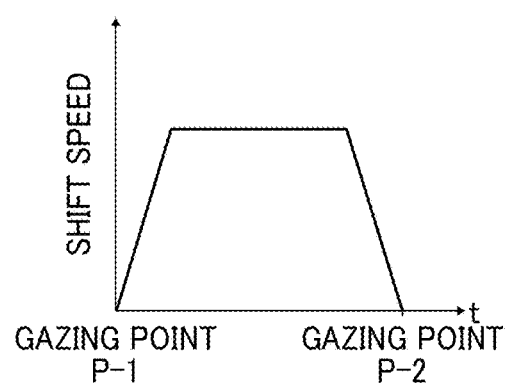

FIG. 18B illustrates another method of shifting the display regions from the gazing point P-1 to the gazing point P-2, in which the shift speed gradually increases from the gazing point P-1 that is at the shift start point, and then the shift speed becomes the constant, and then the shift speed gradually decreases before approaching the next gazing point P-2 that is at the shift end point. FIG. 18B indicates a case that the viewer person can easily see the image because the abrupt shifting can be prevented.

Figure 18C:
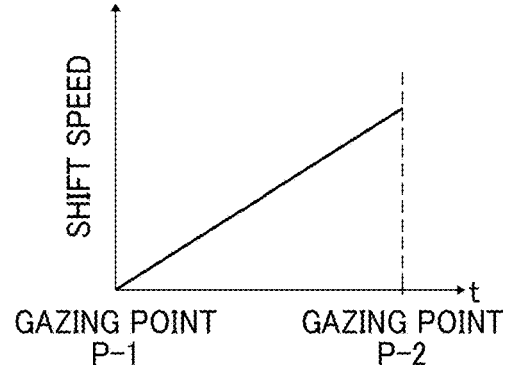

FIG. 18C illustrates another method of shifting the display regions from the gazing point P-1 to the gazing point P-2, in which the shift speed increases gradually from the gazing point P-1 that is at the shift start point to the gazing point P-2 that is at the shift end point. FIG. 18C indicates a case that abrupt shifting at the beginning of shifting can be prevented.

Figure 18D:
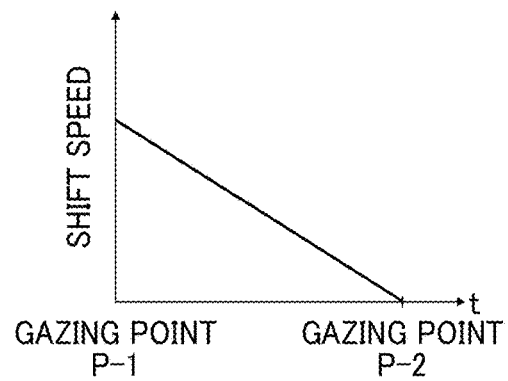

FIG. 18D illustrates another method of shifting the display regions from the gazing point P-1 to the gazing point P-2, in which the shift speed gradually decreases from the gazing point P-1 that is at the shift start point to the gazing point P-2 that is at the shift end point. FIG. 18D indicates a case that the shift speed gradually decreases before approaching the gazing point P-2, in which the viewer person can see the next gazing point P with a longer period of time.

The method of shifting the display regions that can enhance the appealing effect of advertisement is selected, and such method can be set in advance in the image distribution apparatus 10. Alternatively, the number of times of clicking operation may be counted for each of the methods of shifting the display regions as the display pattern, and the display pattern having the higher number of times of clicking operation may be used for shifting the display regions.

Figure 19:
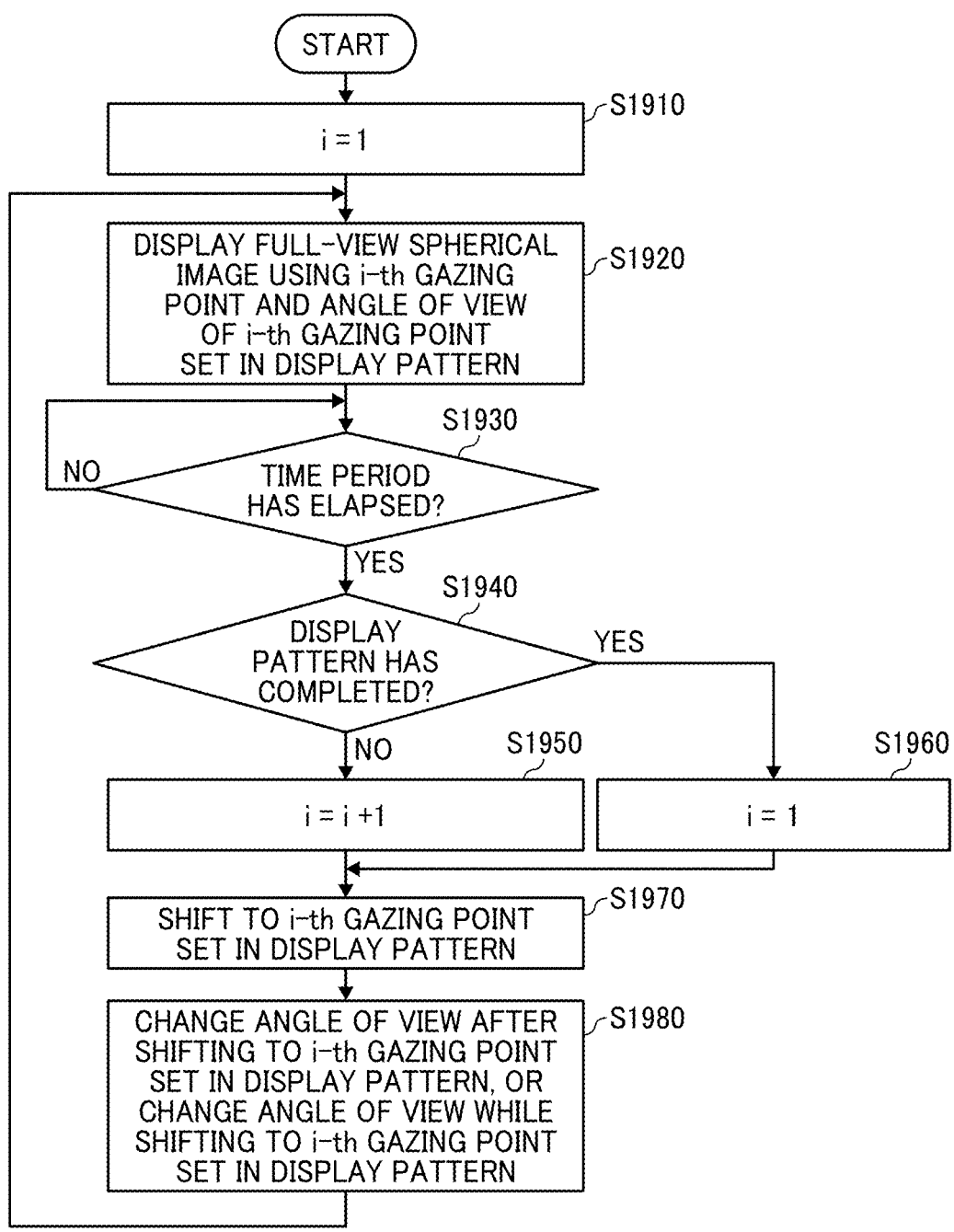
FIG. 19 is an example of a flowchart illustrating the steps of displaying a full-view spherical image based a display pattern using an advertisement display unit.

Display Based on Display Pattern:

FIG. 19 is an example of a flowchart illustrating the steps of displaying the full-view spherical image 6 based a display pattern using the advertisement display unit 40. The sequence of FIG. 19 starts when the terminal apparatus 30 receives the advertisement data.

At first, the advertisement display unit 40 sets "1" to "i" (S1910). In this sequence, "i" indicates a display order of the gazing points P set with the angle of view that are set for a specific display pattern.

Then, the advertisement display unit 40 displays the full-view spherical image 6 using the i-th gazing point and the angle of view of the i-th gazing point set for the specific display pattern (S1920).

Then, the advertisement display unit 40 determines whether a given time period has elapsed since the start of displaying the full-view spherical image 6 (S1930). For example, the given time period may be set zero, but not limited thereto.

When the determination in step S1930 is "YES," the advertisement display unit 40 determines whether the specific display pattern has completed (S1940).

If the specific display pattern is completed (S1940: YES), the advertisement display unit 40 sets "1" to "i", and displays the full-view spherical image 6 using the gazing point and the angle of view corresponding to the first gazing point set in the display order of the specific display pattern (S1960).

If the specific display pattern has not completed (S1940: NO), the advertisement display unit 40 increases the number of "i" by one (step S1950).

Then, the advertisement display unit 40 starts to shift to the i-th gazing point set in the display pattern of the specific display pattern (S1970).

Then, the advertisement display unit 40 changes the angle of view after shifting to the i-th gazing point set in the specific display pattern, or changes the angle of view while shifting to the i-th gazing point set in the specific display pattern (S1980).

Then, the sequence returns to step S1920, and displays the i-th gazing point with the angle of view set in the specific display pattern based on the display order.

Repeat of Display Pattern:

The full-view spherical image 6 displayed on the advertisement frame 7 using the terminal apparatus 30 rotates while automatically tracking the gazing points P as described above. However, if the full-view spherical image 6 is being repeatedly displayed using a display pattern that was not clicked so much, the clicking rate may decrease. In this case, the clicking rate can be improved by displaying the full-view spherical image 6 using another display pattern. Therefore, the terminal apparatus 30 can change the display pattern of the full-view spherical image 6 (i.e., same full-view spherical image) as below.

Figure 20:
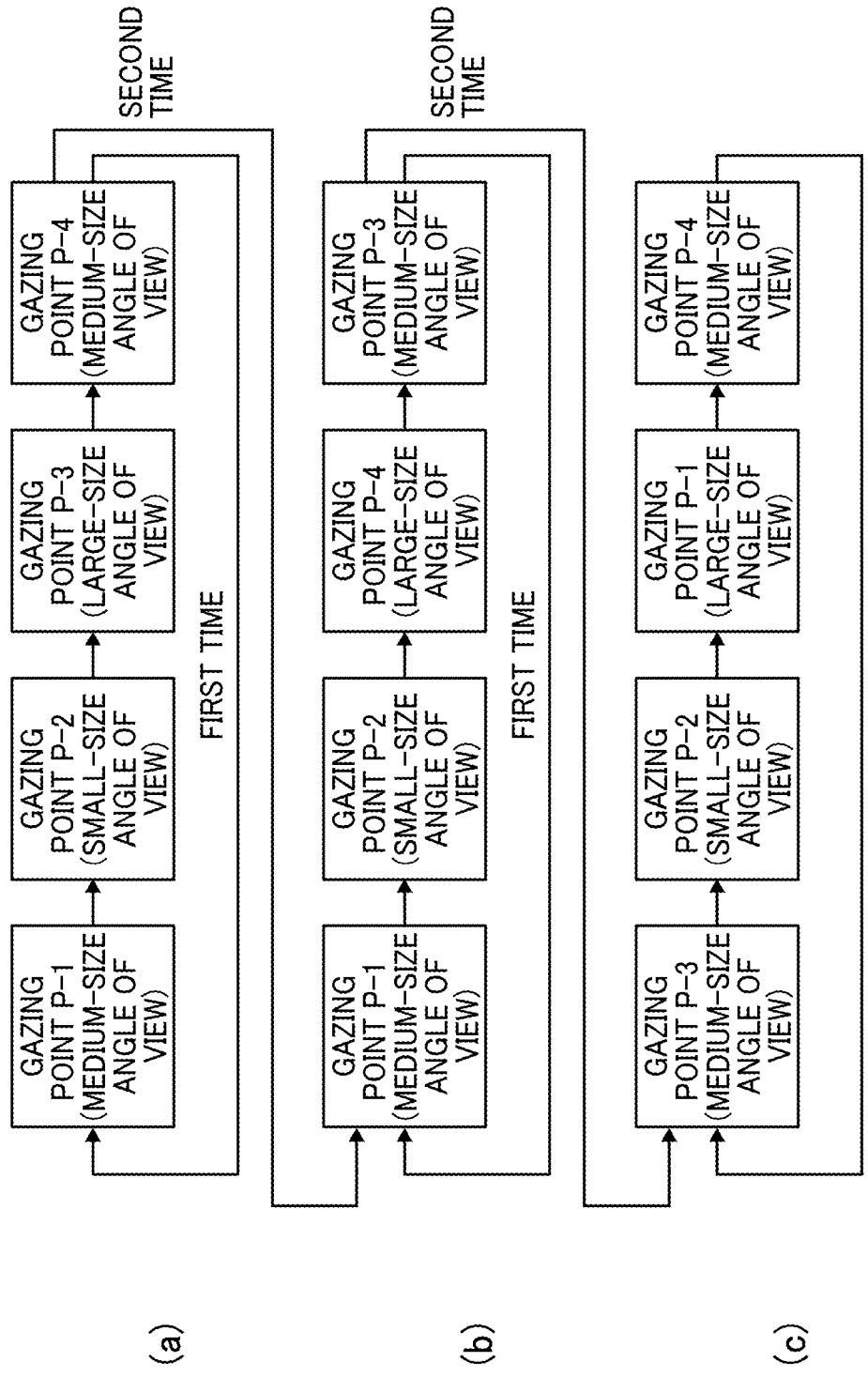
FIG. 20 illustrates examples of diagram illustrating a switching of display patterns.

FIG. 20(*a*) illustrates an example of a display pattern of the first time. FIG. 20(*b*) illustrates an example of a display pattern of the second time. FIG. 20(*c*) illustrates an example of a display pattern of the third time. The image distribution apparatus 10 transmits a plurality of display patterns to the terminal apparatus 30. For example, the advertisement display unit 40 repeats one display pattern for two times, and then displays the image using another display pattern after repeating the one display pattern for two times.

A) First, the display pattern of the first time is repeated for two times.

B) Then, after displaying the last gazing point P-4 using the display pattern of the first time for two times, the gazing point P shifts to the first gazing point P-1 set in the display pattern of the second time.

C) Then, the display pattern of the second time is repeated for two times.

D) After displaying the last gazing point P-3 of using display pattern of the second time for two times, the gazing point P shifts to the first gazing point P-3 of the display pattern of the third time. Since there is no need to shift from the gazing point P-3 to the gazing point P-3, the display pattern of the third time starts without shifting the gazing point P.

If the last gazing point P set in one display pattern is the same as the first gazing point P set in the next display pattern, the image display can be started from the second gazing point P set in the next display pattern by assuming that the display of the first gazing point P set in the next display pattern is already completed.

When the full-view spherical image 6 is being displayed using the same display pattern for a given number of times or more, and then switching the display pattern to another display pattern, the clicking rate can be enhanced. The given number of times repeating the one display pattern is, for example, two times, but the given number of times repeating the one display pattern can be set with any number. For example, the terminal apparatus 30 may determine the given number of times repeating the one display pattern based on the display time of the one display pattern.

Further, the operation history recording unit 41 of the terminal apparatus 30 transmits the pattern ID of the display pattern that was used when the clicking operation was performed to the image distribution apparatus 10.

Figure 21:
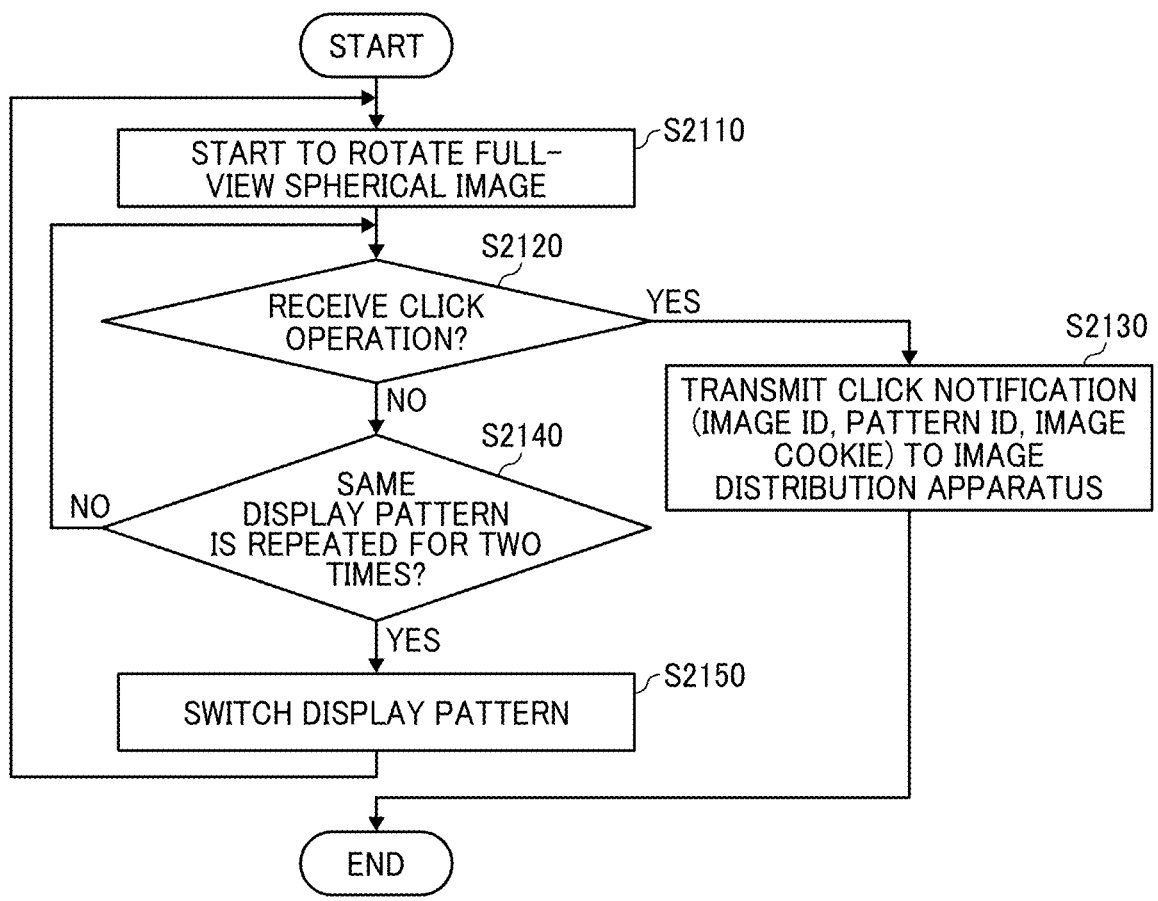
FIG. 21 is an example of a flowchart illustrating the steps of switching display patterns using a terminal apparatus.

FIG. 21 is an example of a flowchart illustrating the steps of switching display patterns at the terminal apparatus 30.

After the advertisement display unit 40 of the terminal apparatus 30 receives the advertisement data, the advertisement display unit 40 displays the full-view spherical image 6 by starting the rotation of the full-view spherical image 6 (S2110).

Then, the operation history recording unit 41 determines whether the operation reception unit 34 has received a clicking operation (S2120). If the determination in step S2120 is "YES," the operation history recording unit 41 transmits a notification of the clicking operation (including the image ID, the pattern ID, and the image cookie) to the image distribution apparatus 10 (S2130).

By contrast, if the determination in step S2120 is "NO," the advertisement display unit 40 determines whether the same display pattern is repeated for a given number of times, such as two times (S2140).

If the determination in step S2140 is "NO," the sequence returns to step S2120.

By contrast, if the determination in step S2140 is "YES," the advertisement display unit 40 switches the display pattern to the next display pattern (S2150). Then, the sequence proceeds to step S2110, and the rotation of the full-view spherical image 6 is started using the next display pattern.

Switching of Display Pattern when Distributing Same Image to Same Viewer Person:

If the image cookie is registered in the distribution history DB 191, the viewer person has seen the full-view spherical image 6 using at least one display pattern in the past. When this viewer person browses a web page of the partner site web server 60 or a web page of another web server, the image distribution apparatus 10 distributes the full-view spherical image 6. In this case, the image distribution apparatus 10 can improve the clicking rate of the web page by changing the display pattern of the full-view spherical image 6. If the terminal apparatus 30 repeatedly displays the full-view spherical image 6 while switching the display patterns as described in FIGS. 20 and 21, at least the first-time display pattern is switched to another display pattern.

Figure 22:
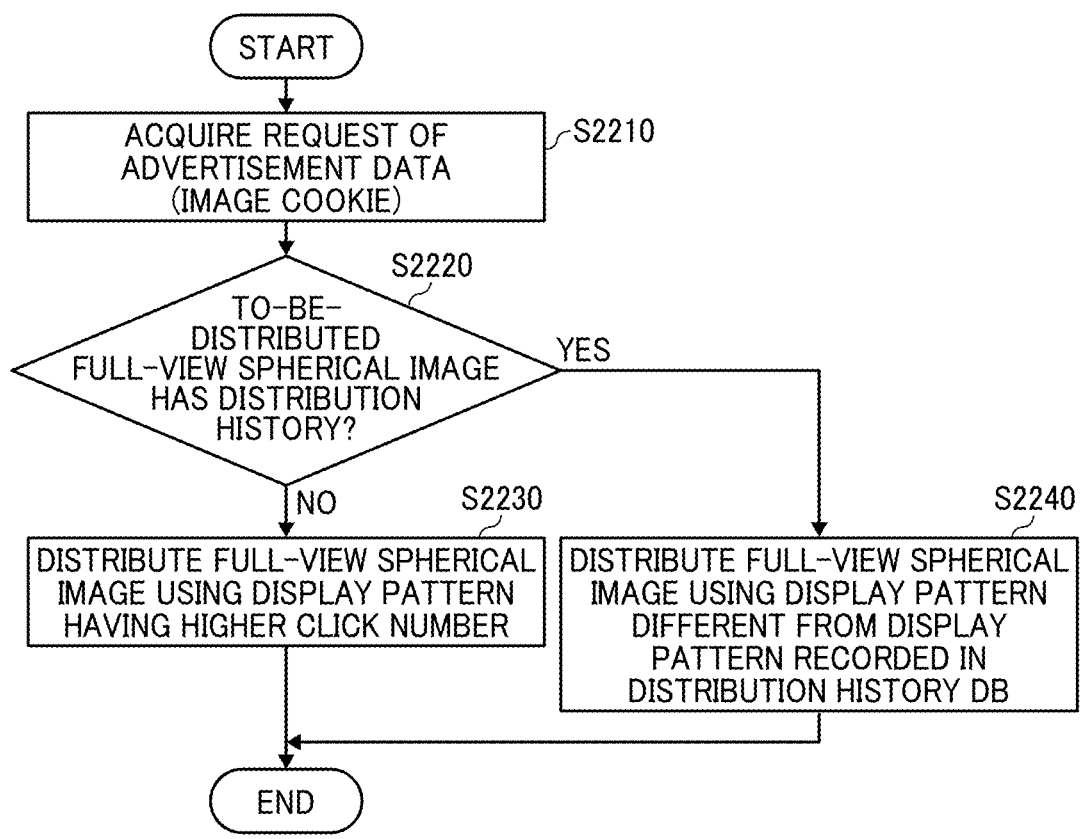
FIG. 22 is an example of a flowchart illustrating the steps of distributing a full-view spherical image without using the same display pattern too many times, using the advertisement distribution unit of an image distribution apparatus.

FIG. 22 is an example of a flowchart illustrating the steps of distributing the full-view spherical image 6 without using the same display pattern too many times, using the advertisement distribution unit 12 of the image distribution apparatus 10.

At first, the advertisement distribution unit 12 acquires a request of the advertisement data together with the image cookie (S2210). If the terminal apparatus 30 received the full-view spherical image 6 in the past, the image cookie is already stored, and thus the image distribution apparatus 10 can determine the viewer person.

The advertisement distribution unit 12 determines whether the to-be-distributed full-view spherical image 6 has a distribution history by referring to the distribution history DB 191 (S2220). That is, when the to-be-distributed full-view spherical image 6 is determined in accordance with the attribute, the advertisement distribution unit 12 determines whether the to-be-distributed full-view spherical image 6 has a history of distributed to the same viewer person in the past.

If the determination in step S2220 is "NO," the advertisement distribution unit 12 distributes the full-view spherical image 6 using a display pattern having a higher number of times of clicking operation as described above (S2230).

By contrast, if the determination in step S2220 is "YES," the advertisement distribution unit 12 distributes the full-view spherical image 6 using a display pattern different from the display pattern recorded in the distribution history DB 191 (S2240). For example, the advertisement distribution unit 12 distributes the full-view spherical image 6 using a display pattern having the highest number of times of clicking operation, different from the display pattern recorded in the distribution history DB 191.

In a case of the retargeting (or behavioral retargeting) advertising, the full-view spherical image 6 recorded in the distribution history DB 191 is distributed. In this case too, the image distribution apparatus 10 can distribute the full-view spherical image 6 (i.e., same full-view spherical image) using a display pattern different from the display pattern recorded in the distribution history DB 191, in which the full-view spherical image 6 (i.e., same full-view spherical image) can be distributed with a different display pattern. Further, in the case of retargeting (or behavioral retargeting) advertising, the same display pattern can be used intentionally for the distribution.

Distribution of Movie Image:

In some cases, the full-view spherical image 6 of movie image may be distributed. The movie image includes image frames set with different imaging time frames. In a case of the movie image, an image capture position may be moved little or greatly. If the image capture position does not move, the position of the gazing point P is not moved, so that the movie image becomes similar to the still image.

Figure 23A:
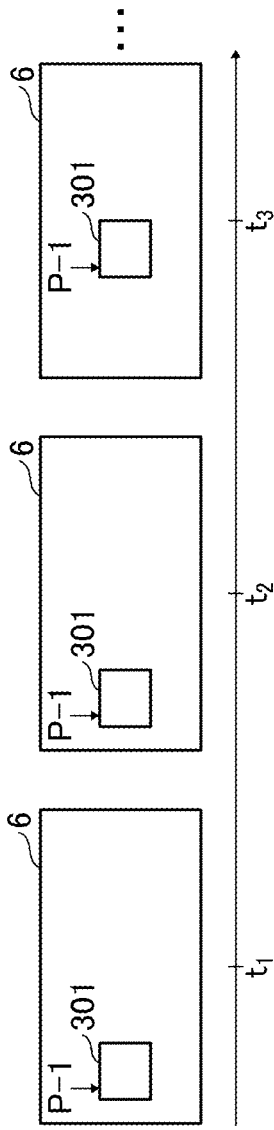
FIGS. 23A, 23B, and 23C illustrate examples of diagrams illustrating a change of coordinates for a movie image when a gazing point move little.

FIG. 23 illustrates examples of diagrams illustrating a change of coordinates of a movie image when the gazing point P shifts little. FIG. 23A illustrates a case that a display region 301 is being locked at the gazing point P-1. Since the movie image is used, the frames are switched when the time elapses, but the gazing point P-1 is being used as the gazing point. Therefore, the display region 301 displayed by the terminal apparatus 30 does not shift through the time "$t_0$" to "$t_3$" along the time line.

Figure 23B:
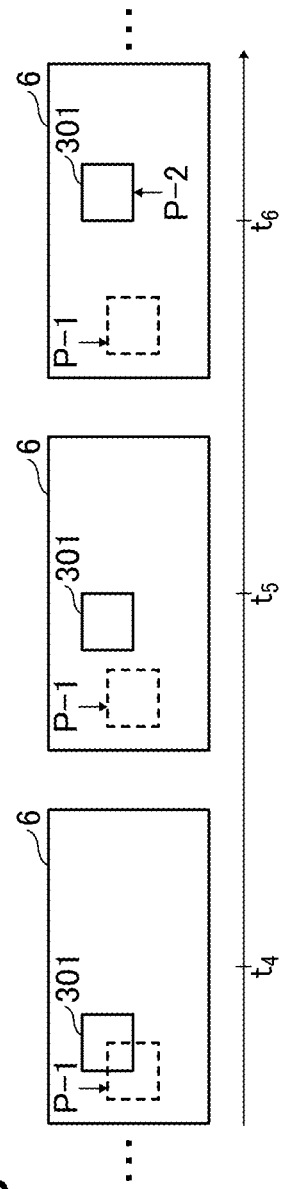

FIG. 23B illustrates a case that the display region 301 shifts from the gazing point P-1 to the gazing point P-2, in which the display region 301 shifts from the gazing point P-1 to the gazing point P-2 while the frames are switched, but the gazing points P-1 and P-2 being at the respective same positions through the time "$t_4$" to "$t_6$" along the time line. Therefore, the display region 301 can be shifted same as the still image.

Figure 23C:
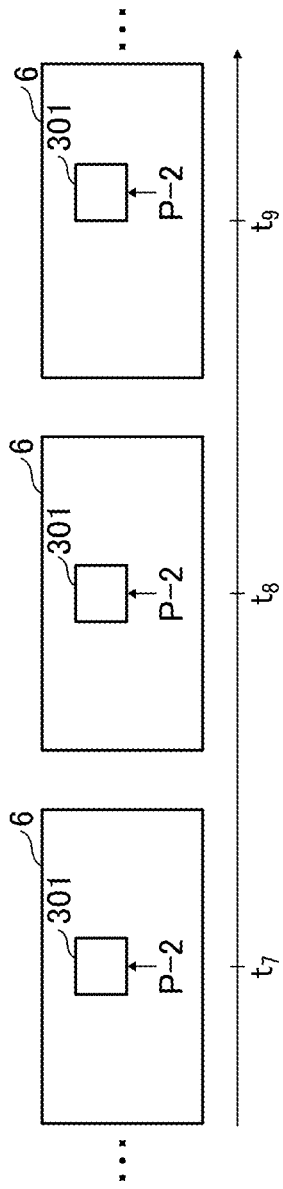

FIG. 23C illustrates a case that the display region 301 is being locked at the gazing point P-2. Since the movie image is used, the frames are switched when the time elapses, but the gazing point P-2 is being used as the gazing point. Therefore, the display region 301 displayed by the terminal apparatus 30 does not shift through time "$t_7$" to "$t_9$" along the time line.

On the other hand, in a case of the movie image that the gazing point P shifts along the time line, the gazing point determination unit 13 detects the gazing point P, tracks the same gazing point P among the frames, and labels the gazing point P at each frame. During the still time period, the coordinate and angle of view are adjusted at each frame so that the same gazing point P is displayed. When the coordinates shift, the coordinates can be interpolated same as the still image. Since the movie image is used, one gazing point P may disappear during the playing of image. In this case, the one gazing point P shifts to the next gazing point P before the one gazing point P disappears. Accordingly, the gazing point determination unit 13 tracks the gazing point P, and manages the presence or absence of the gazing point P in a given time range or period, with which a display pattern that sequentially displays the gazing points P can be generated.

As to the above described browsing system 100 of the first embodiment, the terminal apparatus 30 can automatically display the gazing points corresponding to the feature portions of the full-view spherical image 6 like the movie image, thereby attracting the interest of the viewer person easily. Further, since the zoom-in (enlarging image) or zoom-out (reducing image) of image can be performed by changing the angle of view, the viewer person may be more likely attracted to the image. Although the full-view spherical image 6 used as the advertisement is difficult for the viewer person to see the entire image, the browsing system 100 can present parts of the full-view spherical image 6 that the advertiser wants to appeal to the viewer person. Further, since the display pattern can be changed and selected based on the number of times of clicking operation, the advertisement can be distributed using one or more display patterns that are more likely clicked along the time line. Therefore, the advertisement effect (e.g., clicking rate) can be enhanced.

Second Embodiment

As to the first embodiment, the advertisement effect can be enhanced by using the full-view spherical image 6. However, since the full-view spherical image 6 is a wide-angle image and includes a number of pixels, the full-view spherical image 6 is typically distributed after being compressed compared to a plane image, or after setting a lower resolution compared to the plane image. For example, if the image distribution apparatus 10 sets a limit to distributable data size of advertisement data (e.g., file size), the data size is required to be within the limit of distributable data size. Further, the image distribution apparatus 10 may set a limit of the distributable data size because if the time required for distributing the data becomes longer, a user such as the viewer person may not see the advertisement.

If the full-view spherical image 6 is compressed and/or set with the lower resolution, the full-view spherical image 6 may deteriorate the image quality compared to the plane image, resulting in a decrease in the advertisement effect. For example, even if an image of a characteristic object is shown in a background at a far distance point in the full-view spherical image 6, the image of the characteristic object may be blurred when the user such as the viewer person enlarges the image, in which the image may not be clicked by the user.

Therefore, in the second embodiment, a partial image set with higher image quality is generated in a region identified by the gazing point P, and the image distribution apparatus 10 transmits the full-view spherical image 6 set with a lower image quality and the partial image set with the higher image quality to the terminal apparatus 30. The partial image is an image corresponding to a part of the full-view spherical image 6. Since the partial image set with the higher image quality is a part of the full-view spherical image 6, an increase in the data size of advertisement data can be suppressed. The partial image set with the higher image quality can be generated using any one of the following two methods.

(i) The compression ratio of the partial image corresponding to the region identified by the gazing point P and the angle of view associated with the gazing point P is set smaller than other region of the compression ratio of the full-view spherical image 6.

(ii) The resolution of the partial image corresponding to the region identified by the gazing point P and the angle of view associated with the gazing point P is set greater than the resolution of other region of the full-view spherical image 6.

The partial image set with the higher image quality may not be easily blurred even when the user enlarges the image, resulting into more clicking on the advertisement, and thereby the decrease of the advertisement effect can be suppressed.

Further, other than the above two methods of improving the image quality of the partial image, the following another method may be adopted to enhance the advertisement effect.

(iii) The partial image corresponding to the region identified by the gazing point P and the angle of view associated with the gazing point P is generated and distributed as a movie image.

Since persons are easily attracted to a moving object, even if the image quality becomes lower, the advertisement effect is less likely to deteriorate if the gazing point P is generated and distributed as the movie image. Further, in a case of the movie image, it is known that users may not notice the deterioration of image quality, and thereby the advertisement effect is less likely to deteriorate.

Figure 24B:
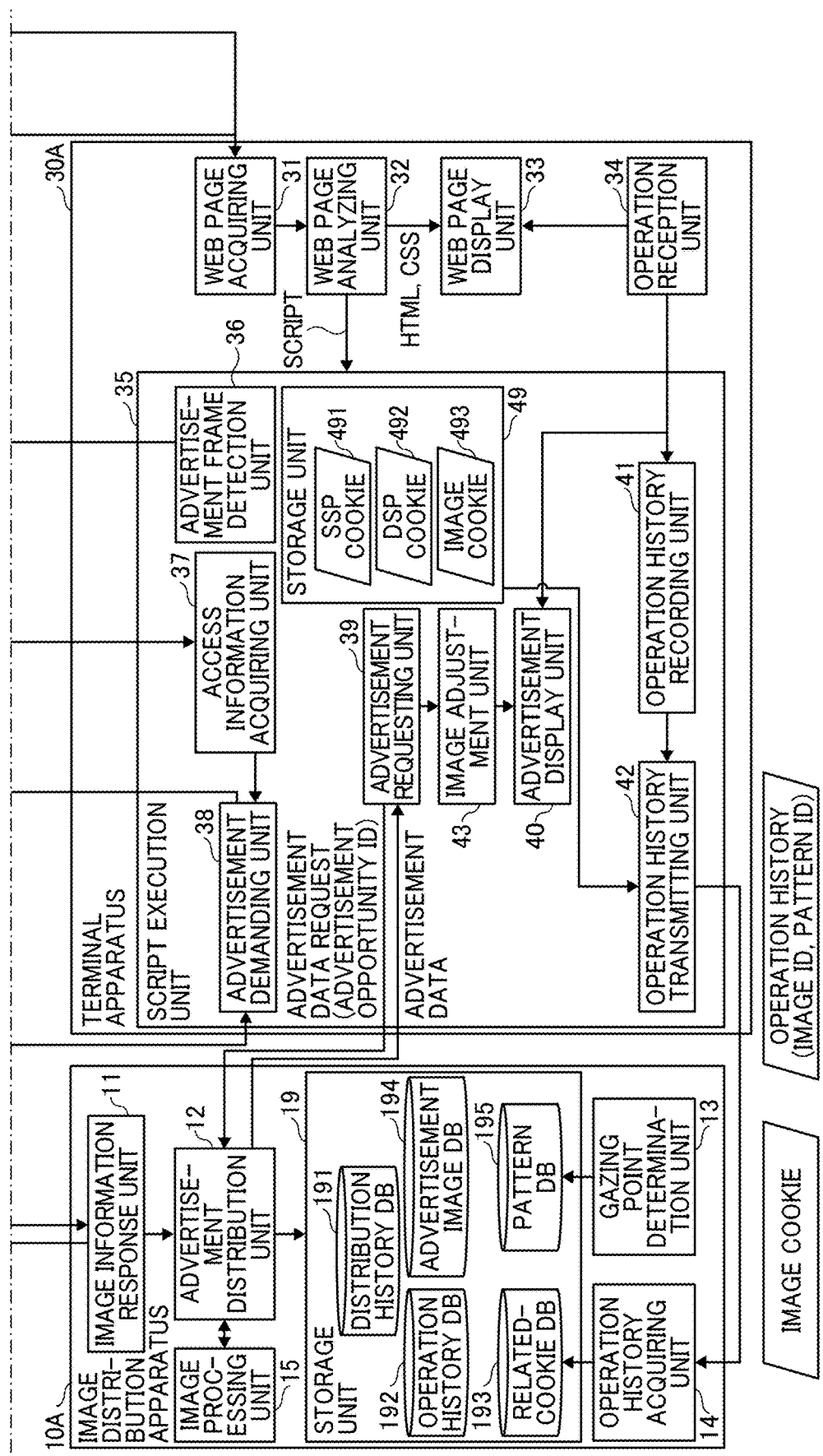

Function:

FIG. 24 illustrates an example of a functional block diagram illustrating functions of a terminal apparatus 30A, the advertiser web server 70, the partner site web server 60, an image distribution apparatus 10A, the SSP 50, and the DSP 20 of the second embodiment. In the second embodiment, the components designated by the same reference numerals in FIG. 9 perform similar functions, so that only the main components of the second embodiment may be described.

As illustrated in FIG. 24, the image distribution apparatus 10A of the second embodiment includes an image processing unit 15. The image processing unit 15 acquires the gazing point P and the angle of view of the gazing point P registered in the pattern DB 195 to generate a partial image from the full-view spherical image 6. The partial image generated by the image processing unit 15 has coordinates (position) set within the full-view spherical image 6.

When the partial image is to be generated as the movie image, the full-view spherical image 6 (used as the original full-view spherical image) is required to be a movie image. The image processing unit 15 acquires one frame from the full-view spherical image 6 as a still image while acquiring a part of the full-view spherical image 6 identified by the gazing point P and the angle of view of the gazing point P as the partial image of the movie image.

Further, as illustrated in FIG. 24, the script execution unit 35 of the terminal apparatus 30A of the second embodiment includes an image adjustment unit 43. When the partial image is transmitted to the terminal apparatus 30A together with the full-view spherical image 6, the image adjustment unit 43 sets the partial image on the full-view spherical image 6 based on the coordinates associated to the partial image.

Generation of Partial Image Set with Higher Image Quality: Decrease of Compression Ratio:

At first, a method of generating a partial image 5 set with the higher image quality is described with reference to FIG. 25, in which the compression ratio of the partial image 5 is set smaller than the compression ratio of the full-view spherical image 6. It should be noted that the full-view spherical image 6 distributed from the image distribution apparatus 10 described in the first embodiment is already compressed or reduced in resolution. For this reason, the image quality of the full-view spherical image 6 in the first embodiment becomes lower, resulting in the above described problems. In other words, a full-view spherical image 6a set with the higher image quality exists before performing the compression or reducing the resolution. In the second embodiment, the partial image 5 set with the higher image quality is generated from the full-view spherical image 6a set with the higher image quality.

Figure 25:
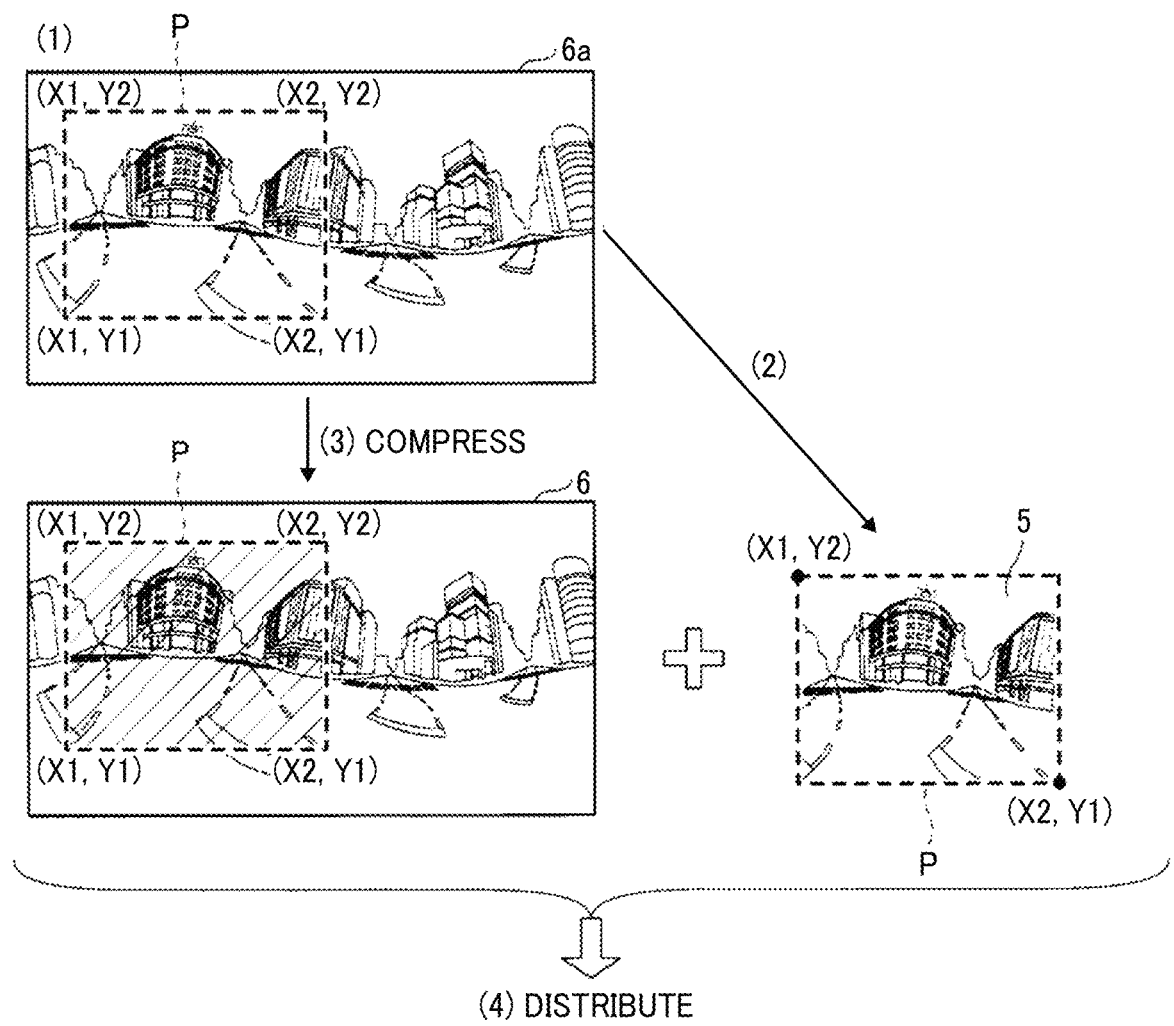
FIG. 25 illustrates a method of generating a partial image set with higher image quality by setting compression ratio of the partial image smaller than that of a full-view spherical image.

(1) In FIG. 25, the full-view spherical image 6a before performing the compression is illustrated. The region of the partial image 5 is identified by diagonal vertices (X1, Y2) and (X2, Y1) based on the gazing point P and the angle of view (either large, middle, small) of the gazing point P set in the full-view spherical image 6a registered in the pattern DB 195.

(2) The image processing unit 15 generates the partial image 5 from the full-view spherical image 6a before performing the compression. For example, the region of the partial image 5 may be copied (duplication). Alternatively, a region other than the partial image 5 may be cut from the full-view spherical image 6a before performing the compression (trimming). As a result, the partial image 5 set with the higher image quality is generated. The partial image 5 can be generated by using any one of the copying and the cutting method. When the partial image 5 is generated by using the cutting method, the pixels cut from the full-view spherical image 6a becomes data-reduced pixels such as uniform white pixels in the full-view spherical image 6, with which the data size of the full-view spherical image 6 can be reduced. The partial image 5 still has coordinates set in the full-view spherical image 6a.

(3) Then, the image processing unit 15 compresses the full-view spherical image 6a (i.e., original image) to generate a compressed full-view spherical image 6 to be distributed as the advertisement. In the description of FIG. 25, the resolution (number of pixels) may not change when the compression is performed, but the resolution can be also changed when the compression is performed. The compression of the image means reducing the file size without changing the resolution (pixel number) of the image. For example, when a bitmap image is converted into an image using joint photographic experts group (JPEG) format, the compression is performed to reduce the file size. Further, as to JPEG, the compression ratio is variable, and the higher the compression ratio, the smaller the file size. However, since similar data is regarded as the same data in the compression processing, the higher the compression ratio, the lower the image quality.

(4) The image distribution apparatus 10A distributes the compressed full-view spherical image 6 and the partial image 5 (including coordinates) to the terminal apparatus 30A.

After the terminal apparatus 30A receives the compressed full-view spherical image 6 and the partial image 5, the image adjustment unit 43 sets the partial image 5 on the compressed full-view spherical image 6. The full-view spherical image 6 is image data defined by pixel values associated with corresponding combinations of the latitude and longitude. Since the partial image 5 is being associated with coordinates set in the full-view spherical image 6, the partial image 5 can be set on the full-view spherical image 6 in accordance with the coordinates.

When the partial image 5 is to set on the full-view spherical image 6, pixel values of the compressed full-view spherical image 6 are replaced by pixel values of the partial image 5, in which the image of the gazing point P in the compressed full-view spherical image 6 is not displayed, or the pixel values of the partial image 5 are superimposed over the pixel values of the compressed full-view spherical image 6, in which the image of the gazing point P in the compressed full-view spherical image 6 is also displayed. In any methods, the region where the partial image 5 exists can be seen by the user as the partial image 5 alone.

In the second embodiment, since the full-view spherical image 6 is transferred onto the three-dimensional sphere, in a case of superimposing, the advertisement display unit 40 of the terminal apparatus 30A may set the full-view spherical image 6 and the partial image 5 respectively to two three-dimensional spheres, and displays the three-dimensional sphere of the partial image 5 over the three-dimensional sphere of the full-view spherical image 6 so that the partial image 5 is set at a front side of the user.

By setting the partial image 5 set with the higher image quality on the compressed full-view spherical image 6, the user can easily browse the details of the partial image 5 when the user enlarges the partial image 5, thereby the advertisement effect is less likely to deteriorate. Further, even if the resolution of the full-view spherical image 6 is further reduced, since the partial image 5 is associated with the coordinates set in the full-view spherical image 6, the partial image 5 can be similarly set in the full-view spherical image 6, which is to be described with reference to FIG. 26.

Figure 26:
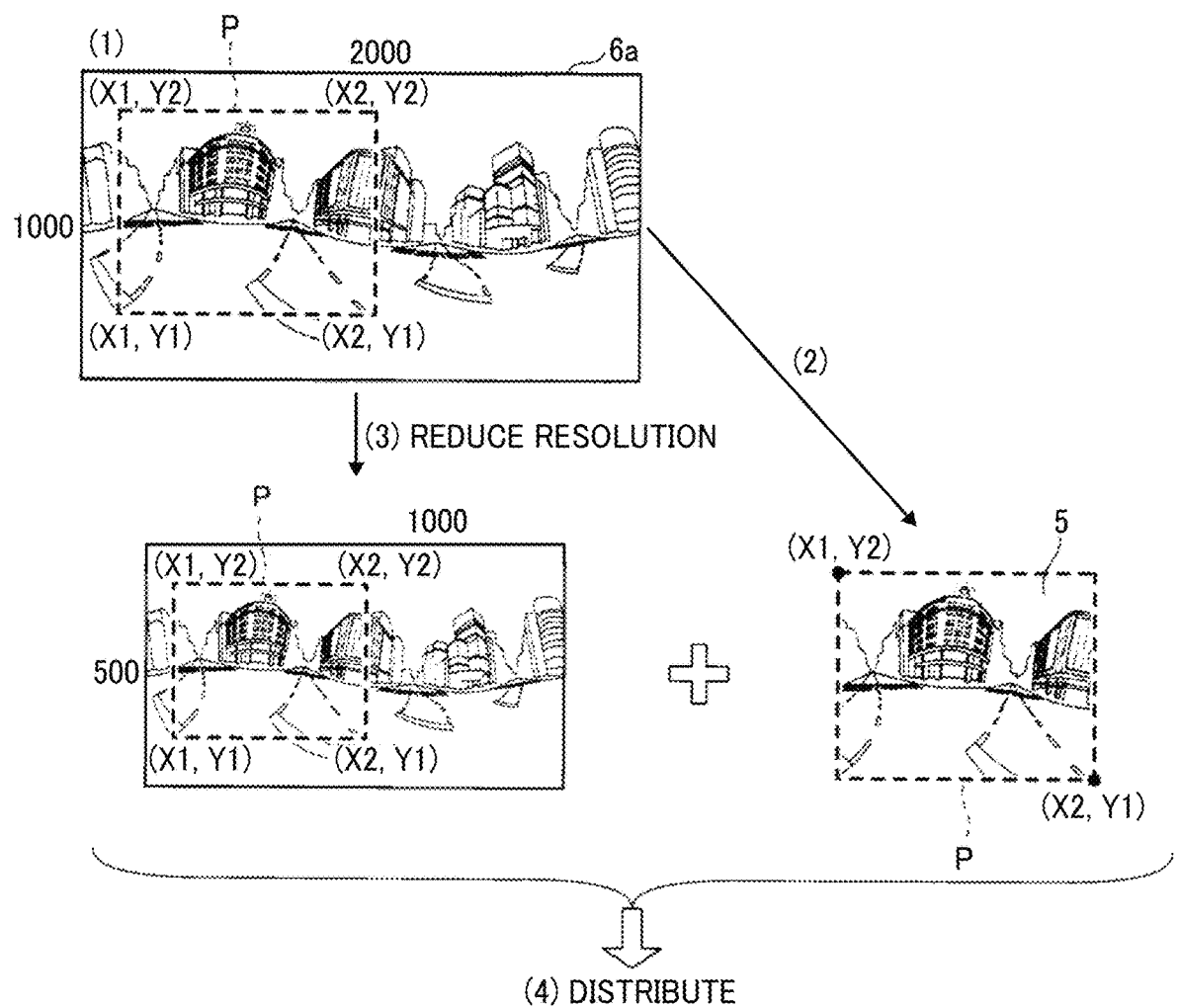
FIG. 26 illustrates a method of generating a partial image set with higher image quality by setting resolution of the partial image higher than that of a full-view spherical image.

Increase of Resolution:

Hereinafter, a description is given of a method for generating the partial image 5 set with the higher image quality by setting the resolution of the partial image 5 greater than the resolution of the full-view spherical image 6 with reference to FIG. 26. In FIG. 26, the full-view spherical image 6 is distributed from the image distribution apparatus 10A by reducing the resolution of the full-view spherical image 6a, in which data size of the full-view spherical image 6 is reduced.

(1) In FIG. 26, the full-view spherical image 6a before reducing the resolution is illustrated. The region of the partial image 5 is identified by diagonal vertices (X1, Y2) and (X2, Y1) based on the gazing point P and the angle of view of the gazing point P set in the full-view spherical image 6a.

(2) The image processing unit 15 generates the partial image 5 from the full-view spherical image 6a before reducing the resolution as similar to FIG. 25. Even if the resolution of the full-view spherical image 6a is reduced, the partial image 5 is still associated with coordinates set within the full-view spherical image 6a.

(3) Then, the image processing unit 15 reduces the resolution of the full-view spherical image 6a to generate and distribute the full-view spherical image 6 as the advertisement. In the description of FIG. 26, the resolution is reduced without the compressing, but the resolution can be reduced in addition to the compressing.

In the second embodiment, the resolution refers to the number of pixels defining the full-view spherical image 6. As the number of pixels increases, information defining one full-view spherical image 6 increases, with which the full-view spherical image 6 can be displayed with higher image quality. For example, it is assumed that the resolution of the full-view spherical image 6a before changing the resolution is 1000×2000, and the resolution of the full-view spherical image 6 after changing the resolution is 500×1000. In this case, the resolution is reduced for one-half (½) in both vertical and horizontal directions. However, each of the pixel values of the full-view spherical image 6 is still associated with the corresponding latitude and longitude (i.e., there is no change in coordinates even if the resolution changes).

(4) The image distribution apparatus 10A distributes the full-view spherical image 6 having the reduced resolution and the partial image 5 to the terminal apparatus 30A.

After the terminal apparatus 30A receives the full-view spherical image 6 and the partial image 5, the image adjustment unit 43 sets the partial image 5 on the full-view spherical image 6 having the reduced resolution. Since the resolution of the partial image 5 is set two times of the resolution of the full-view spherical image 6 having reduced the resolution, the pixels of the partial image 5 do not fit in the full-view spherical image 6 having the reduced resolution. Therefore, when the resolution of the partial image 5 is changed, as described in FIG. 7, the advertisement display unit 40 of the terminal apparatus 30A sets the full-view spherical image 6 and the partial image 5 respectively to two three-dimensional spheres, and displays the three-dimensional sphere of the partial image 5 over the three-dimensional sphere of the full-view spherical image 6 so that the partial image 5 is set at a front side of the user (superimposing). Since a region where the number of pixels is greater includes a greater number of pixels in the full-view spherical image 6 (e.g., panoramic image), the resolution at the gazing point P can be increased. With this configuration, the full-view spherical image 6 including the region of the partial image 5 having a greater number of pixels is acquired.

By setting the partial image 5 set with the higher resolution on the full-view spherical image 6 having the reduced resolution, the user can easily browse the details of the partial image 5 even when the user enlarges the partial image 5, thereby the advertisement effect is less likely to deteriorate. Even if the full-view spherical image 6 is further compressed in addition to the reduced resolution, since the partial image 5 is associated with the coordinates set within the full-view spherical image 6, the partial image 5 can set on the full-view spherical image 6 similarly.

Figure 27:
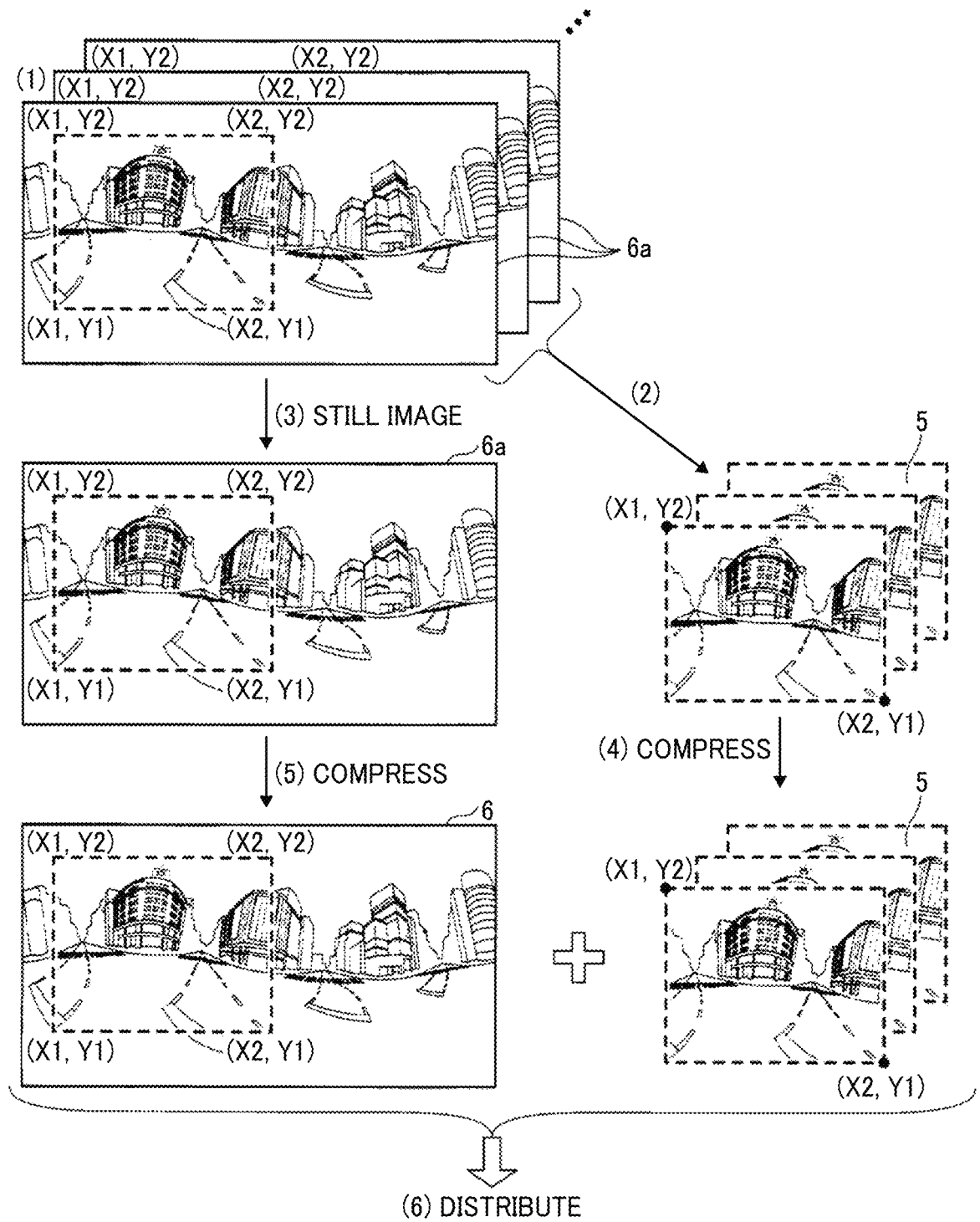
FIG. 27 illustrates a method of generating a partial image of a movie image.

Use of Movie Image:

Hereinafter, a description is given of a method of generating the partial image 5 of a movie image with reference to FIG. 27. In the description of FIG. 27, the full-view spherical image 6 distributed from the image distribution apparatus 10A is an image having the reduced data size by performing the compression, but not limited thereto. For example, the resolution alone may be reduced or both of the compression and resolution may be reduced.

(1) In FIG. 27, an example of the full-view spherical image 6a before performing the compression is illustrated. When the partial image 5 of the movie image is to be generated, the full-view spherical image 6a is required to be a movie image. The gazing point P and the angle of view of the gazing point P in the full-view spherical image 6a are assumed to be the same in each frame, and the partial image 5 is identified by diagonal vertices (X1, Y2) and (X2, Y1).

(2) The image processing unit 15 generates the partial image 5 of the movie image from the full-view spherical image 6a before performing the compression. That is, the partial image 5 of the movie image can be acquired by acquiring only the partial image 5 from each frame of the full-view spherical image 6a illustrated in FIG. 27(1).

(3) The image processing unit 15 determines one frame (still image) of the full-view spherical image 6a included in the movie image of the full-view spherical image 6a. For example, the first frame of the movie image may be used as the one frame, the middle frame of the movie image may be used as the one frame, or the last frame of the movie image may be used as the one frame. Alternatively, a frame having the best or better image quality in view of the balance of luminance may be used as the one frame.

(4) The image processing unit 15 compresses the partial image 5 of the movie image to generate the partial image 5 of the compressed movie image. In this compression, the resolution (number of pixels) may or may not be changed. With this processing, the data size of the advertisement data can be reduced. Further, the partial image 5 of the movie image may be distributed without performing the compression.

(5) The image processing unit 15 compresses the full-view spherical image 6a determined in (3) to generate the compressed full-view spherical image 6 to be distributed as the advertisement. In this compression, the resolution (number of pixels) may or may not be changed.

(6) The image distribution apparatus 10A distributes the compressed full-view spherical image 6 and the partial image 5 of the movie image to the terminal apparatus 30A.

After the terminal apparatus 30A receives the compressed full-view spherical image 6 and the partial image 5 of the movie image, the image adjustment unit 43 of the terminal apparatus 30A sets the partial image 5 on the compressed full-view spherical image 6. When the compression is performed and/or when the resolution is changed, the partial image 5 can be set on one still image in accordance with the original coordinates of the partial image 5. During the playing of the partial image 5 and the compressed full-view spherical image 6, the setting of the partial image 5 on the compressed full-view spherical image 6 is repeated along the time line. By generating the partial image 5 of the movie image from the full-view spherical image 6a (used as the original full-view spherical image), even if the image quality becomes lower, the advertisement effect is less likely to deteriorate.

What is common to the above methods (i) to (iii) is that it is easy to set the partial image 5 on the full-view spherical image 6 because the partial image 5 set with the higher image quality is generated from the full-view spherical image 6a (used as the original full-view spherical image). For example, if a plane image captured by a digital camera for planar photographing is to be set on the full-view spherical image 6, it is difficult to align the image position. In the second embodiment, the partial image 5 is set to the original location set within the full-view spherical image 6, which is used for acquiring the partial image 5.

Distribution Procedure:

Hereinafter, a description is given of a distribution procedure of the partial image 5 described in the above (i) to (iii) with reference to FIGS. 28 to 30.

Figure 28:
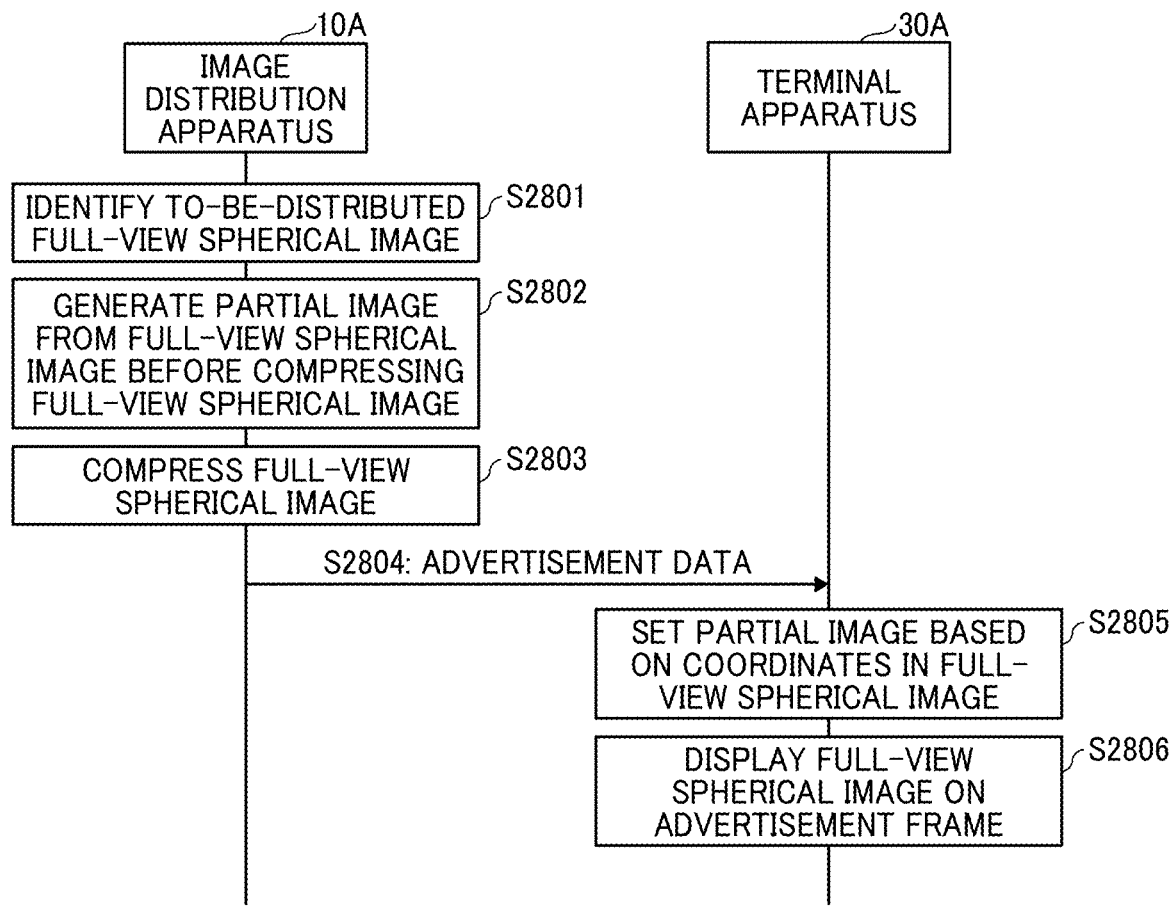
FIG. 28 is an example of a sequence diagram illustrating a procedure when an image distribution apparatus distributes advertisement data including a full-view spherical image and a partial image set with different compression ratios.

FIG. 28 is an example of a sequence diagram illustrating a procedure when the image distribution apparatus 10A distributes the advertisement data including the full-view spherical image 6 and the partial image 5 set with the different compression ratios. The sequined illustrated in FIG. 28 is started when the advertisement data is to be distributed (when the web page is to be displayed on the terminal apparatus 30A). However, the processing in the image distribution apparatus 10A can be performed at any time after the gazing point P is set.

S2801: The image distribution apparatus 10A identifies the full-view spherical image 6, which is included the to-be-distributed advertisement data, in accordance with the sequence described in FIG. 13.

S2802: The image processing unit 15 generates the partial image 5 from the full-view spherical image 6a before performing the compression of the full-view spherical image 6a.

S2803: The image processing unit 15 compresses the full-view spherical image 6a.

S2804: The advertisement distribution unit 12 of the image distribution apparatus 10A distributes the advertisement data including the compressed full-view spherical image 6a and the partial image 5 to the terminal apparatus 30A.

S2805: After the advertisement acquiring unit 39 of the terminal apparatus 30A receives the advertisement data, the image adjustment unit 43 sets the partial image 5 on the full-view spherical image 6 based on the coordinates associated with the partial image 5 in the full-view spherical image 6. With this processing, one image generated by the equirectangular projection method is acquired, and thereby the advertisement display unit 40 can generate the full-view spherical image (e.g., panoramic image) as described in FIG. 7.

S2806: The advertisement display unit 40 displays the full-view spherical image 6 on the advertisement frame 7. For example, the advertisement display unit 40 displays the gazing point P-1 on the advertisement frame 7. Since the compression ratio of the gazing point P-1 is set lower than the compression ratio of the full-view spherical image 6 as described above, the gazing point P-1 set with the higher image quality can be displayed.

Figure 29:
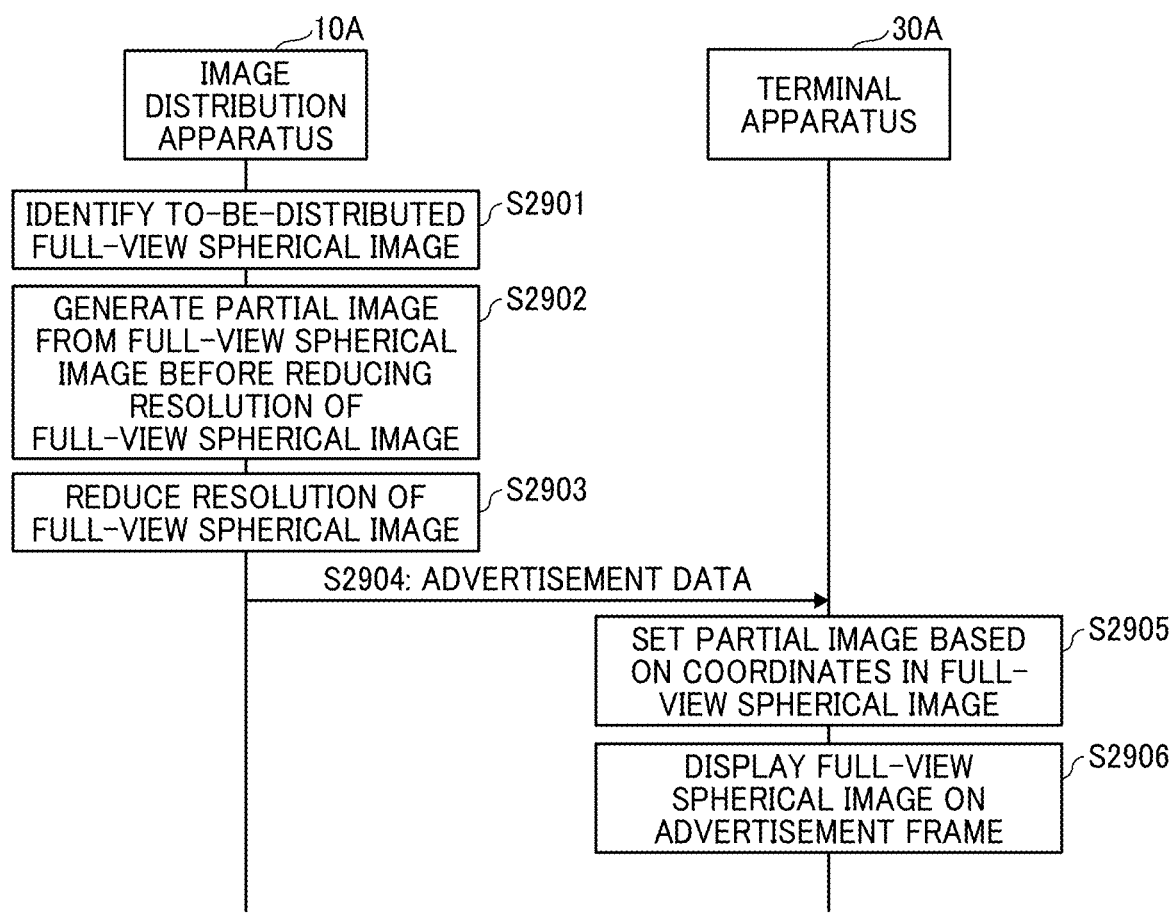
FIG. 29 is an example of a sequence diagram illustrating a procedure when an image distribution apparatus distributes advertisement data including a full-view spherical image and a partial image set with different resolutions.

FIG. 29 is an example of a sequence diagram illustrating a procedure when the image distribution apparatus 10A distributes the advertisement data including the full-view spherical image 6 and the partial image 5 set with different resolutions. In the description of FIG. 29, the difference from FIG. 28 is mainly described.

S2901: The image distribution apparatus 10A identifies the full-view spherical image 6, which is included the to-be-distributed advertisement data, in accordance with the sequence described in FIG. 13.

S2902: The image processing unit 15 generates the partial image 5 from the full-view spherical image 6a before reducing the resolution of the full-view spherical image 6a.

S2903: The image processing unit 15 reduces the resolution of the full-view spherical image 6a.

S2904 to S2906 in FIG. 29 are same as S2804 to S2806 in FIG. 28. Since the resolution of the gazing point P-1 is set higher than the resolution of the full-view spherical image 6 as described above, the gazing point P-1 set with the higher image quality can be displayed.

Figure 30:
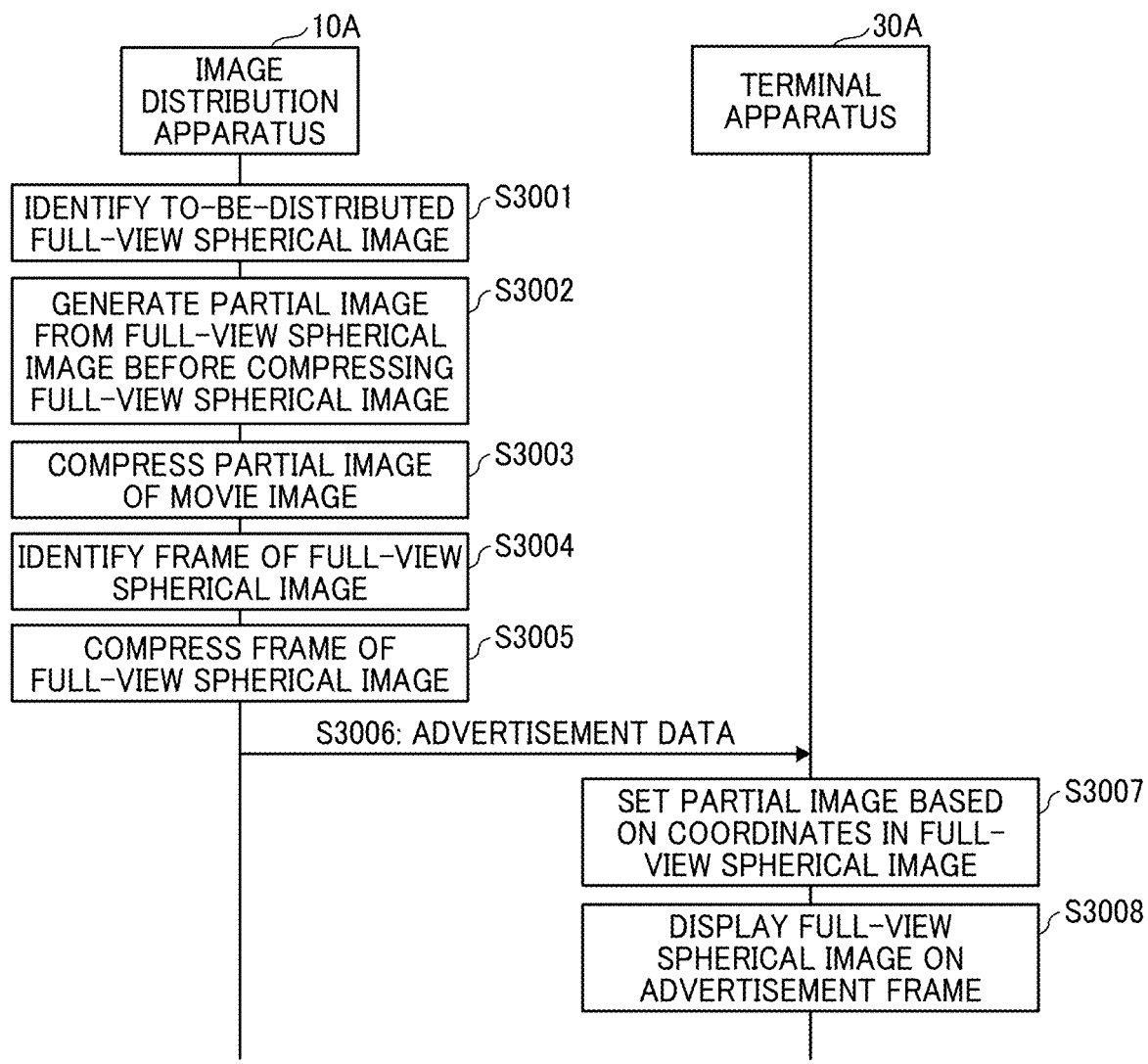
FIG. 30 is an example of a sequence diagram illustrating a procedure when an image distribution apparatus distributes advertisement data including a full-view spherical image and a partial image of a movie image.

FIG. 30 is an example of a sequence diagram illustrating a procedure when the image distribution apparatus 10A distributes the advertisement data including the full-view spherical image 6 and the partial image 5 of the movie image. In the description of FIG. 30, the difference from FIG. 28 is mainly described.

S3001: The image distribution apparatus 10A identifies the to-be-distributed full-view spherical image 6 using the advertisement data using the sequence of FIG. 13.

S3002: The image processing unit 15 generates one or more partial images 5 of the movie image from the full-view spherical image 6a before performing the compression of the full-view spherical image 6a.

S3003: The image processing unit 15 compresses each of the one or more partial images 5 of the movie image.

S3004: The image processing unit 15 identifies the to-be-distributed frame (still image) from the full-view spherical image 6.

S3005: The image processing unit 15 compresses the full-view spherical image 6 (i.e., the identified frame).

S3006 to S3008 of FIG. 30 are same as S2801 to S2806 in FIG. 28. Since the gazing point P-1 is displayed as the movie image as described above, the advertisement effect can be enhanced.

Combination of Compression, Resolution, and Movie Image:

The above described three methods such as setting the compression ratio of the partial image 5 smaller than that of the full-view spherical image 6, setting the resolution of the partial image 5 higher than that of the full-view spherical image 6, and distributing the partial image 5 of the movie image can be combined using at least any two methods. That is, the compression ratio of the partial image 5 is set smaller than that of the full-view spherical image 6, and the resolution of the partial image 5 is set higher than that of the full-view spherical image 6. Further, the compression ratio of the partial image 5 is set smaller than that of the full-view spherical image 6, and the partial image 5 of the movie image is distributed. Further, the resolution of the partial image 5 is set higher than that of the full-view spherical image 6, and the partial image 5 of the movie image is distributed. Further, the compression ratio of the partial image 5 is set smaller than that of the full-view spherical image 6, the resolution of the partial image 5 is set higher than that of the full-view spherical image 6, and the partial image 5 of the movie image is distributed.

As a result, the image quality of the partial image 5 can be further enhanced, and the image becomes more likely to be attracted using the movie image, with which the advertisement effect is less likely to deteriorate.

As described above, the browsing system 100 of the second embodiment can suppress a decrease in the advertisement effect while suppressing an increase in the data size of the advertisement data by distributing the partial image set with the higher image quality and/or the partial image of the movie image for the region identified by the gazing point P, which means the advertisement effect can be enhanced in the second embodiment. For example, if the compression ratio of the partial image 5 is reduced and/or the resolution of the partial image 5 is increased, a clear image can be acquired even if the user enlarges a far-distance object in the image, such as Empire State Building, with a certain level of enlargement of the image. This makes it easier to click the advertisement. Further, when the partial image 5 of the movie image is distributed, even if the image quality is relatively low, the viewer person can be attracted to the movie image, and thus the viewer person may more likely to click the advertisement.

Other Application:

While the present invention has been described with reference to the above described embodiments, the present invention is not limited to such embodiments, but it is possible to add various modifications and substitutions within the scope of the spirit of the present invention without departing from the scope of the spirit of the present invention.

For example, in the above described embodiments, the full-view spherical image 6 is displayed on the advertisement frame 7, but the full-view spherical image 6 may not be displayed as the advertisement. For example, the full-view spherical image 6 displayed on a web page provided directly by the advertiser web server 70 can be rotated to track the gazing points P one to another.

Further, the application of the terminal apparatus 30 used for displaying the full-view spherical image 6 is not limited to the browser 8, but any application software can be used to rotate the displayed full-view spherical image by tracking the gazing points P.

In the above described embodiments, the full-view spherical image 6 is used for the advertisement, but it is not necessary to use the full-view spherical image 6 for the advertisement.

Further, as described in FIG. 13, in the above described embodiments, the terminal apparatus 30 accesses the DSP 20, and then accesses the image distribution apparatus 10 to acquire the advertisement data. However, the DSP 20 may be configured to acquire the advertisement data directly from the image distribution apparatus 10 and then transmit the advertisement data to the terminal apparatus 30. In this case, since the terminal apparatus 30 can acquire the advertisement data by accessing the DSP 20 alone, the time until displaying the advertisement can be shortened.

Further, when the full-view spherical image 6 being displayed using one display pattern is clicked, the display position and the browsing angle corresponding to the click operation can be stored as information of the operation history, which can be used for determining the gazing point P in the later stage.

Further, the DSP 20 and the image distribution apparatus 10 can be integrated, in which the DSP 20 distributes the advertisement data (e.g., full-view spherical image 6) to the terminal apparatus 30.

Further, the advertisement distribution unit 12 can be configured to evaluate each display pattern using at least one of the clicking rate and the number of times of clicking operation performed for each display pattern. Further, the advertisement distribution unit 12 can evaluate each display pattern using an evaluation index, such as the number of times of pressing a "good" button for each display pattern.

Further, the method of distributing the advertisement using the cooperation of the SSP 50, DSP 20, and image distribution apparatus 10 described in the above described embodiments is just one example, and there is no intention to limit the processing of displaying the advertisement using the terminal apparatus 30. For example, as a simpler processing, the partner site web server 60 may store the advertisement data provided from the advertiser, and distribute the advertisement data to the terminal apparatus 30. In this case, the SSP 50, the DSP 20, and the image distribution apparatus 10 may be omitted.

Further, in the above described embodiments, the full-view spherical image 6 capturing 360 degrees of the circumference of the full-view spherical camera 9 is set on a web page, but not limited thereto. For example, the image data of the web page can be a wide-angle image. The wide-angle image in the above described embodiments indicates an image having a portion that cannot be displayed on the advertisement frame. For example, a panoramic image having an angle of view of about 180 degrees in the horizontal direction may be used as the wide-angle image.

Further, in the above described embodiments, the full-field view spherical image is generated by combining two images, but not limited thereto. For example, the full-field view spherical image can be generated by overlapping portions of image data, which are captured by slightly shifting the image capturing directions. That is, the method of generating the full-length view spherical image is not limited to any specific method.

Further, in the above described embodiments, for the convenience of description, the display region is set by cutting a part or portion within the full-view spherical image 6, but not limited thereto. For example, an angle of view that can cover the full-view spherical image 6 entirely can be set, with which the terminal apparatus 30 can display the entirety of the full-view spherical image as one spherical image, in which the angle of views set for a part of the gazing points P can be set to cover the full-view spherical image 6 entirely, or the angle of views set for all of the gazing points P can be set to cover the full-view spherical image 6 entirely.

Further, the configuration of FIG. 9 illustrated in the above embodiment is divided according to the main function to facilitate understanding of the processing of the browsing system 100. However, the configuration of dividing various functions and names of processing units is not limited to the above example configuration. The processing of the browsing system 100 can be further divided into more processing units in accordance with the processing contents. Further, the processing of the browsing system 100 can be divided by including more processes in one processing unit.

In the above described embodiments, the pattern DB 195 is an example of the display pattern storage unit, the advertisement distribution unit 12 is an example of the wide-angle image transmission unit, the advertisement acquiring unit 39 is an example of the wide-angle image acquiring unit, the advertisement display unit 40 is an example of the wide-angle image display unit, the operation reception unit 34 is an example of the operation reception unit, the operation history transmitting unit 42 is an example of the operation history transmitting unit, and the operation history acquiring unit 14 is an example of the operation history acquiring unit. In the above described embodiments, the gazing point P-i (i: 1 to n) is an example of a gazing point at a first display position, and the gazing point P-i+1 is an example of a gazing point at a second display position. In the above described embodiments, the terminal apparatus 30 is an example of a first information processing apparatus or a second information processing apparatus. In the above described embodiments, the image processing unit 15 is an example of the image generating unit, and the image adjustment unit 43 is an example of the image setting unit.

As to the browsing system of the above described embodiments, the browsing system can distribute images by easily attracting the interest of viewer persons.

Although the description of the present invention has been made based on the embodiments described above, the present invention is not limited to the requirements described in the above embodiments. Numerous additional modifications and variations are possible in light of the above teachings. It is therefore to be understood that, within the scope of the appended claims, the disclosure of this patent specification may be practiced otherwise than as specifically described herein.

Any one of the above-described operations may be performed in various other ways, for example, in an order different from the one described above.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. A browsing system, comprising:
an image distribution apparatus including
a memory configured to store and register a presentation pattern of a plurality of display positions, the plurality of display positions including at least a first display position and a second display position set within a wide-angle image, and the presentation pattern including a display order of the plurality of display positions; and
first circuitry configured to transmit the wide-angle image and the presentation pattern; and
an information processing apparatus including second circuitry configured to
receive the wide-angle image and the presentation pattern from the image distribution apparatus; and
control a display to display the wide-angle image according to the plurality of display positions of the presentation pattern, wherein
the first display position corresponds to a first display region and a first angle of view is set at the first display position,
the second display position corresponds to a second display region and a second angle of view is set at the second display position,
the second circuitry successively changes a display region within the wide-angle image from the first display region to the second display region based on the display order, and the second circuitry successively changes the angle of view from the first angle of view to the second angle of view, and
the second circuitry changes the angle of view from the first angle of view to the second angle of view after changing the display region within the wide-angle image from the first display region to the second display region based on the display order.

2. The browsing system of claim 1, wherein
the memory is further configured to store an angle of view set for each of the display positions,
the second circuitry receives the angle of view set for each of the display positions together with the display order from the image distribution apparatus, and
the second circuitry controls the display to display a display region within the wide-angle image, the display region is determined based on each of the display positions and the angle of view set for each of the display positions.

3. The browsing system of claim 1, wherein
the second circuitry receives operation information corresponding to an operation performed on the wide-angle image displayed on the display, and transmits the received operation information to the image distribution apparatus, and
the second circuitry transmits a browsing angle of the wide-angle image, used for viewing the wide-angle image displayed on the display, to the image distribution apparatus, and then the first circuitry determines each one of the plurality of display positions set within the wide-angle image based on the browsing angle received from the second circuitry.

4. The browsing system of claim 1, wherein
the second circuitry receives operation information of an operation performed on the wide-angle image displayed on the display, and transmits the received operation information to the image distribution apparatus,
the first circuitry receives the operation information from the second circuitry, checks whether a number of times in which the operation is performed on the wide-angle image is equal to a threshold of more, and stores information of the number of times of the operation performed on the wide-angle image in association with the presentation pattern in the memory, and
the first circuitry transmits the wide-angle image and the presentation pattern associated with the operation performed with the number of times equal to the threshold of more to the information processing apparatus.

5. The browsing system of claim 4, wherein
the operation information includes information of a specific operation performed on the wide-angle image displayed on the display, and the information of the specific operation performed on the wide-angle image is received by the second circuitry of the information processing apparatus, the second circuitry transmits the received specific operation, identification information of the wide-angle image, and identification information of the presentation pattern to the image distribution apparatus, the first circuitry
   acquires the number of times of the specific operation performed on the wide-angle image, the identification information of the wide-angle image, and the identification information of the presentation pattern,
   checks whether the number of times of the specific operation performed on the wide-angle image is equal to a threshold of more,
   stores the number of times of the specific operation performed on the wide-angle image, the identification information of the wide-angle image, and the identification information of the presentation pattern in the memory, and
   transmits the wide-angle image and the presentation pattern associated with the specific operation performed with the number of times equal to the threshold of more, to the information processing apparatus.

6. The browsing system of claim 4, wherein
the first circuitry transmits the presentation pattern including at least a first presentation pattern and a second presentation pattern set for the wide-angle image, mutually different each other, to the information processing apparatus, and
in a case that the wide-angle image including the plurality of display positions is displayed on the display using the first presentation pattern for a given times or more, the first circuitry instructs the second circuitry to control the display to display the wide-angle image set with the plurality of display positions on the display using the second presentation pattern.

7. The browsing system of claim 4, wherein
the second circuitry transmits apparatus identification information identifying the information processing apparatus to the first circuitry of the image distribution apparatus,
the first circuitry stores distribution history information in the memory, the distribution history information recording identification information of the presentation pattern and identification information of the wide-angle image, distributed to the information processing apparatus in the past, in association with the apparatus identification information identifying the information processing apparatus, and
in a case that the second circuitry requests the wide-angle image to the first circuitry of the image distribution apparatus, the first circuitry transmits another presentation pattern, different from the presentation pattern recorded in the distribution history information, to the information processing apparatus.

8. The browsing system of claim 1, wherein
the second circuitry transmits apparatus identification information identifying the information processing apparatus to the first circuitry of the image distribution apparatus,
the first circuitry determines attribute of a viewer person viewing the wide-angle image displayed on the display based on the apparatus identification information identifying the information processing apparatus, and
the first circuitry compares the attribute of the viewer person and at least one of attribute of a relevant target person and attribute of an irrelevant target person of the wide-angle image, set for a provider that provides the wide-angle image, to determine whether transmitting the wide-angle image to the information processing apparatus.

9. The browsing system of claim 1, wherein
the second circuitry transmits apparatus identification information identifying the information processing apparatus to the first circuitry of the image distribution apparatus,
the first circuitry determines attribute of a viewer person viewing the wide-angle image displayed on the display based on the apparatus identification information identifying the information processing apparatus, and
the first circuitry refers to an attribute of a relevant target person and a priority level of the relevant target person set for the wide-angle image to determine whether transmitting the wide-angle image to the information processing apparatus based on a matching level of the attribute of viewer person and the attribute of the relevant target person, the priority level of the relevant target person, or both of the matching level of the attribute of viewer person and the attribute of the relevant target person and the priority level of the relevant target person.

10. The browsing system of claim 1, wherein
the first circuitry is configured to acquire and process the wide-angle image to generate a partial image corresponding at least one of the display positions set within the wide-angle image from the acquired wide-angle image,
the first circuitry transmits the partial image and the wide-angle image to the information processing apparatus, and
the second circuitry is configured to receive the partial image and the wide-angle image from the first circuitry, and then set the partial image at an original position of the partial image, where the partial image is generated from the wide-angle image, within the wide-angle image.

11. The browsing system of claim 10, wherein the first circuitry generates the partial image from the wide-angle image before reducing image quality of the wide-angle image.

12. The browsing system of claim 11, wherein
the first circuitry generates the partial image having coordinates set within the wide-angle image from the wide-angle image before reducing the image quality of the wide-angle image by compressing the wide-angle image,
the first circuitry transmits the partial image and the compressed wide-angle image to the information processing apparatus, and
the second circuitry receives the partial image and the compressed wide-angle image from the first circuitry of the image distribution apparatus, and sets the partial image at an original position of the partial image, where the partial image is generated from the wide-angle image, within the compressed wide-angle image using the coordinates of the partial image set within the wide-angle image.

13. The browsing system of claim 11, wherein
the first circuitry generates the partial image having coordinates set within the wide-angle image from the wide-angle image before reducing the image quality of the wide-angle image by reducing a resolution of the wide-angle image, the first circuitry transmits the partial image and the resolution-reduced wide-angle image to the information processing apparatus, and the second circuitry receives the partial image and the resolution-reduced wide-angle image from the first circuitry of the image distribution apparatus, and sets the partial image at an original position of the partial image, where the partial image is generated from the wide-angle image, within the resolution-reduced wide-angle image using the coordinates of the partial image set within the wide-angle image.

14. The browsing system of claim 11, wherein the first circuitry generates the partial image of a movie image having coordinates set within the wide-angle image prepared as a movie image, from the wide-angle image before reducing the image quality of the wide-angle image, and the first circuitry generates at least one still image from the wide-angle image having reduced the image quality, the first circuitry transmits the partial image of the movie image, and the still image of the wide-angle image having reduced the image quality to the information processing apparatus, and the second circuitry receives the partial image of the movie image, and the still image of the wide-angle image having reduced the image quality from the first circuitry, sets the partial image of the movie image at an original position of the partial image, where the partial image is generated from the wide-angle image, within the still image of the wide-angle image having reduced the image quality using the coordinates of the partial image set within the wide-angle image, and displays the partial image of the movie image at any one of the display positions set within the wide-angle image having reduced the image quality, on the display connected with the information processing apparatus.

15. An image distribution apparatus, comprising:

circuitry configured to acquire a wide-angle image and a presentation pattern of a plurality of display positions set within the wide-angle image, the plurality of display positions including at least a first display position and a second display position, and the presentation pattern including a display order of the plurality of display positions;

register the wide-angle image and the presentation pattern in a memory; and transmit, by referring the memory, the wide-angle image and presentation pattern to an information processing apparatus that is configured to control a display to display the wide-angle image according to the plurality of display positions of the presentation pattern, wherein the first display position corresponds to a first display region and a first angle of view is set at the first display position, the second display position corresponds to a second display region and a second angle of view is set at the second display position, that the information processing apparatus successively changes a display region within the wide-angle image from the first display region to the second display region based on the display order included in the presentation pattern, and the information processing apparatus successively changes the angle of view from the first angle of view to the second angle of view, and the information processing apparatus changes the angle of view from the first angle of view to the second angle of view after changing the display region within the wide-angle image from the first display region to the second display region based on the display order included in the presentation pattern.

16. A method of distributing a wide-angle image from an image distribution apparatus to an information processing apparatus, the method comprising:

registering a wide-angle image and a presentation pattern of a plurality of display positions set within the wide-angle image in a memory, the plurality of display positions including at least a first display position and a second display position, and the presentation pattern including a display order of the plurality of display positions;

referring to the presentation pattern registered in the memory; and transmitting the wide-angle image and the presentation pattern to the information processing apparatus, the information processing apparatus being configured to receive the wide-angle image and the presentation pattern from the image distribution apparatus and to control a display to display the wide-angle image according to the plurality of display positions of the presentation pattern, wherein the first display position corresponds to a first display region and a first angle of view is set at the first display position, the second display position corresponds to a second display region and a second angle of view is set at the second display position, the information processing apparatus successively changes a display region within the wide-angle image from the first display region to the second display region based on the display order included in the presentation pattern, and the information processing apparatus successively changes the angle of view from the first angle of view to the second angle of view, and the information processing apparatus changes the angle of view from the first angle of view to the second angle of view after changing the display region within the wide-angle image from the first display region to the second display region based on the display order included in the presentation pattern.

17. The method of claim 16, further comprising:

acquiring, from the information processing apparatus, operation information corresponding to an operation performed on the wide-angle image;

storing a number of times in which the operation is performed on the wide-angle image in association with the wide-angle image and the presentation pattern in the memory;

checking whether the number of times is equal to a threshold of more; and transmitting the wide-angle image and the presentation pattern associated with the operation performed with the number of times equal to the threshold of more, to the information processing apparatus.

* * * * *